US011315142B2

(12) United States Patent
Perkins et al.

(10) Patent No.: US 11,315,142 B2
(45) Date of Patent: *Apr. 26, 2022

(54) METHOD AND SYSTEM FOR CORRELATING SOCIAL MEDIA CONVERSIONS

(71) Applicant: Sprinklr Inc., New York, NY (US)

(72) Inventors: Jacob Andrew Perkins, New York, NY (US); Erik Lee Huddleston, New York, NY (US); Ramon Renteria, New York, NY (US); John Joseph De Oliveira, New York, NY (US)

(73) Assignee: SPRINKLR, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/127,798

(22) Filed: Dec. 18, 2020

(65) Prior Publication Data

US 2021/0217050 A1 Jul. 15, 2021

Related U.S. Application Data

(63) Continuation of application No. 16/601,300, filed on Oct. 14, 2019, now Pat. No. 10,878,444, which is a (Continued)

(51) Int. Cl.
*G06Q 30/02* (2012.01)
*G06Q 50/00* (2012.01)
(Continued)

(52) U.S. Cl.
CPC ........ *G06Q 30/0242* (2013.01); *G06Q 50/01* (2013.01); *H04B 7/26* (2013.01);
(Continued)

(58) Field of Classification Search
CPC ....... H04L 51/16; H04L 51/32; H04L 65/403; G06Q 30/0242; G06Q 50/01
(Continued)

(56) References Cited

U.S. PATENT DOCUMENTS 7,051,010 B1 * 5/2006 Adams ..................... G09B 7/02
706/11
8,107,604 B2 * 1/2012 Katis ........................ H04N 7/15
379/93.01

(Continued)

FOREIGN PATENT DOCUMENTS

CA        2606199 A1 * 10/2006 ........... G06Q 10/107

*Primary Examiner* — David R Lazaro
*Assistant Examiner* — Berhanu Shitayewoldetadik
(74) *Attorney, Agent, or Firm* — Schwabe Williamson & Wyatt

(57) ABSTRACT

A conversation correlation system is configured to associate social signals with conversations and group the conversations into topic clusters. The topic clusters for different days are linked together to form conversation streams. The conversation streams may identify conversation topics within ecosystems and identify changes in conversation topics over time. Topic labels may be generated for the topic clusters that better describe conversation topics. In one example, the topic labels may be generated using a mutual information topic distribution model.

20 Claims, 57 Drawing Sheets

Related U.S. Application Data continuation of application No. 15/940,418, filed on Mar. 29, 2018, now Pat. No. 10,489,817, which is a continuation of application No. 14/336,914, filed on Jul. 21, 2014, now Pat. No. 9,959,548, which is a continuation-in-part of application No. 13/727,991, filed on Dec. 27, 2012, now Pat. No. 10,003,560, which is a continuation-in-part of application No. 13/708,020, filed on Dec. 7, 2012, now Pat. No. 9,288,123, which is a continuation-in-part of application No. 13/682,449, filed on Nov. 20, 2012, now Pat. No. 9,641,556, which is a continuation-in-part of application No. 13/601,151, filed on Aug. 31, 2012, now Pat. No. 9,251,530.

(60) Provisional application No. 61/857,527, filed on Jul. 23, 2013.

(51) Int. Cl.
| | |
|---|---|
| *H04L 12/18* | (2006.01) |
| *G06F 16/9535* | (2019.01) |
| *H04L 29/08* | (2006.01) |
| *H04L 12/58* | (2006.01) |
| *H04L 51/00* | (2022.01) |
| *H04L 65/403* | (2022.01) |
| *H04B 7/26* | (2006.01) |
| *H04L 51/52* | (2022.01) |

(52) U.S. Cl.
CPC .............. *H04L 51/16* (2013.01); *H04L 51/32* (2013.01); *H04L 65/403* (2013.01)

(58) Field of Classification Search
USPC ........................................................ 709/206
See application file for complete search history.

(56) References Cited

U.S. PATENT DOCUMENTS

| | | | | |
|---|---|---|---|---|
| 8,819,150 | B1* | 8/2014 | Osinga | H04N 51/16 709/206 |
| 2006/0155785 | A1* | 7/2006 | Berry | H04L 51/04 |
| 2008/0255847 | A1* | 10/2008 | Moriwaki | G10L 21/06 704/270.1 |
| 2009/0106676 | A1* | 4/2009 | Brezina | H04L 51/22 715/763 |
| 2010/0312844 | A1* | 12/2010 | Katis | H04L 51/04 709/206 |
| 2012/0036181 | A1* | 2/2012 | Isidore | H04L 67/18 709/203 |
| 2012/0210334 | A1* | 8/2012 | Sutedja | H04L 51/16 719/314 |
| 2012/0232956 | A1* | 9/2012 | Dilip | G06Q 30/02 705/7.33 |
| 2012/0239761 | A1* | 9/2012 | Linner | G06F 40/279 709/206 |
| 2013/0031106 | A1* | 1/2013 | Schechter | G06F 16/3326 707/749 |
| 2014/0258198 | A1* | 9/2014 | Spivack | G06N 5/046 706/21 |
| 2015/0006655 | A1* | 1/2015 | Fradin | H04L 51/16 709/206 |
| 2016/0239774 | A1* | 8/2016 | Babar | G06Q 10/0637 |

* cited by examiner

NORMALIZED SOCIAL DATA — 5380

| FROM | TO | SOURCE | DATE/TIME | SIGNAL_ID | SIGNAL TYPE | CONTENT |
|---|---|---|---|---|---|---|
| BIZ_A | | SN_104A | 12/10/12 8:45A | SIGNAL#1 | POST | "CHECK OUT OUR NEW PHONE" |
| CONSTITUENT_A | | SN_104B | 12/10/12 10:45A | SIGNAL#2 | TWEET | "NEW PHONE IS GREAT" |
| CONSTITUENT_B | CONSTITUENT_A | SN#104B | 12/13/12 7:15P | SIGNAL#3 | RETWEET | "I DON'T LIKE NEW PHONE" |
| 5382A | 5382B | 5382C | 5382D | 5382E | 5382F | 5382G |

FIG. 23

NORMALIZED SOCIAL DATA — 5380

SIGNAL_ID: UNIQUE SIGNAL IDENTIFIER

TIME: TIME SIGNAL WAS GENERATED

TIME BUCKET: MONITORED TIME PERIOD ASSOCIATED WITH SIGNAL

SIGNAL TYPE: POST, REPLY, ECHO

CONTENT TYPE: TWEET, WALL POST, BLOG, FORUM, VIDEO, COMMENT, PHOTO

SERVICE ACCOUNT ID: IDENTIFIER OF ACCOUNT THAT ORIGINATED THE SIGNAL

ECOSYSTEM ACCOUNT ID: IDENTIFIER ASSIGNED TO THE ANALYTIC SYSTEM ACCOUNT FOR THE ECOSYSTEM CONTAINING THIS SIGNAL

SERVICE: TWITTER, FACEBOOK, YOUTUBE, ETC.

URL: URL TO THE SIGNAL

PARENT SIGNAL ID: IDENTIFIER OF ORIGINAL SIGNAL FOR REPLY OR ECHO SIGNAL

TAGS: HASH TAGS TAGGED TO THE SIGNAL

LINKS: URL LINKS EMBEDDED IN SIGNAL

CONTENT: CONTENT OF SIGNAL.

FIG. 24

ANALYSIS

RATING: OVERALL RATING OF SIGNAL OR ACCOUNT

SIGNAL COUNT: NUMBER OF SIGNALS IDENTIFIED FOR THE ACCOUNT FOR A PARTICULAR TIME PERIOD

RATING_COUNT: NUMBER OF RATINGS ACCOUNT HAS RECEIVED

LIKES: NUMBER OF TIMES THE SIGNAL WAS LIKED

DISLIKES: NUMBER OF TIMES THE SIGNAL WAS DISLIKED

FAVORITES: NUMBER OF TIMES THE SIGNAL FAVORITED

IMPRESSIONS: NUMBER OF TIMES THE SIGNAL HAS BEEN VIEWED

LISTINGS: NUMBER OF TIMES THE SIGNAL HAS BEEN ADDED TO A SIGNAL LIST

MENTIONS: NUMBER OF TIMES AN ACCOUNT OR SIGNAL HAS BEEN MENTIONED

SENTIMENT: A SENTIMENT SCORE BASED ON SENTIMENT CLASSIFIERS (NEGATIVE, NEUTRAL, POSITIVE)

FIG. 28

METHOD AND SYSTEM FOR CORRELATING SOCIAL MEDIA CONVERSIONS

CROSS-REFERENCE TO RELATED APPLICATIONS

The present application is a continuation of U.S. patent application Ser. No. 16/601,300, filed Oct. 14, 2019, which is a continuation of U.S. patent application Ser. No. 15/940,418, filed Mar. 29, 2019, which issued on Nov. 26, 2019 as U.S. Pat. No. 10,489,817, which is a continuation of U.S. patent application Ser. No. 14/336,914, filed Jul. 21, 2014, which issued on May 1, 2018 as U.S. Pat. No. 9,959,548, and claims priority to U.S. Provisional Patent Ser. No. 61/857,527, filed Jul. 23, 2013 and the Ser. No. 14/336,914 application is also a continuation-in-part of U.S. patent application Ser. No. 13/727,991, filed Dec. 27, 2012, which issued on Jun. 19, 2018 as U.S. Pat. No. 10,003,560, which is a continuation-in-part of U.S. patent application Ser. No. 13/708,020, filed Dec. 7, 2012, which issued on Mar. 15, 2016 as U.S. Pat. No. 9,288,123, which is a continuation-in-part of U.S. patent application Ser. No. 13/682,449, filed Nov. 20, 2012, which issued on May 2, 2017 as U.S. Pat. No. 9,641,556, which is a continuation-in-part of U.S. patent application Ser. No. 13/601,151, filed Aug. 31, 2012, which issued on Feb. 2, 2016 as U.S. Pat. No. 9,251,530, which are all herein incorporated by reference in their entirety.

BACKGROUND

Social networks are used by businesses to advertise and market products. For example, a company may use a social network to announce the launch of a new product. Consumers then write blogs, send messages, etc. discussing and reviewing the new product. The product launch may be considered a success or a failure based on the social network interactions surrounding the new product. For example, the product launch may be considered a success when a large number of consumers generate a large number of positive social network reviews about the new product. The product launch may be considered a failure when there is little "buzz" surrounding the launch and only a small number of consumers generate a relatively small number of social network reviews. The product launch also could be considered a failure when a large number of negative reviews are generated about the new product.

Companies face a challenge monitoring and managing social network interactions regarding their products. For example, a large company may have millions of followers on their social networks that send or post millions of messages related to different products. Companies may not have the human resources to manually monitor and manage such large amounts of social network traffic.

Even if companies had the human resources to monitor related social network traffic, it would still be difficult to quantitatively measure the performance of social network marketing campaigns. For example, the marketing campaign may not necessarily be directed to increasing the sales of a specific product, but may be directed to increasing general product awareness. Reviewing a small window of subjective consumer comments sent over social networks may not provide the quantitative analytics needed to clearly determine the success of the product awareness marketing campaign.

BRIEF DESCRIPTION OF THE DRAWINGS

FIG. 23 depicts an example of normalized signal data.

FIG. 24 depicts examples of metadata extracted from the signals.

FIG. 28 depicts an example of metrics generated from the signals.

DETAILED DESCRIPTION

Companies may want to determine the effectiveness of marketing campaigns. For example, a company may launch a social media campaign for a new soft drink. The company may want to track the overall successes of the soft drink campaign, the social media activity initiated by the campaign, overall public impression of the campaign, specific impressions of the campaign by different social groups, the relative success of the campaign compared with campaigns for similar brands within the same company, and/or the relative success of the campaign compared with the campaigns of other companies, etc. Companies also may want to be notified when other companies launch campaigns for similar products or bands.

Figure 1:
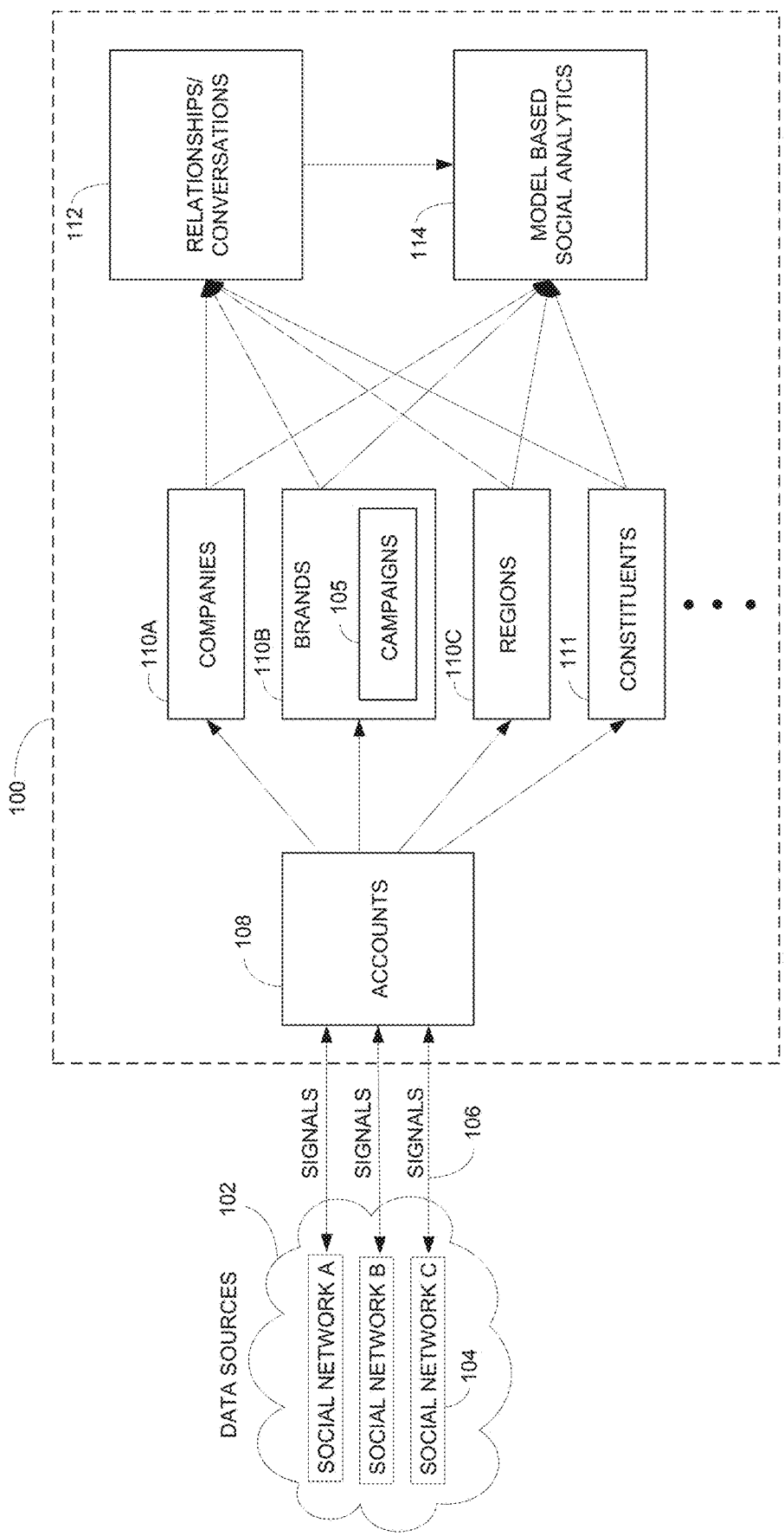
FIG. 1 depicts an example of a social analytic system.

FIG. 1 depicts an example of a model based social analytic system 100 configured to generate quantitative campaign metrics for social media. In one example, data sources 102 may comprise one or more social networks 104, such as Twitter®, Facebook®, YouTube®. Google+®, or the like, or any combination thereof including pre-existing services that aggregate social sources (such as BoardReader®). However, data sources 102 may comprise any computing system or social network that generates or aggregates messages that may be exchanged or reviewed by different users.

Accounts 108 are stored within analytic system 100 and identify corresponding social network accounts within the social networks 104. In one example, analytic system 100 may attempt to identify substantially all of the social network accounts for substantially every major company for a variety of different industries. Accounts 108 also may contain substantially all of the social network accounts for substantially all of the products marketed by each of the companies.

Any combination of computing devices, such as network servers and databases may operate within analytic system 100 and collect signals 106 from Application Programmer Interfaces (APIs) or other collection schemes, including collecting signals 106 from third parties. Signals 106 may contain content and/or metadata for messages sent or posted by the associated network accounts. For example, signals 106 may include the content of a message, the user account information for the social network sending the message, tags identifying the context of the message, a Universal Resource Locator (URL) for the message, a message type identifier, etc.

For explanation purposes, messages may refer to any communications exchanged via a social network 104 and any content or information that may be associated with the communication. For example, messages may comprise posts, blogs, Tweets, re-tweets, sentiment indicators, emails, text messages, videos, wall posts, comments, photos, links, or the like, or any combination thereof.

Accounts 108 and signals 106 may be associated with contextual dimensions, such as companies 110A, brands 110B, geographic regions 110C, etc. The accounts 108 and signals 106 also may be associated with different types of constituents 111, such as advocates, influencers, partners, detractors, employees, spammers, or market participants. Values of contextual dimensions 110A-C may be identified a priori or may be determined from the message content or metadata in signals 106. For example, Universal Resource Locators (URLs) or hash tags within signals 106 may identify a particular brand 110B. In another example, the message content in signals 106 may include keywords that refer to particular brands 110B.

In yet another example, some of the signals 106 associated with brands 110B may also be associated with different brand campaigns 105. For example, a company may create a marketing campaign 105 for a particular product. The analytic system 100 may identify signals 106 associated with campaign 105 and generate analytics identifying the impact of the campaign within social media sites and measuring the relative success of the campaign.

In one example, the signals associated with campaigns 105 may be determined a priori based on URLs or hash tags within signals 106 associated with campaigns 105. In another example, the message content in signals 106 may include keywords that refer to campaigns 105. The campaign keywords may be uploaded manually to analytic system 100 by an operator or the campaign keywords may be automatically generated by analytic system 100.

Constituents 111 may be based on the number and types of messages sent from the associated social network accounts and the metrics associated with the associated social network accounts. For example, a constituent that sends or posts a large number of positive messages related to a particular company may be identified as an advocate of the company. A constituent that has a relatively large number of followers may be identified as an influencer.

Analytic system 100 may identify different relationships 112 between different signals 106, between different accounts 108, and/or between different signals and different accounts. For example, analytic system 100 may identify different on-line conversations 112 associated with brands 110B or campaigns 105. Signals 106 associated with conversations 112 about brands 110B or campaigns 105 may be assigned associated conversation identifiers.

Analytics system 100 may generate different social analytics 114 for brands 110B and/or campaigns 105 based on the associated conversations 112 and constituents 111 participating in conversations 112. For example, analytic system 100 may generate a quantitative score for one of accounts 108 associated with one of campaigns 105 based on the strength of conversations 112 associated with campaign 105. The strength of conversations 112 may be based on the number of signals 106 and number and types of constituents 111 participating in the conversations 112 related to campaigns 105.

Contextual dimensions 110A-C, constituents 111, and relationships 112 allow analytic system 100 to derive quantitative performance scores for a wider variety of different definable entities. The modeling provided by contextual dimensions 110A-C, constituents 111, and relationships 112 also allow more efficient and accurate social analytics generation by identifying and processing signals 106 most relevant to accounts 108 and particular contextual dimensions 110A-C.

Figure 2:
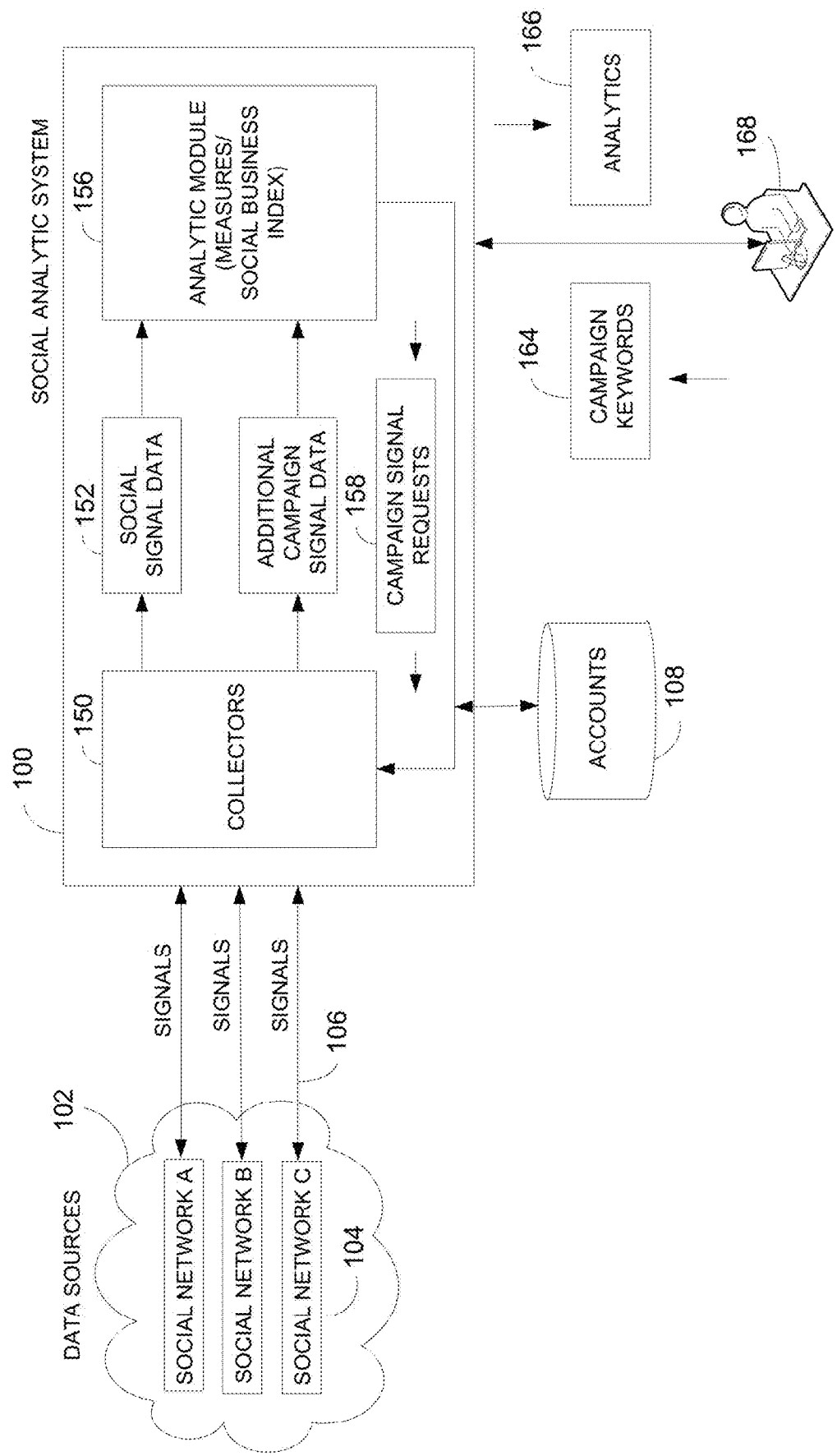
FIG. 2 depicts an example of how the social analytic system generates campaign analytics.

FIG. 2 depicts a more detailed example of analytic system 100. Analytic system 100 may comprise an array of local and/or cloud-based computing and storage devices, such as servers and database systems for accessing and processing data collected from different social networks 104. A computing device 168, such as a personal computer, computer terminal, mobile device, smart phone, electronic notebook, or the like, or any combination thereof may display analytic data. For example, computing device 168 may access and display analytics 166, such as campaign analytics, via a web browser or mobile device application. In other embodiments, some or all of analytics 166 may be generated by computing device 168.

The different computing devices within analytic system 100 may be coupled together via one or more buses or networks. Similarly, analytic system 100 may be coupled to social networks 104 and computing device 168 via one or more buses or networks. The busses or networks may comprise local area networks (LANs), wide area networks (WANs), fiber channel networks, Internet networks, or the like, or any combination thereof.

In one example, analytic system 100 may continuously track social performance for thousands of companies and create one or more accounts 108 for each of the companies. As mentioned above, accounts 108 may be associated with accounts on different social networks 104, such as Twitter® accounts, Facebook® accounts, YouTube® accounts, or any other data source where social signals 106 may be generated.

The accounts on social networks 104 may be operated by companies, individuals, or any other entity.

Analytics system 100 may assign contextual dimension identifiers to accounts 108 identifying the companies, brands, services, individuals, or any other entity operating the associated accounts in social networks 104. One of accounts 108 associated with a company may be referred to as a company account. The company account 108 may have an associated social graph consisting of other related accounts 108. The set of all accounts 108 related to the company account may be referred to as an ecosystem of the company account. The ecosystem for the company account may comprise both a static social graph and a dynamic social graph.

The static social graph may comprise the set of all accounts 108 that either follow or are followed by the company account and may comprise a statically defined relationship between the accounts. For example, an account 108 associated with a brand, campaign, or subsidiary of the company account may be identified as having a static relationship with the company account.

The dynamic social graph may be a set of accounts 108 that have interacted with the company account in some way whether or not there is a static relationship. For example, some of accounts 108 may mention in messages the company associated with the company account or may forward messages to or from the company account.

Analytic system 100 includes collectors 150 and an analytics module 156. Collectors 150 collect signals 106 from the different social networks 104 associated with accounts 108. Analytics module 156 may include a measures module and a social business index module configured to generate metrics from social signal data 152 obtained from social signals 106. Collectors 150, the measures module, the social business index module, and other elements of analytic system 100 are described in more detail in co-pending U.S. patent application Ser. No. 13/727,991 which has been incorporated by reference.

Analytics module 156 may use social signal data 152 to generate different analytics 166 quantitatively identifying social business performance, adoption, and any other social activity. For example, analytics 166 may identify quantitative scores for different companies, social relationships between brands and their engaged audiences of various constituents, and provide real-time benchmarking of campaigns run by industries, companies, brands, competitors, or geographic regions.

Campaign Analytics

In one example, analytics system 156 may receive campaign keywords 164 from computing device 168. For example, an employee of the company (customer) conducting an advertising campaign may manually generate a set of words and phrases that are used in campaign advertising. In another example, analytics module 156 may dynamically derive the campaign keywords 164. Campaign keywords and campaign terms refer to any words, phrases, text, acronyms, links, identifiers, images, audio, or the like, or any combination thereof that may be used to identify signals 106 associated with a social media campaign.

A campaign may be any social media event launched by a company, individual, device, entity, etc. For example, a campaign may be associated with an advertising campaign launching a new product or service. In another example, the campaign may be associated with a public relations event, a political event, a charity or community event, or the like.

Analytic module 156 may identify social signal data 152 associated with the campaign and generate campaign analytics 166 based on identified social signal data 152. Campaign analytics 166 may quantitatively identify the success of the campaign. For example, campaign analytics 166 may identify an amount of increased social media activity associated with the campaign, a relative increase in social media activity compared with other campaigns, an amount of lift that the campaign receives from brand constituents, an overall sentiment towards the campaign, or the like or any combination thereof.

Based on derived campaign analytics and/or campaign keywords 164, analytics module 156 may send campaign signal requests 158 to accounts 108 or collectors 150. Accounts database 108 or collectors 150 may use campaign keywords to identify other social signals 106 associated with the campaigns. For example, analytics module 156 may identify terms uniquely associated with a particular campaign for a particular brand.

Accounts database 108 may identify additional signals associated with the campaign terms and/or collectors 150 may identify additional social network accounts 104 and/or social signals 106 associated with the campaign terms. The additional signals 106 may provide additional social signal data 152 that analytics module 156 uses to provide more accurate campaign analytics 166.

Figure 3:
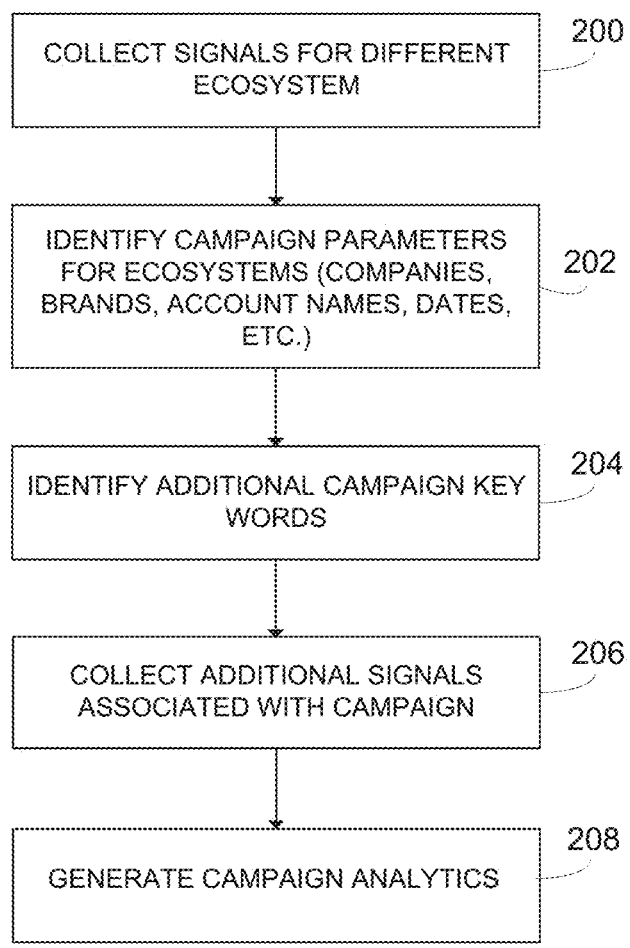
FIG. 3 depicts an example process for generating campaign analytics.

FIG. 3 depicts one example process for generating campaign analytics. In operation 200 the analytics system may collect social signals for different ecosystems and generate different ecosystem metadata. For example, the analytic system may identify the signals associated with a particular ecosystem and identify the relationships of the signals to the ecosystem. For example, the signals may be associated with a company, associated with a constituent of the company, and/or associated with a brand of the company. The relationships identified between signals and some of the analytics generated from the relationships are described in co-pending U.S. patent application Ser. No. 13/727,991 which has been incorporated by reference.

In operation 202, the analytic system may identify parameters associated with a campaign. For example, the analytic system may identify one or more companies, brands, account names, dates etc. that may be associated with a particular campaign. Some of the campaign parameters may be identified a priori by a company employee and other campaign parameters may be dynamically generated by the analytic system. For example, the analytic system may automatically identify social signals associated with a campaign and identify the companies, brands, account names, dates, etc. associated with the identified social signals.

In operation 204, the analytic system may identify campaign keywords. As explained above, the campaign keywords may be received a priori from an employee of a company that wishes to view associated campaign analytics. In a second example, the campaign keywords may be dynamically generated by the analytic system based on analysis of social signal data previously collected in operation 20. For example, the analytic system may dynamically identify terms in the social signal data that may be associated with a particular campaign for a particular brand.

In operation 206, the analytic system may collect additional social signals associated with the campaign. For example, the analytic system may search for previously collected social signals that are associated with any of the campaign parameters identified in operation 202 or that include any of the campaign keywords identified in operation 204. In another example, the analytic system also may collect additional signals from accounts in social networks 104 in FIG. 2 that are associated with the campaign parameters or that include the campaign keywords.

In operation 208, the analytic system may generate campaign analytics associated with campaign signal data. For example, the campaign analytics may identify a campaign, identify an amount of social signal activity associated with the campaign, identify a sentiment for the campaign, rate a success of the campaign, and/or generate any other analytics from the social signal data associated with the campaign.

Figure 4:
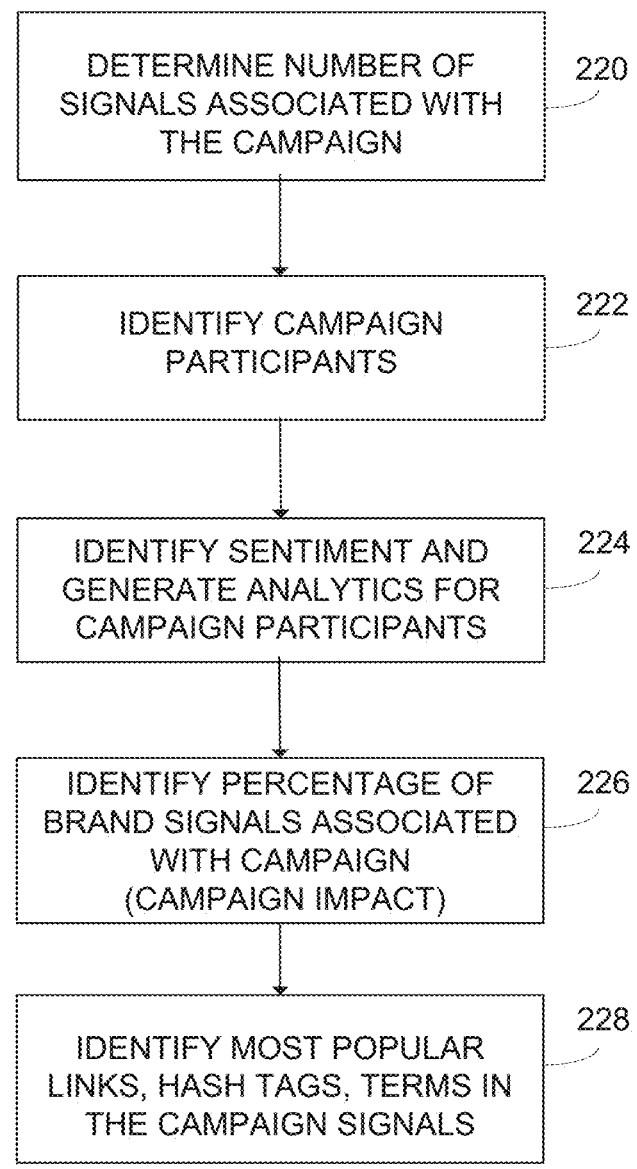
FIG. 4 depicts an example process for determining the social media impact of a campaign.

FIG. 4 depicts an example process for generating campaign analytics. In operation 220, the analytic system may determine the total number of social signals associated with the campaign. For example, the analytic system may count the total number of signals that include campaign keywords or that are associated with the campaign parameters.

In operation 222, the analytic system may identify different campaign participants. For example, the analytic system may identify constituents, such as company, advocates, detractors, employees, market, influencers, etc., that generated the campaign signals.

The analytic system may identify other groups of campaign participants. For example, the analytic system may associate the source of campaign signals with certain demographics such as, age, geographic region, income, sex, etc. The analytic system also may associate the source of the campaign signals with other social groups. For example, the analytic system may identify campaign signals generated by groups referred to as hipsters or techies.

In operation 224, the analytic system may identify the sentiment and generate analytics for the different campaign participants. For example, the analytic system may determine advocates have a generally negative sentiment about the campaign and influencers have an overall positive sentiment about the campaign.

The analytic system may generate other campaign analytics associated with the participants. For example, the analytic system may calculate percentages of different campaign participants by counting a first number of campaign signals associated with a particular one of the participant groups and dividing the first number by a second total number of campaign signals.

In operation 226, the analytic system may identify a campaign impact by determining a percentage of brand signals attributable to the campaign. For example, the analytic system first may identify a total number of signals having parameters or containing keywords associated with a particular car brand.

The analytic system then may identify the percentage of those brand signals associated with a new advertising campaign. For example, the analytic system may count the number of brand signals that include parameters, keywords, links, etc. associated with the campaign.

The ratio between the number of campaign signals associated with the brand and the total number of signals associated with the brand may identify an impact of the advertising campaign on the brand. In other words, a large increase in the overall number of brand signals attributed to the campaign may indicate a successful campaign that created a large social media impact or buzz for the brand. On the other hand, a small increase in the number of brand signals attributed to the campaign may indicate an unsuccessful campaign that created a small social media impact or buzz for the brand.

Operation 228 may identify additional links, hash tags, terms etc. used in the campaign signals. For example, the analytic system may receive a list of campaign terms from a customer. Campaign signals may be identified based on the customer list. The identified campaign signals may identify or contain additional data, such as accounts, terms, links, hash-tags, etc. not contained in the original customer list. The analytic system may the additional data to locate additional social signals and accounts associated with the campaign. The analytic system may update campaign analytics based on the additional signal data.

Figure 5:
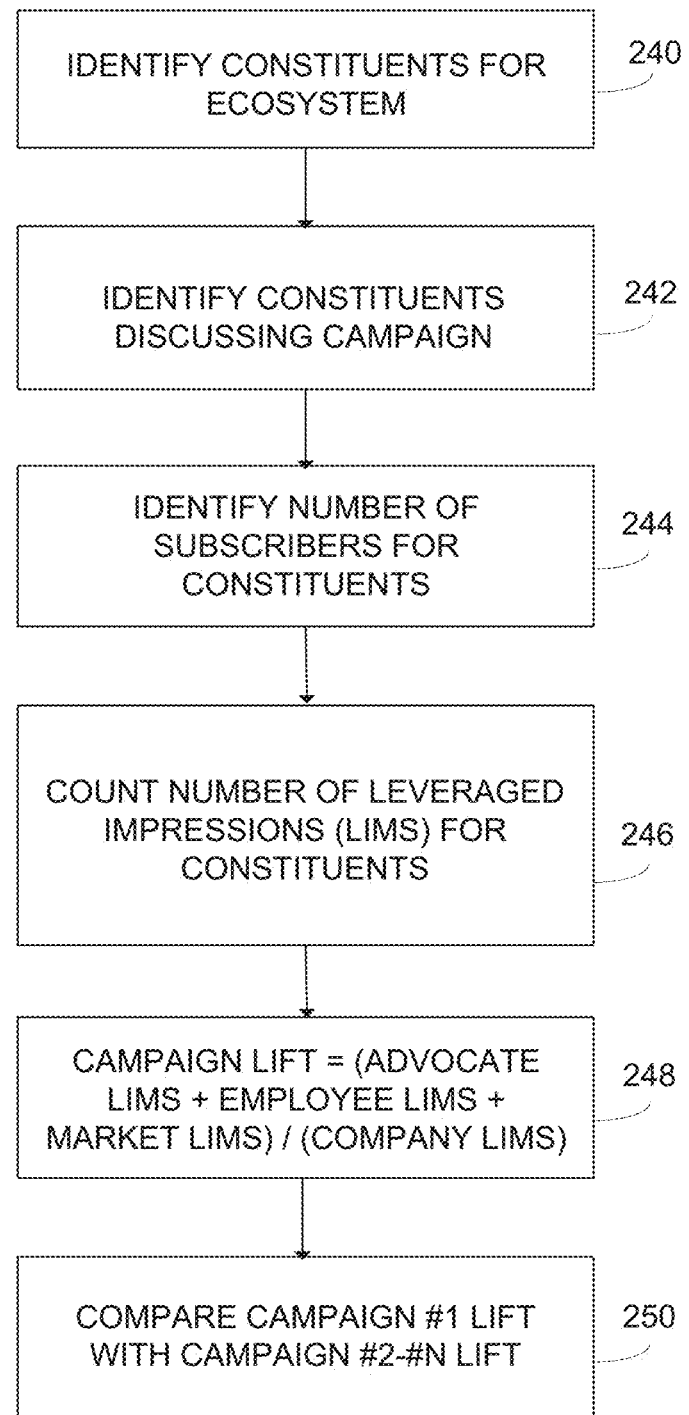
FIG. 5 depicts an example process for determining a constituent lift provided by a campaign.

FIG. 5 depicts an example process for identifying leveraged impressions and lift associated with a campaign. In operation 240, the analytic system may identify constituents for a particular ecosystem. For example, the analytic system may identify all of the company, advocate, influencer, detractor, and market accounts for a car company.

In operation 242, the analytic system may identify the accounts that discussed a campaign for a particular car brand of the car company. For example, the analytic system may identify signals generated by advocates over a two week time period that include campaign terms.

In operation 244, the analytic system may identify the number of subscribers for each of the identified advocate accounts. For example, the analytic system may identify the number of followers on the advocates Twitter® accounts.

In operation 246, the analytic system may identify a number of leveraged impressions (LIMS) for each of the constituent accounts. For example, the analytic system may identify each advocate that generates, forwards, or mentions social signals associated with the campaign. The analytic system identifies the total number of subscribers for all of the identified advocates as the advocate LIM.

Operation 248 may derive a campaign lift from the constituent LIMs. For example, the analytic system may sum the campaign LIMS for advocates, employees, influencers, and/or market constituents. The sum may be divided by the LIMs associated with the company. This ratio may indicate additional social media exposure or "lift" provided by constituents beyond the social media activity provided by the company.

Operation 250 may compare the lift for different campaigns. For example, a first lift may be calculated for a first marketing campaign for a car brand. The first lift may be compared with a second lift calculated for a second marketing campaign for the same car brand. The comparison may indicate the relative success of the first and second campaigns. In another example, the lift for a first campaign for a first car brand may be compared with the lift for other campaigns for other car brands sold by other competitor car companies. The comparison may indicate a relative success of the first campaign within a particular industry.

Brand Vocabulary

Figure 6:
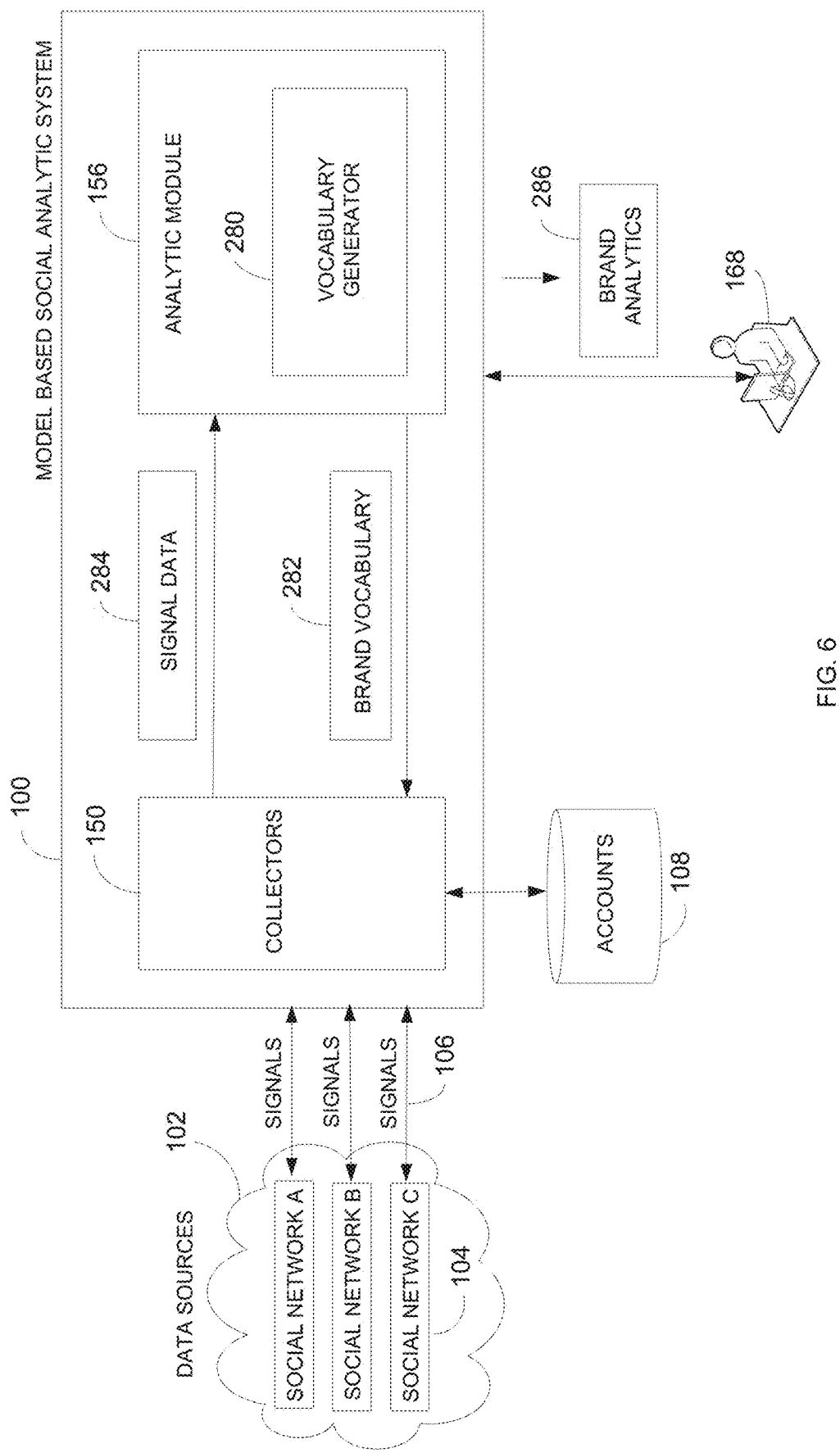
FIG. 6 depicts an example of a social analytic system that generates brand vocabularies.

FIG. 6 depicts an example of a vocabulary generator 280 used in the social analytic system 100. Vocabulary generator 280 is described below as generating a brand vocabulary, but may generate vocabularies for any category of social signals, such as for a campaign, a company, a constituent, a product, a service, an entity, an issue, etc.

As mentioned above, analytic system 100 may receive terms a priori associated with a particular brand or a particular campaign. For example, the customer operating computing device 168 may manually upload a set of keywords associated with a particular brand or a particular campaign. Analytic module 156 may use the keywords to identify signals associated with the brand or brand campaign and generate associated analytics.

The customer may not know all of the keywords used by constituents when discussing a particular brand or campaign. Terms used for describing brands also may change over time or may change in response to different campaigns. For example, a campaign for a car brand may refer to a Bluetooth) feature. The customer may not have the resources to constantly track of all of the new terms used by constituents or used in campaigns for describing every company brand.

Vocabulary generator 280 may dynamically identify the terms currently associated with brands, campaigns, or any other social media activity. For example, vocabulary generator 180 may automatically and dynamically identify Bluetooth® as a new term used by constituents when discussing the car brand.

Vocabulary generator 280 may generate brand vocabulary 282 from the social signals 106 associated with the brand or campaign. Analytic system 100 may use brand vocabulary 282 to identify other signal data 284 in accounts 108 or in social networks 104 associated with the brand or campaign. Analytic module 156 may use signal data 284 to generate brand or campaign analytics 286.

Figure 7:
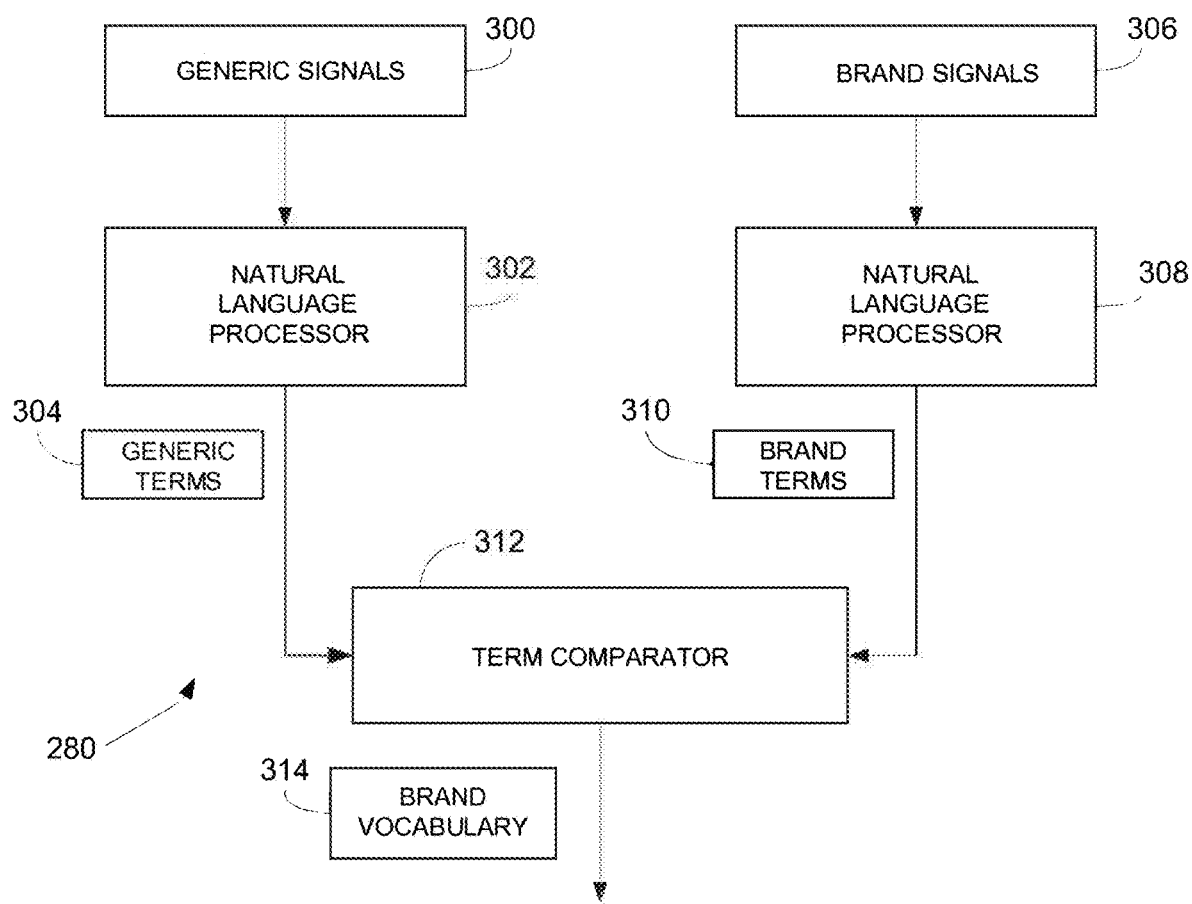
FIG. 7 depicts an example of how social signal terms are used for generating a brand vocabulary.

FIG. 7 depicts one example of how the vocabulary generator may generate a brand vocabulary. Generic signals 300 may comprise all of the signals associated with a particular ecosystem. In another example, generic signals 300 may comprise all of the signals associated with a particular brand, subject, product, service, etc. For example, generic signals 300 may comprise all of the social signals associated with basketball shoes manufactured by a particular company or all of the social signals associated with basketball shoes manufactured by all companies.

Brand signals 306 may comprise all of the signals associated with a particular brand. For example, the analytic system may collect all of the signals associated with a particular basketball shoe account operated by a particular shoe company. The analytic system also may collect signals from constituents of the basketball shoe account and collect any other social signals that mention the basketball shoe brand or contain links or hash tags referencing the basketball shoe brand.

A natural language processor 302 may identify generic terms 304 in generic signals 300. A natural language processor 308 may generate brand terms 310 in brand signals 306. For example, natural language processor 302 may identify sentence structures for text within generic signals 300, identify nouns within the sentences, identify frequently used words within the signal text, identify distances between the most frequently used words to identify common phrases within the text, etc.

Natural language processors 302 and 308 also may use clustering algorithms or any other processing techniques to identify terms 304 and 310 identifying the context of generic signals 300 and brand signal 306. Natural language processors are known and therefore not described in further detail. Other techniques for identifying the context of a group of signals is described in co-pending U.S. patent application Ser. No. 13/727,991 which has been incorporated by reference.

A term comparator 312 may compare generic terms 304 with brand terms 310. Any brand terms 310 that match generic terms 304 may be filtered. For example, terms that exist both in generic terms 304 and brand terms 310 may generically refer to basketball shoes but may not have a strong association with the basketball shoe brand associated with brand signals 306. Accordingly, the generic basketball shoe terms 304 are removed from brand terms 310. The remaining filtered brand terms 310 are referred to as a brand vocabulary 314 and may represent a unique vocabulary used by constituents to discuss a particular basketball shoe brand.

Brand vocabulary 314 may include terms that were not previously known by the company that sells the brand. For example, the customer operating computing device 168 in FIG. 6 may not be aware of particular phrases or sports figure associated with the basketball shoe brand.

As mentioned above, vocabulary generator 280 may identify any variety of social media vocabularies used for discussing companies, industries, products, brands, campaigns, events, issues, etc. For example, signals 300 may be associated with a particular company brand and signals 306 may be associated an advertising campaign for the brand. Term comparator 312 may compare brand terms 310 with generic terms 304 to identify the unique terms associated with the campaign.

Figure 8:
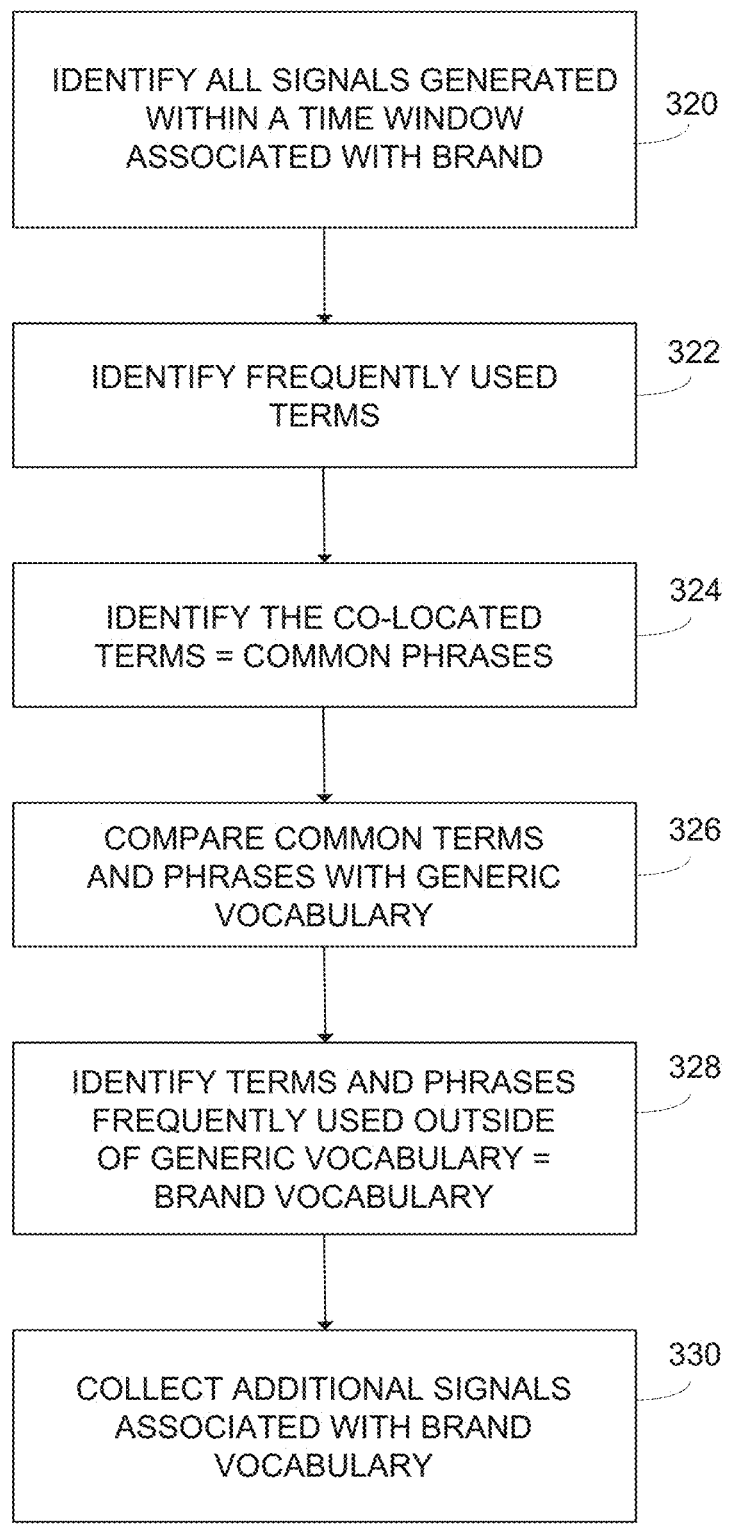
FIG. 8 depicts an example process for generating a brand vocabulary.

FIG. 8 depicts an example process for generating a brand or campaign vocabulary. Operation 320 identifies all of the social signals associated with a particular brand. The signals may be generated by the company selling the brand and brand constituents, such as company employees, advocates, market, etc. In one example, the signals are collected for a particular time period, such as for the last month, last day, etc. Periodically, updating the brand signals allows the vocabulary generator to dynamically update the brand vocabulary currently being used by brand constituents.

In operation 322, the vocabulary generator may identify frequently used terms in the brand signals. As mentioned above, the vocabulary generator may count the number of times particular words are used in the brand signals and identify the most frequently used words. Operation 324 may identify co-located terms. For example, words frequently used within a same sentence or within a particular number of words of each other may be identified as common phrases.

Operation 326 compares the identified brand terms and phrases with a generic vocabulary, such as a generic vocabulary for the company or a generic vocabulary for a type of product. For example, if the brand is associated with a car model, the generic vocabulary may be generated from all social signals associated with the car manufacturer or from all social signals associated with a car category, such as hybrids.

Operation 328 identifies the terms and phrases used outside of the generic vocabulary as the brand vocabulary. As mentioned above, the brand vocabulary may identify the terms and phrases that are uniquely associated with the brand. For example, constituents may use a phrase such as "Eco-Series" to identify a particular car brand. The term Eco-Series may not be one of the most frequently used terms in the generic vocabulary but may be one of the most frequently used terms for the car brand. Accordingly, the vocabulary generator may added the term Eco-Series to the brand vocabulary.

Operation 330 may use the brand vocabulary to identify other social signals associated with the brand. For example, collectors may search for additional social signals from internal ecosystem accounts or external social network accounts associated with the phrase Eco-Series. The analytic system may use the additional signals to generate brand analytics.

Figure 9:
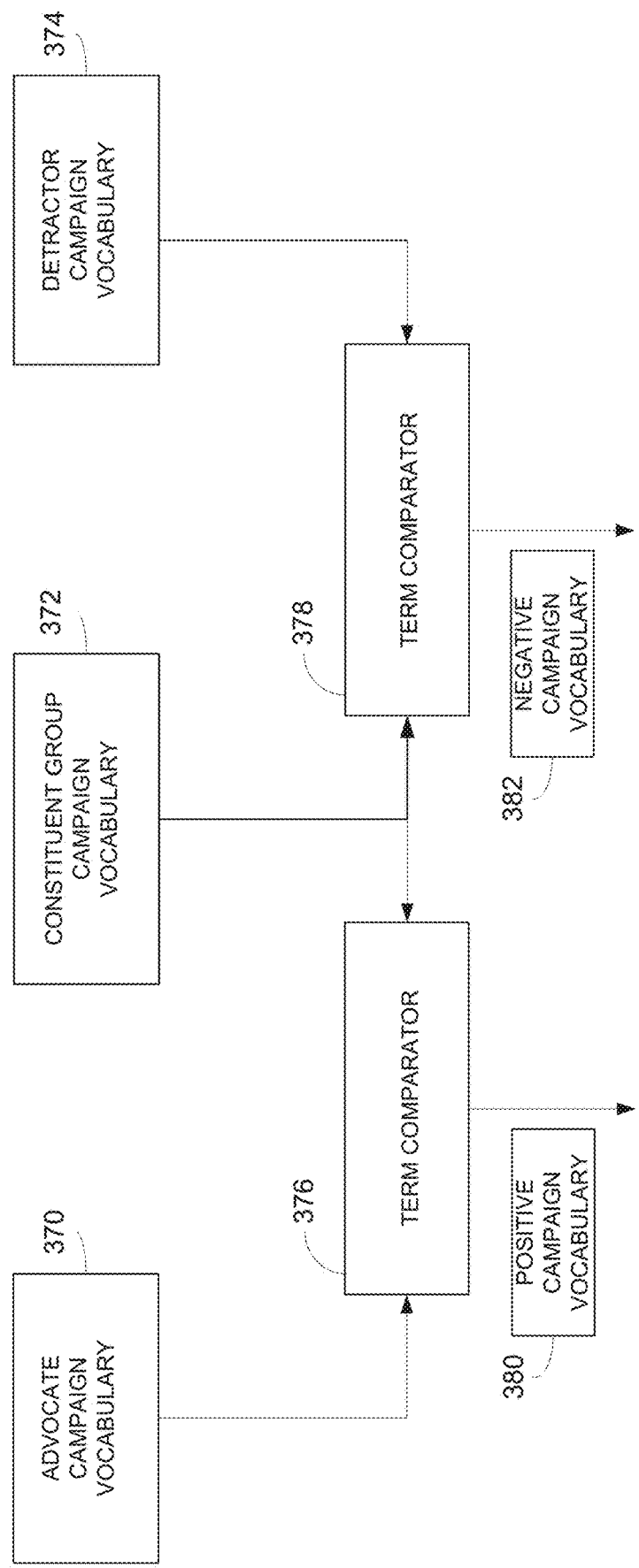
FIG. 9 depicts an example of how a social analytic system identifies a positive and a negative campaign vocabulary.

FIG. 9 depicts one example of how the analytic system may identify positive and negative vocabularies. The analytic system may generate an advocate campaign vocabulary 370, an overall constituent group campaign vocabulary 372, and a detractor campaign vocabulary 374. A constituent group may comprise all of the constituents associated with a particular ecosystem and constituent group campaign vocabulary 372 may be generated as described above from the constituent group social signals associated with a particular brand campaign.

Advocate campaign vocabulary 370 may comprise the terms most frequently used by advocates when referring to the campaign. For example, the vocabulary generator may identify all of the signals generated by advocates that are associated with the campaign. The vocabulary generator then may compare the most frequently used advocate terms with the most frequently used terms for all constituents. The unique advocate terms may be identified as advocate campaign vocabulary 370.

The vocabulary generator also may identify all of the signals generated by detractors that are associated with the campaign. The vocabulary generator then may compare the most frequently used detractor terms with the most frequently used terms for all constituents. The unique detractor terms may be identified as detractor campaign vocabulary 374.

A term comparator 376 may identify the terms in advocate campaign vocabulary 370 that are not also part of constituent group campaign vocabulary 372 as positive campaign vocabulary 380. Positive campaign vocabulary 380 may identify campaign terms and phrases that are positively received by the constituents.

A term comparator 378 may identify the terms in detractor campaign vocabulary 374 that are not also part of constituent group campaign vocabulary 372 as negative campaign vocabulary 382. Negative campaign vocabulary 382 may identify campaign terms and phrases that are negatively received by the constituents.

Positive campaign vocabulary 380 may be used to increase the success of campaigns. For example, positive campaign vocabulary 380 may include the phrase Bluetooth® and may identify a brand of stereo system used in cars. The company may emphasize Bluetooth® and the identified brand of stereo system in future car campaigns.

Negative campaign vocabulary 382 also may be used to increase the success of campaigns. For example, negative campaign vocabulary 382 may include the phrase fuel economy. The company may avoid discussing or deemphasize vehicle fuel economy in future car campaigns.

Figure 10:
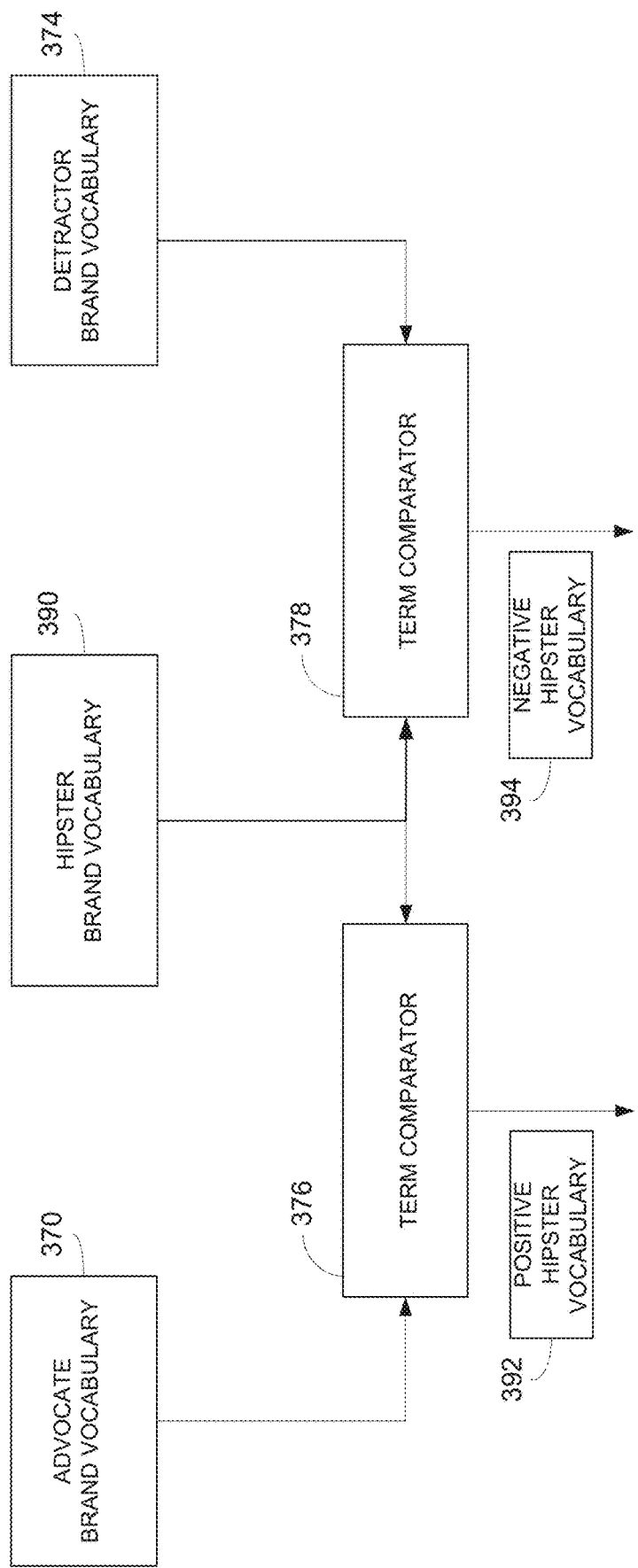
FIG. 10 depicts an example of how the social analytic system identifies a positive and negative campaign vocabulary for a particular social group.

FIG. 10 depicts an example of how brand vocabularies may be used for customizing campaigns for different demographic or social groups. In this example, the social group is referred to as hipsters and may be associated with persons within a particular age range, that may purchase particular types of products or services, have particular interests, and live within particular geographic or urban regions, etc.

The vocabulary generator may generate a hipster brand vocabulary 390. For example, the analytic system may identify social media accounts where users classify themselves in user profiles as hipsters. The analytic system also may identify followers of particular products, services, music, issues, or accounts associated with any of hipster social group. The analytic system also may receive terms a priori from the company associated with hipsters.

The analytic system then may identify the social signals associated with the hipster parameters that are also associated with a particular brand. The vocabulary generator may compare the most frequently used terms in the hipster brand related signals and with the most frequently used terms for all brand related signals (generic brand signals). The vocabulary generator may identify the most frequently used terms in the hipster signals that are not also contained in the generic brand related signals as hipster brand vocabulary 390.

As described above the vocabulary generator also may generate an advocate brand vocabulary 370 comprising the most frequently used terms for brand advocates and a detractor brand vocabulary 374 comprising the most frequently used terms for brand detractors.

Term comparator 376 may generate a positive hipster vocabulary 392 identifying the common terms in advocate brand vocabulary 370 and hipster brand vocabulary 390. Positive hipster vocabulary 392 may identify terms and items appealing to the hipster social group. For example, the phrase "checkered tennis shoes" may appear in positive hipster vocabulary 392.

Term comparator 378 may identify common terms in detractor campaign vocabulary 374 and hipster brand vocabulary 390 as a negative hipster vocabulary 394. Negative hipster vocabulary 394 may identify terms and phrases that are viewed negatively by hipsters.

Positive hipster vocabulary 392 and negative hipster vocabulary 394 may be used to increase the success of brand campaigns directed to hipsters. For example, the company may emphasize terms or items identified in positive hipster vocabulary 392 in hipster advertising campaigns. Conversely, the company may avoid using the terms or items identified in negative hipster vocabulary 394 in the hipster advertising campaigns.

Thus, the analytic system can use vocabularies generated by the vocabulary generator to identify more relevant social signals for brands, campaigns, etc. and can use the social signals to generate more accurate social media analytics. The analytic system also can use the vocabularies to automatically identify different words, terms, phrases, etc. that may improve the success of social media campaigns.

Figure 11:
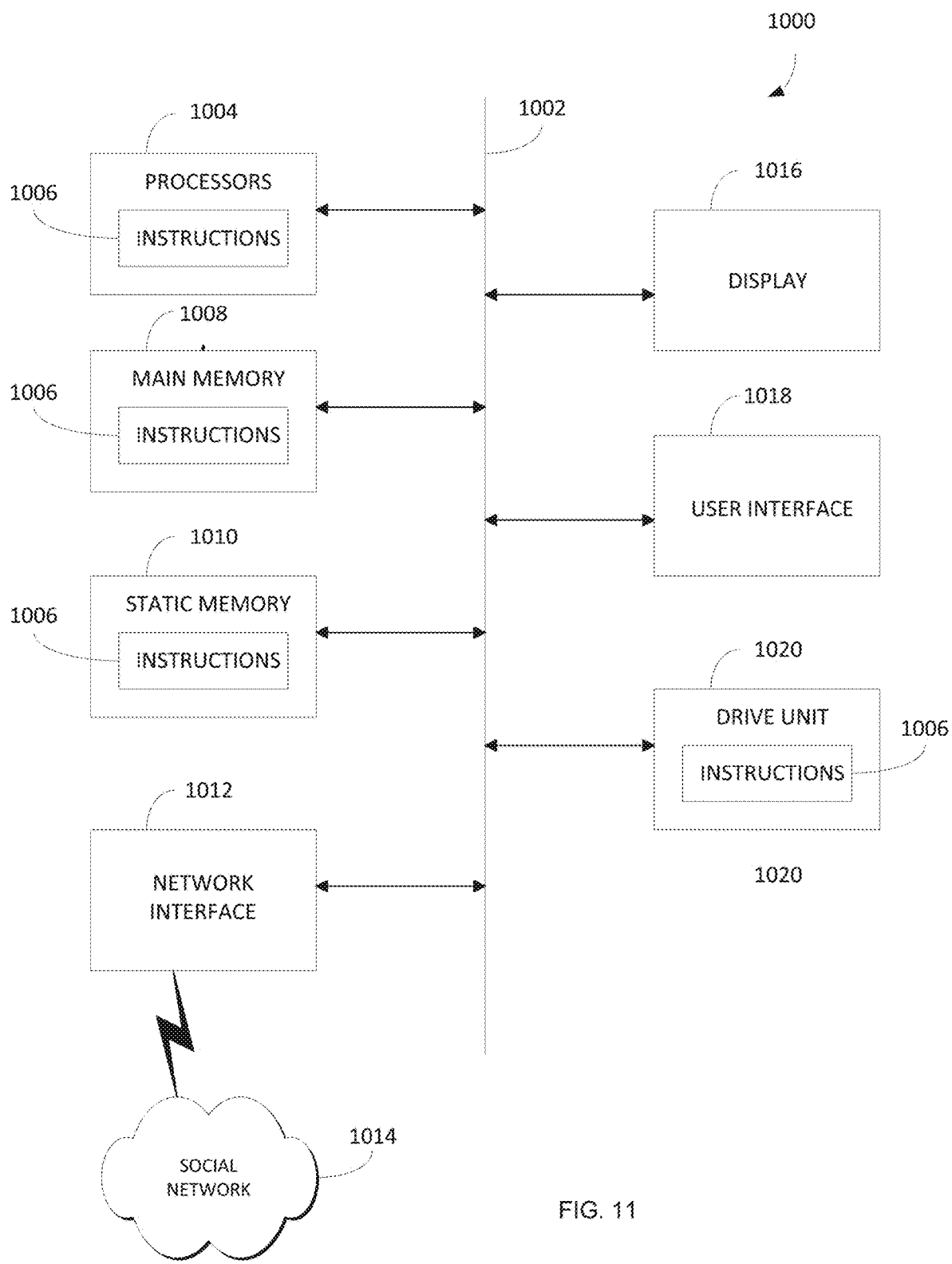
FIG. 11 depicts an example of a computing device used for implementing the social analytic system.

FIG. 11 shows a computing device 1000 that may be used for operating the social analytic system and performing any combination of the social analytics discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

Correlating Social Media Conversations

Social networks are used by businesses to advertise and market products. For example, a company may use a social network to announce the launch of a new product. Consumers then write blogs, send messages, etc. discussing and reviewing the new product. The product launch may be considered a success or a failure based on the social network interactions surrounding the new product. For example, the product launch may be considered a success when a large number of consumers generate a large number of positive social network reviews about the new product. The product launch may be considered a failure when there is little"buzz" surrounding the launch and only a small number of consumers generate a relatively small number of social network reviews. The product launch could also be considered a failure when a large number of negative reviews are generated about the new product.

Companies face a challenge monitoring and managing social network interactions regarding their products. For example, a large company may have millions of followers on their social networks that send or post millions of messages related to different products. Companies may not have the human resources to manually monitor and manage such large amounts of social network traffic.

Even if companies had the human resources to monitor related social network traffic, it would still be difficult to quantitatively measure the performance of social network marketing campaigns. For example, the marketing campaign may not necessarily be directed to increasing the sales of a specific product, but may be directed to increasing general product awareness. Reviewing a small window of subjective consumer comments sent over social networks may not provide the quantitative analytics needed to clearly determine the success of the product awareness marketing campaign.

A model-based social analytic system collects social signals for an expansive range of different industries in accordance or consistent with applicable laws or terms. Analytics are derived from the social signals and used as benchmarks for comparing social network performance relative to particular industries, companies, brands, competitors, geographic regions, etc.

The model-based approach used by the social analytic system identifies unique relationships between different social network accounts and social signals. For example, the analytic system may identify conversations related to a particular topic or brand and may distinguish between different constituents participating in the conversations. The analytic system may then derive quantitative analytics for the different industries, companies, brands, geographic regions, etc. based on the related conversations and constituents. The social analytic system can more efficiently derive more accurate quantitative analytics by uniquely identifying and analyzing the social signals that are most relevant to the social network performance of a particular entity.

Figure 12:
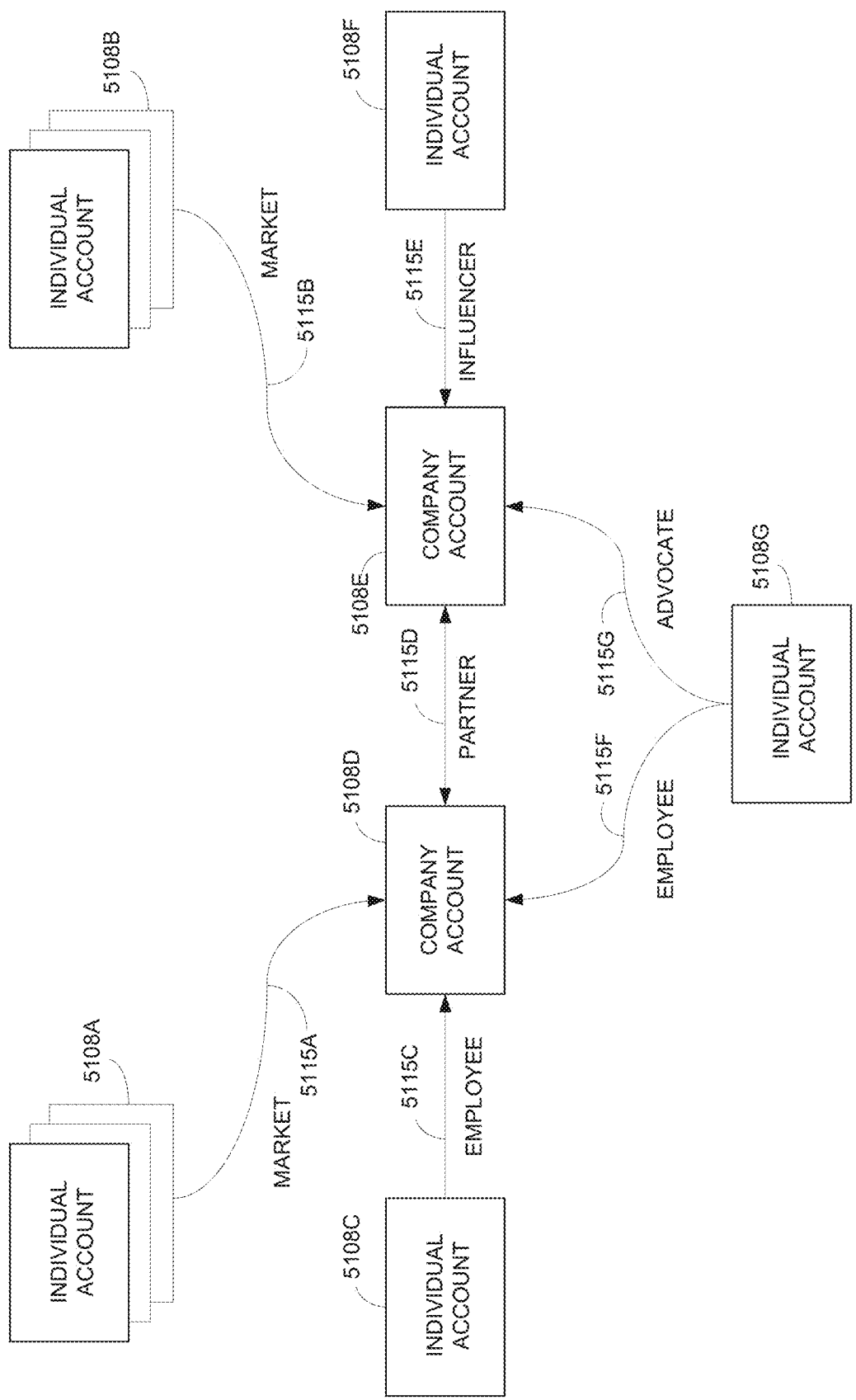
FIG. 12 depicts an example of how constituent relationships are associated with different accounts.

FIG. 12 depicts a conceptual diagram showing in more detail constituent relationships between different accounts. It should be understood that this is just one example of how social data may be modeled by the analytic system. Accounts 5108D and 5108E may represent social network accounts operated by companies. For example, a car company may operate account 5108D. Accounts 5108D and 5108E may be identified by the analytic system as having a partner relationship 5115D. For example, account 5108E may be a wholesale or retail company that sells cars for the car company operating account 5108D.

Accounts 5108A may represent social network accounts operated by individuals. For example, one of accounts 5108A may be operated by a consumer that has purchased a vehicle from the car company associated with company account 5108D. The analytic system may identify individual accounts 5108A as having a market relationship 5115A with company account 5108D. For example, the analytic system may identify individual accounts 5108A that have sent, posted, or viewed messages related to company account 5108D. The analytic system may identify other individual accounts 108B that have market relationships 5115B with company account 5108E.

The analytic system also may identify employee relationships 5115C between individual accounts 5108C and company account 5108D subject in all cases to compliance with applicable laws and regulations. For example, individual accounts 5108C may be operated by employees of the company operating company account 5108D.

Individual account 5108F may be identified as having an influencer relationship 5115E with company account 5108E. Similarly as for market relationships 5115A and 5115B, the analytic system may determine that account 5108F generates messages, views messages, or has other types of interactions related to company account 5108E.

However, individual account 5108F may have a greater influence in the social network than individual accounts 5108A and 5108B having market relationships 5115A and 5115B, respectively. For example, individual account 5108F may be identified as having a large number of followers or subscribers in the social network and therefore may be identified as having an influencer relationship 5115E with company account 5108E. The market relationships associated with individual accounts 5108A and 5108B may have been determined to have a fewer number of followers or subscribers that personal accounts with influencer relationships.

Individual account 5108G may be identified as having both an employee relationship 5115F with company account 5108D and an advocate relationship 5115G with company account 5108E. For example, individual account 5108G may be operated by an individual employed by the company operating company account 5108D. The employee also may send or post a large number of messages about the company operating company account 5108E. The analytic system may determine that the messages generated by individual account 5108G related to company account 5108E have an overall positive sentiment. Accordingly, the analytic system may identify an advocate relationship 5115G between individual account 5108G and company account 5108D.

Advocate relationships 5115G may be different from influencer relationships 5155E. Influencer relationships 5115E may have some large number of interactions with different accounts but may not necessarily have a large number of interactions specifically with company account 5108E. For example, individual account 5108F may send or post a large number of messages about a large number of topics, but not necessarily send or post a large number of messages to or about company account 5108E. However, as mentioned above, individual account 5108F may have a relatively large number of followers. On the other hand, individual account 5108G having advocate relationship 5115G may send or post a relatively large number of positive messages to or about company account 5108E. However, individual account 5108G may have a relatively small number of followers or subscribers.

Distinguishing between influencer relationships and advocate relationships may provide valuable analytics for the company operating company account 5108E. For example, the company may want to increase or direct more social network interactions or attention to individual account 5108F (influencer account) in order to persuade the individual operating individual account 5108F to start sending or posting more positive messages about the company.

These directed interactions with individual account 5108F may result in a larger positive impact on the social network rating for company account 5108E than increasing interactions with individual accounts 5108A or 5108B (market accounts) or individual account 5108G (advocate account). Individual account 5108F has been determined to have a relatively large number of subscribers. Therefore, causing individual account 5108F to generate more positive messages about company account 5108E may have a relatively large positive impact within the social network.

The analytic system has already determined that advocate account 5108G generates a relatively large number of positive messages related to company account 5108E and has also determined that individual account 5108G has fewer followers than individual account 5108F. Thus, increasing interactions with individual account 5108G may not substantially increase the number of positive messages generated by individual account 5108G, increase the number of other social network participants viewing positive messages regarding company account 5108E, or increase in the overall social network performance of company account 5108E.

Figure 13:
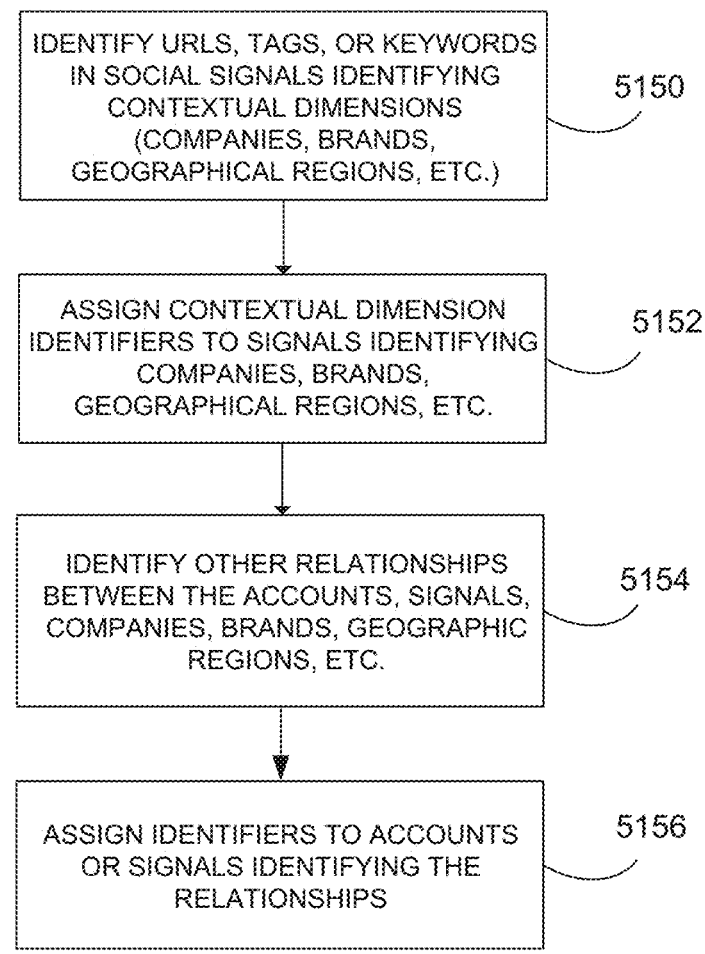
FIG. 13 depicts an example of how contextual dimensions and relationships are identified for different accounts and signals.

FIG. 13 depicts one example of a process for identifying and assigning contextual dimensions to accounts and/or signals and identifying other relationships between the contextual dimensions and other accounts and signals. In operation 5150, the analytic system may identify metadata in the signals identifying different contextual dimensions. For example, the signal may include a URL that identifies a particular company, brand, and/or geographic region. For example, the URL may have the following format:

http://www.social_network.com/company/brand.

The signals may contain other tags that identify the contextual dimension. For example, the signal may include a mention field, hash tag, etc. that identifies the company or brand related to the associated message content. In operation 5152, the analytic system may assign a unique contextual dimension identifier to the signal identifying the company or brand.

Alternatively, the analytic system in operation 5150 may identify keywords in the content of the signals that identify the associated contextual dimension. For example, a user of an account may post or send a message that discusses a particular company, brand, etc. The analytic system may compare keywords in the message with keyword topic clusters associated with the company and/or brand. In operation 5152, signals may be assigned contextual dimension identifiers associated with the matching keyword topic clusters.

In operation 5154, the analytic system may identify other relationships between the accounts, signals, and/or contextual dimensions. For example, the analytic system in operation 5154 may identify the types of constituents associated with the signals. For example, a company X may send or post a message about one of their brands Y. In operation 5152, the analytic system may assign a first identifier to the signal identifying the contextual dimension for the signal as brand Y and in operation 5156 may assign a second identifier to the signal identifying company X as the sender or poster of the message.

In another example, an employee of company X may send or post a message about brand Y. The analytic system in operation 5152 may assign a first identifier to the signal identifying a contextual dimension for the signal as relating to brand Y and in operation 5156 assign a second identifier to the signal identifying the sender or poster of the message as an employee of company X. The employee relationship between the signal and brand Y may be determined a priori from information provided by the company or may be determined by the analytic system from the URL for the signal that may indicate the signal was sent from an employee account for company X.

In yet another example, a message may be sent or posted from an account that is not directly associated with company X. For example, a consumer may send or post a message related to brand Y. In operation 5154, the analytic system may identify the relationship between the consumer account and the company X based on the number and/or types of signals generated from the consumer account. As explained above, the analytic system may identify the consumer account as an advocate of the company X account when the consumer account generates a large number of positive sentiment messages related to company X.

Figure 14:
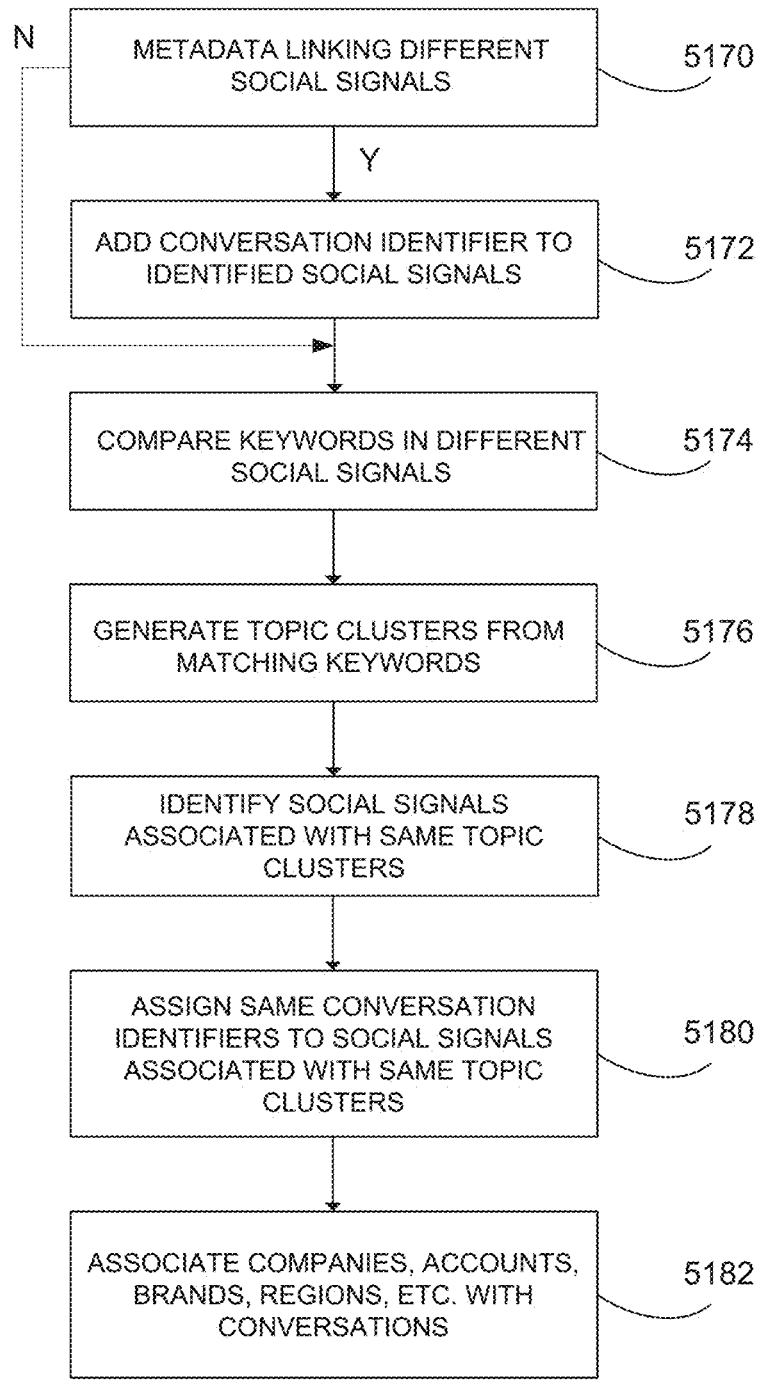
FIG. 14 depicts an example of how a conversation is associated with an account.

FIG. 14 depicts in more detail one example of how signals are associated with a same conversation. Users of social networks may conduct conversations regarding different topics. For example, a user may send or post messages regarding the release of a new film. Other users then may respond to the original message and other users may respond to the responses. The responses may repeat the original message, add links to additional information related to the conversation, and/or provide sentiments regarding the conversation topic.

The analytic system relates the communications together as a conversation, identifies the account and contextual dimension related to the conversation, and then generates analytics for the account based on the conversation.

In operation 5170, metadata may be identified that associates social signals with a particular conversation. For example, a social network such as Twitter® may embed tags into signals identifying the message as a re-tweet of a prior Tweet message. In operation 5172, the analytic system may assign a same conversation identifier to the original Tweet message and the re-tweet message.

The analytic system may analyze the content of the message to discover signals related to the same conversation. For example, the words used in different messages may be compared in operation 5174 and topic clusters may be generated from the matching keywords in operation 5176. In operation 5178, content in the social signals may be compared with the keywords for the topic clusters. Social signals matching the same topic cluster may be associated with a same conversation. In operation 5180, the social signals associated with the same conversation may be assigned a same conversation identifier.

In operation 5182, the conversations may be associated with different contextual dimensions. For example, conversations may be associated with different companies, brands, geographic regions, etc. The signals may be assigned additional identifiers identifying the contextual dimension related to the associated conversation.

Figure 15:
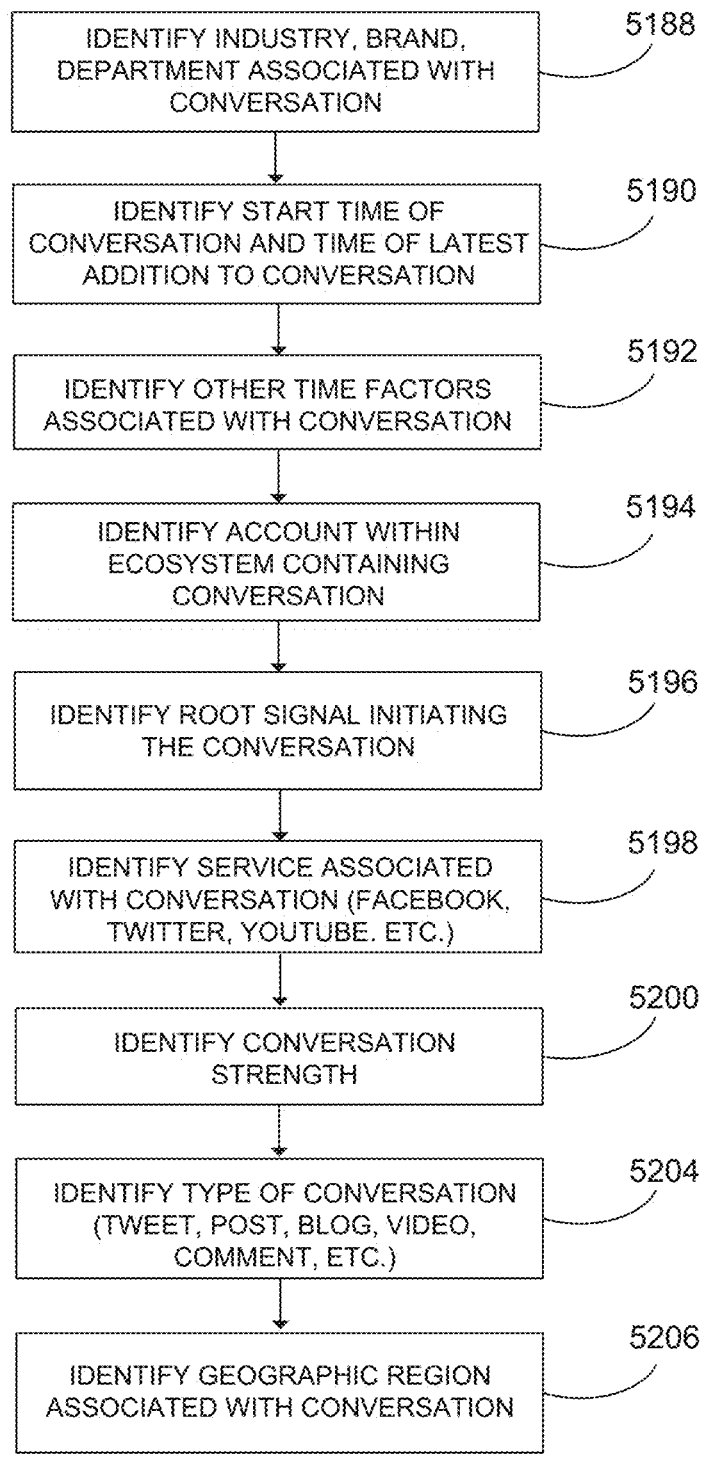
FIG. 15 depicts an example process for associating different parameters with a conversation.

FIG. 15 depicts an example process for associating other metrics with conversations. In operation 5188, a contextual dimension may be associated with the conversation. For example, as mentioned above, the conversation may be associated with a company, brand, service, industry, etc.

In operation 5190, a start time and a time of a latest addition to the conversation may be identified. In operation 5192, other time factors may be identified for the conversation. For example, the number of participants and sentiment of the conversation may be tracked over time.

In operation 5194, an account within an ecosystem containing the conversation may be identified. For example, the conversation may be associated with a particular product and the product may be associated with an account for a particular company. The ecosystem for the company may comprise the explicit followers of the company and all the communications generated within the context of the company accounts that are publicly visible.

In operation 5196, a root signal initiating the conversation may be identified. For example, the conversation may spawn from a product announcement sent or posted by a company. Operation 5198 may identify the social network service associated with the conversation. For example, the conversation may be conducted on a single social network, such as Twitter® or may extend over different social networks such as Twitter®, Facebook®, and YouTube®.

Operation 5200 may identify a strength of the conversation. For example, the analytic system may derive an arithmetic average of the percentiles of average discussion length, company/constituent discussion strengths, total discussions, total signal count, constituent signal counts, and company signal count.

Operation 5204 may identify the type of communications used in the conversation, such as posts, blogs, videos, comments, etc. and operation 5206 may identify a geographic region associated with the conversation. For example, some of the signals associated with the conversation may include videos and most of the signals associated with the conversation may come from accounts located in the United States.

Figure 16:
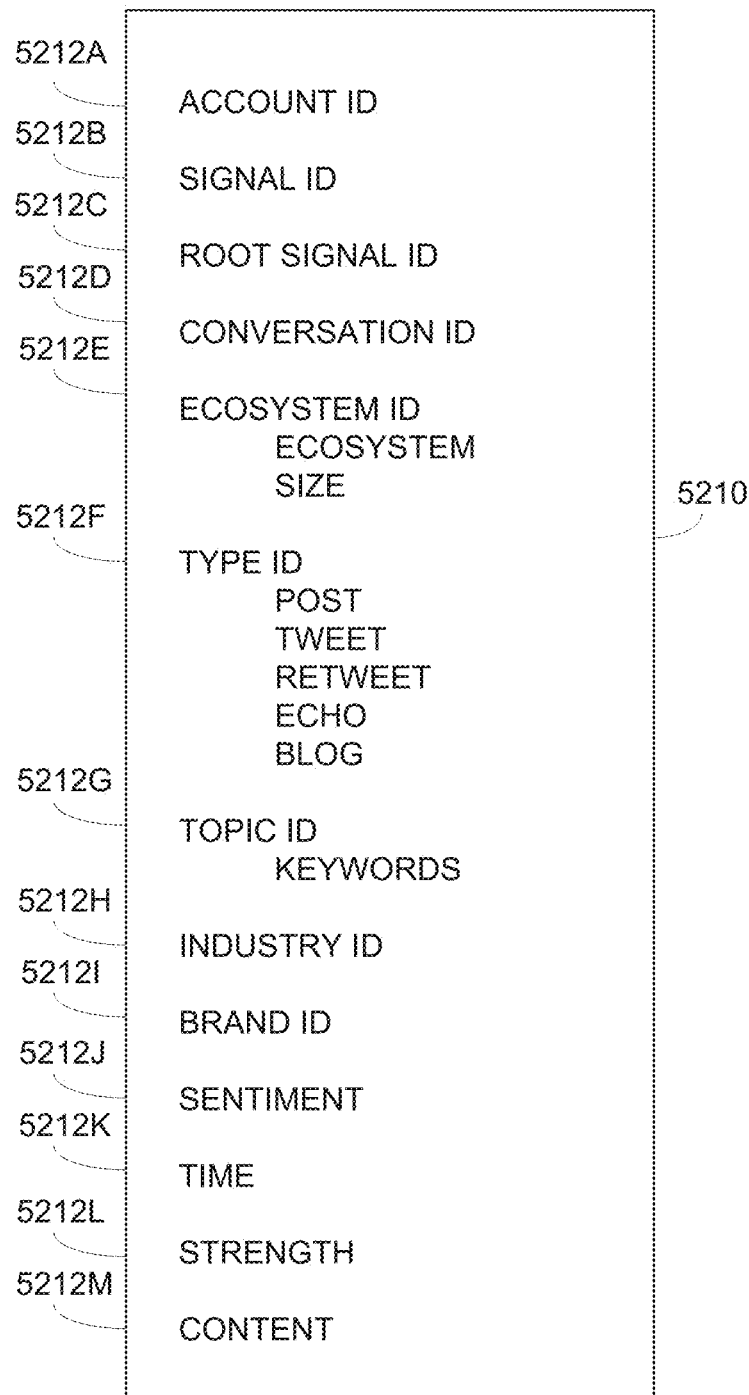
FIG. 16 depicts an example of different contextual dimensions and relationships assigned to a signal.

FIG. 16 depicts an example of the contents of a signal 5210 containing contextual dimension and conversation identifiers. An account identifier 5212A may identify the account in the analytic system associated with signal 5210. A signal identifier 5212B provides a unique identifier for signal 5210 collected from the social network.

A root signal identifier 5212C may identify a signal that started a particular conversation. For example, the root signal may be the message sent or posted by a company announcing a new product release. Conversation identifier 5212D may identify the conversation associated with signal 5210. For example, signal 5210 maybe a message commenting resending, viewing, re-tweeting, mentioning, etc. the new product release message associated with root signal identifier 5212C.

Ecosystem identifier 5212E may identify the ecosystem related to signal 5210. As explained above, the analytic system may identify an ecosystem as an account for a company and all of the explicit followers of the company and all the communications generated within the context of the company accounts that are publicly visible. Any account or signals associated with the ecosystem may be assigned a same ecosystem identifier 5212E and the number of followers in the ecosystem may be identified.

A type identifier 5212F may identify a type of message associated with signal 5210. For example, the message contained in signal 5210 may be a post, tweet, re-tweet, echo, blog, etc. A topic identifier 5212G may comprise a set of keywords identifying a particular topic of the message contained in signal 5210. Any topic can be identified but in one example the topic may be related to a company or brand.

An industry identifier 5212H may identify a particular industry associated with signal 5210. A brand identifier 5212I may similarly identify a brand associated with signal 5210. Again the industry or brand may be identified from metadata contained in the signal 5210 or may be determined from the content of the message contained in signal 5210 using machine learning algorithms.

A sentiment 5212J may identify a sentiment of the message contained in signal 5210. For example, the user generating the message may have assigned a like or dislike sentiment identifier to the message or the content 5212M of their communication may be identified by the system to be variously positive, neutral, negative, or otherwise. A time indicator 5212K may identify when signal 5210 was generated or collected from the social network. Strength value 5212L may identify the strength of the conversation based on the number of other signals and the types of constituents participating in the conversation. Content 5212M comprises the content of the message contained in signal 5210. For example, content 5212M may comprise a text message, links, photos, videos, or the like, or any combination thereof.

Figure 17:
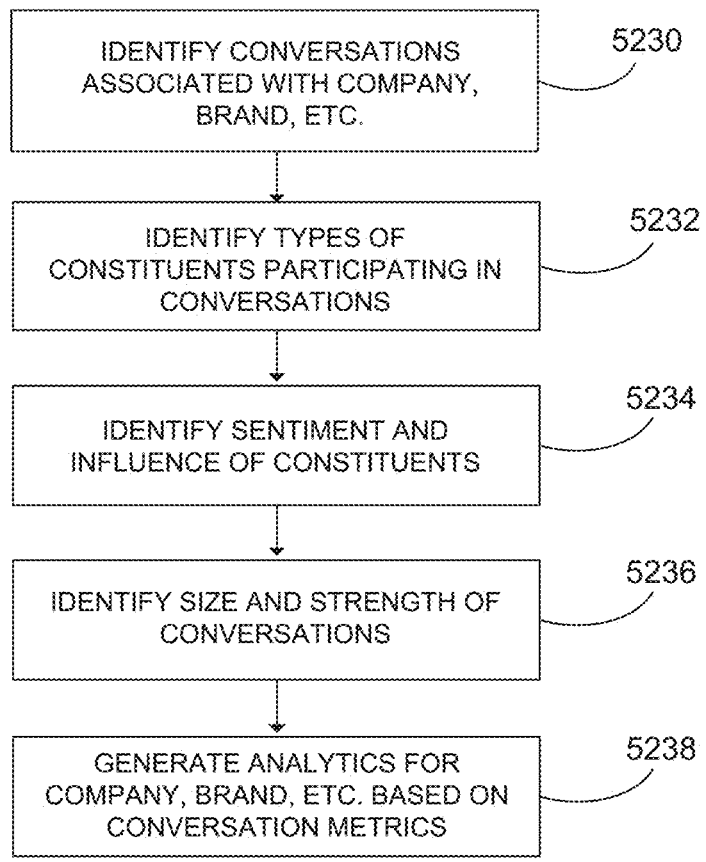
FIG. 17 depicts an example of how analytics may be generated for an account based on an associated conversation.

FIG. 17 depicts one example process for generating analytics for an account based on associated conversations. Again, FIG. 17 shows just one example of any combination of parameters that may be used for generating any type of analytics. In operation 5230, the analytic system may identify conversations for an account associated with a particular contextual dimension. For example, the conversation may be related to a particular product.

In operation 5232, the analytic system may identify the different types of constituents participating in the conversation. In operation 5234, a sentiment and/or influence of the constituents may be identified. As described above, some social networks may allow constituents to attach sentiment ratings to messages. In another example, the analytic system may derive the sentiment ratings from the messages using machine learning algorithms. The sentiments of messages generated by a particular constituent during the conversation may be averaged to determine an overall sentiment for the constituent.

The analytic system may also derive influence values for the constituents. As also mentioned above, the analytic system may identify the number of messages sent or posted by the constituents, the number of followers of the constituents, the number of messages of the constituents resent in other messages, etc. Any combination of these influence factors may be combined to derive influence values for the constituents participating in the conversation.

Operation 5236 may determine the size and strength of the conversations. For example, the analytic system may determine an overall size and strength of the conversations based on the number of constituents participating in the conversation, the influence of the constituents participating in the conversation, the number of messages sent during the conversation, etc.

In operation 5238, the analytic system may generate analytics for an account based on any of the above conversation metrics. For example, the analytic system may generate a quantitative score for a brand associated with the conversation based on any combination of the types and number of constituents, influence and sentiment of the constituents, and overall size and strength of the conversation about the brand.

Figure 18:
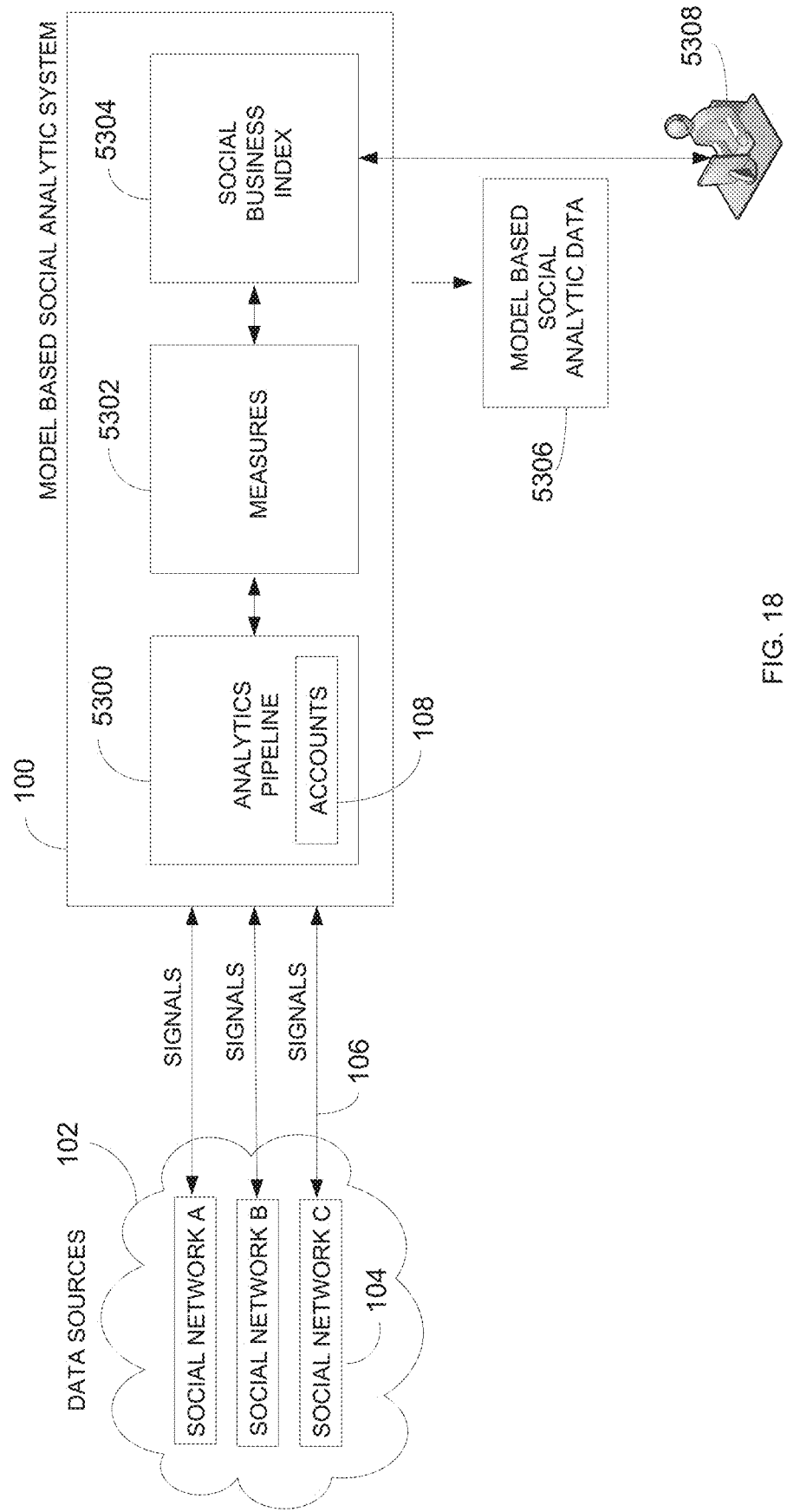
FIG. 18 depicts in more detail an example of a model based social analytic system.

FIG. 18 depicts a more detailed example of the analytic system 100. Analytic system 100 may comprise an array of local and/or cloud-based computing and storage devices, such as servers and database systems for accessing and processing data collected from different social networks 104. A computing device 5308, such as a personal computer, computer terminal, mobile device, smart phone, electronic notebook, or the like, or any combination thereof may be used for viewing the analytic data 5306 generated by analytic system 100. For example, computing device 5308 may access and display analytic data 5306 via a web browser or mobile device application. In other embodiments, some or all of analytic data 5306 may be generated by computing device 5308.

All of the different computing devices within analytic system 100 may be coupled together via one or more buses or networks. Similarly, analytic system 100 may be coupled to social networks 104 and computing device 5308 via one or more buses or networks. The busses or networks may comprise local area networks (LANs), wide area networks (WANs), fiber channel networks, Internet networks, or the like, or any combination thereof.

In one example, analytic system 100 may continuously track social performance for thousands of companies and create one or more accounts 108 for each of the companies. As mentioned above, accounts 108 may be associated with accounts on different social networks 104, such as Twitter® accounts, Facebook® accounts, YouTube® accounts, or any other data source where social signals 106 may be generated. The accounts on social networks 104 may be operated by companies, individuals, or any other entity.

The analytics system 100 may assign contextual dimension identifiers to accounts 108 identifying the companies, brands, services, individuals, or any other entity operating the associated accounts in social networks 104. One of accounts 108 associated with a company may be referred to as a company account. The company account 108 may have an associated social graph consisting of other related accounts 108. The set of all accounts 108 related to the company account may be referred to as an ecosystem of the company account. The ecosystem for the company account may comprise both a static social graph and a dynamic social graph.

The static social graph may comprise the set of all accounts 108 that either follow or are followed by the company account and may comprise a statically defined relationship between the accounts. For example, an account 108 associated with a brand or subsidiary of the company account may be identified as having a static relationship with the company account.

The dynamic social graph may be a set of accounts 108 that have interacted with the company account in some way whether or not there is a static relationship. For example, an account 108 may mention in a message the company associated with the company account or may forward a message from the company account.

The ecosystem for the company account also may be delineated based on constituent type. As mentioned above, examples of constituents may include the company itself, employees, partners, advocates, detractors, market, and influencers. For example, employees may be employees of the company, and partners may be distributors, retailers, or subsidiaries having a business relationship with the company. Advocates may be associated with accounts that frequently generate positive messages about the company and detractors may be associated with accounts that frequently generate negative messages about the company.

Influencers may have a relatively large influence on the social network. For example, influencer accounts may have a large number of social network followers. Market may comprise any other accounts that may send, post, or view messages related to the company.

Analytic system 100 may comprise an analytic pipeline 5300, a measures module 5302, and a social business index module 5304. Analytics pipeline 5300 may comprise software configured to collect signals 106 from the different social networks 104 associated with accounts 108. Measures module 5302 may comprise software configured to generate metrics from the social signal data collected by analytic pipeline 5300. Social business index (SBI) 5304 may comprise software configured to use the data collected and generated by analytics pipeline 5300 and the measures module 5302 to display social analytic data 5306 identifying social business performance, adoption, and any other social activity. For example, social analytic data 5306 may display quantitative scores for different companies, social relationships between brands and their engaged audiences of various constituents, and provide real-time benchmarking for industries, companies, brands, competitors, or geographic regions.

Figure 19:
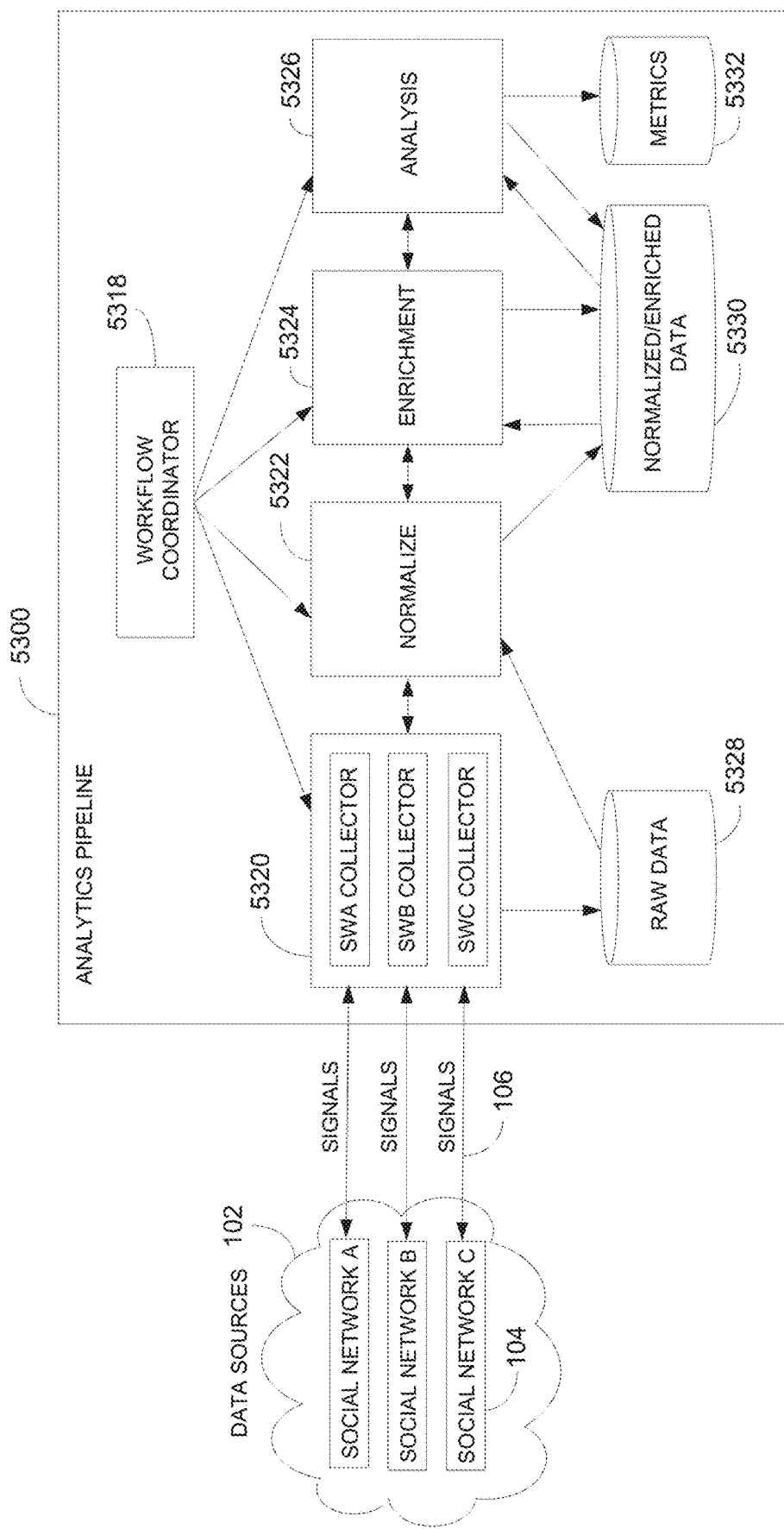
FIG. 19 depicts an example of an analytics pipeline used in the analytic system.

FIG. 19 depicts one example of analytics pipeline 5300 in more detail. Multiple collectors 5320 are configured to interact with various social networks 104 to collect signals 106. Collectors 5320 may collect signals 106 in a native or raw form provided by social networks 104 and store the signals as raw data 5328. Signals 106 may comprise the messages generated from the social network accounts and the metadata associated with the messages. For example, the messages may comprise text, audio, video, links sent or posted from a social network account. The messages may be in any format, such as a blog, post, Tweet, etc.

The metadata associated with the messages may identify any static or dynamic relationship between the social network account and other social network accounts on the same network. For example, static relationship data may identify social network accounts for employees, brands, etc. located under a domain for a company network account. As described above, these static account relationships may alternatively be referred to as the static social graph for the company account.

The metadata may also identify dynamic relationships between social network accounts. For example, the metadata in one of signals 106 may indicate the signal mentioned or resent another message from another social network account. As also described above, the dynamic relationship between signals and accounts may be alternatively referred to as the dynamic social graph for the account.

Normalize module 5322 may convert raw data 5328 into normalized data 5330. For example, normalize module 5322 may convert the different formats of the messages generated by the different social networks 104 into a generic format and load the content and metadata for the messages into columns of a table. The original format used in the messages may be identified in the table.

Enrichment module 5324 may identify or generate additional metadata that identifies contextual dimensions, constituents, and relationships for signals 106. For example, enrichment module 5324 may identify signals 106 related to specific brands and may identify signals 106 that form conversations about those brands. Analysis module 5326 may generate additional metrics 5332 for the normalized/enriched data 5330. For example, analysis module 5326 may generate a score for an account based on the number and types of conversations and constituents associated with the account.

A workflow coordinator 5318 may coordinate the operations performed by the different modules in analytic pipeline 5300. For example, workflow coordinator 5318 may determine how often collectors 5320 collect signals 106 from social networks 104 and when normalize module 5322, enrichment module 5324, and analysis module 5326 process the signals.

Figure 20:
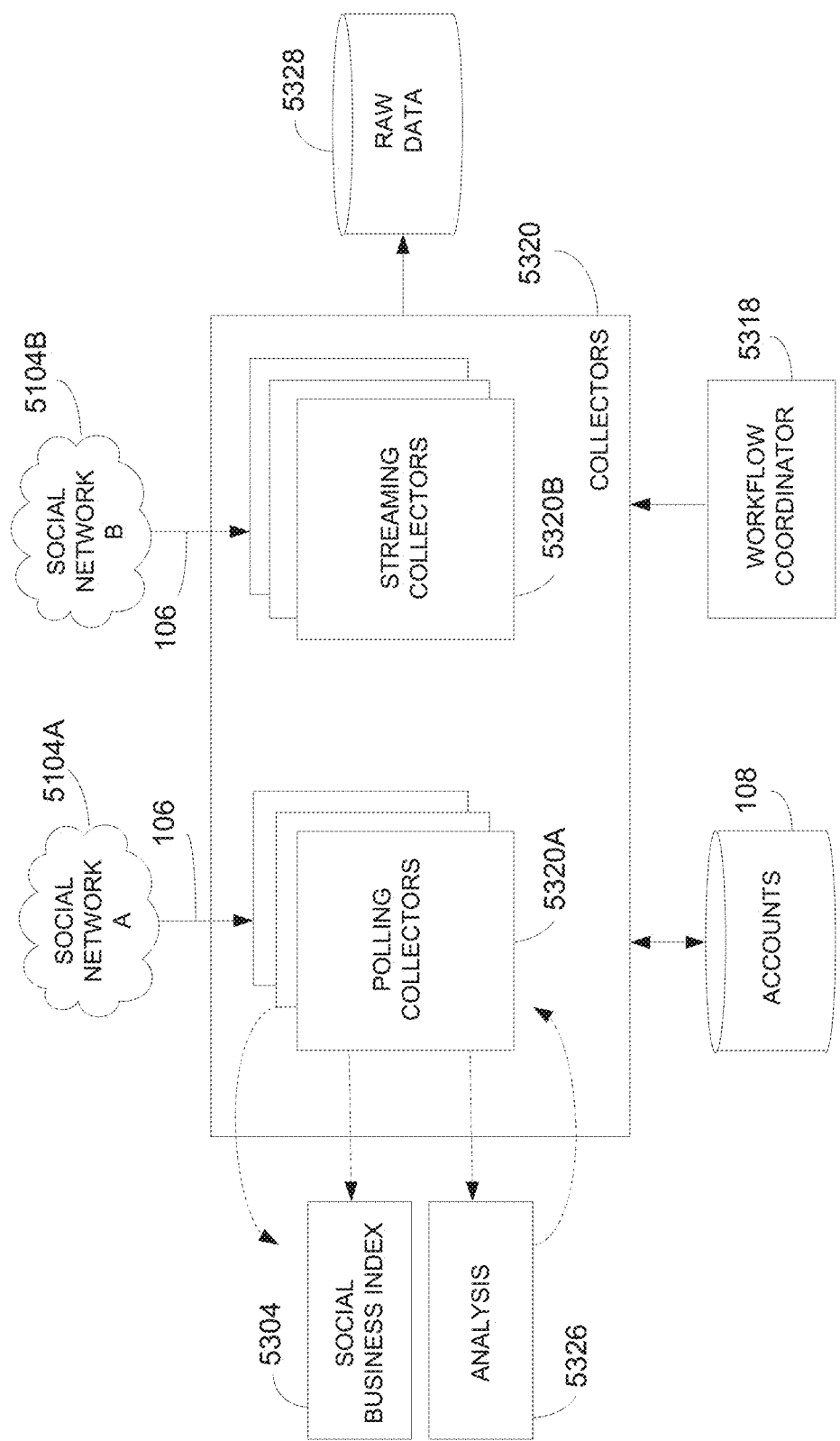
FIG. 20 depicts an example of collectors used in the analytics pipeline.

FIG. 20 shows a more detailed example of collectors 5320. Collectors 5320 may use application programmers interfaces (APIs) to collect the social signals 106 from the social network accounts within social networks 104. Two different types of collectors 5320 may be used. Polling collectors 5320A may be used as a client-initiated pulling mechanism to make API calls to associated social networks 5104A. In one example, the polling collector 5320A may be scheduled by workflow coordinator 5318 to run at regular periodic intervals, such as every 15 minutes, 30 minutes, hour, etc.

Streaming collectors 5320B may use a server-initiated push mechanism where APIs in social networks 5104B continuously push new signals to streaming collectors 5320B in real-time. Collectors 5320 may operate independently from other processing modules in the analytics pipeline to improve performance.

Collectors 5320 may continuously collect social signals 106 for entire industries. For example, collectors 5320 may collect social signals 106 from substantially every known social network account operated by car companies. An initial set of seed accounts 108 may be provided to collectors 5320 and may identify substantially all of the social network accounts for the different car companies. For example, one of the seed accounts 108 may identify a first account on Facebook® for a car company and a second seed account 108 may identify a second account on Twitter® for the same car company. Seed accounts 108 also may identify social network accounts for different car brands marketed by the car companies. For example:

Seed Account #1=http://Twitter@car company
Seed Account #2=http://Twitter@car company_car brand New accounts 108 may be added to the collection process via social business index (SBI) 5304. For example, a user may use a SB interface to identify a new company account or individual account in a social network for collecting social signals. The new account may be validated by one of collectors 5320 and then synchronized into a master list with existing accounts 108.

Analysis module 5326 may dynamically identify and add new accounts 108. For example, analysis module 5326 may identify messages generated about a product. Some of the signals containing the messages may have come from a social network account that does not currently exist in accounts 108. For example, one of the social network accounts may belong to a company that does not currently have an associated analytic system account 108. In another example, the social network account may be owned by an individual that sends or posts large numbers of messages about products sold by the company.

Analysis module 5326 may identify the social network account as a source, influencer or advocate for the company and automatically add a new account 108 to the analytic system that identifies the social network account. Collectors 5320 then may start periodically collecting signals from the newly identified social network account.

Figure 21:
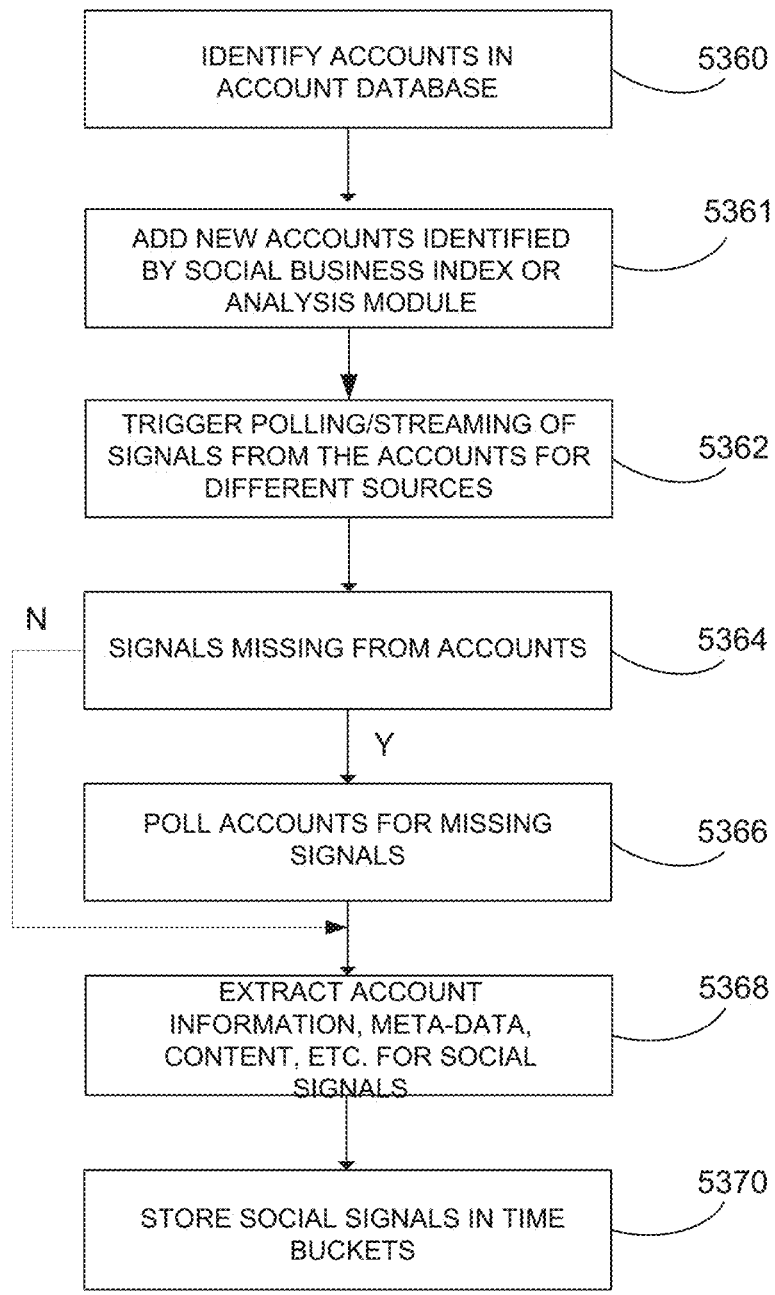
FIG. 21 depicts example process performed by the collectors.

FIG. 21 depicts an example process for the collectors. In operation 5360, the collectors identify accounts in an account database of the analytic system for collecting social signals. Some accounts may be provided a priori and used as seed accounts. For example, a company may provide all of the social network accounts associated with their company, all social network accounts for with any products sold by that company, and/or all social network accounts for employees that work for the company.

In operation 5361, new accounts may be dynamically added to the existing accounts either manually by users via the social business index interface or automatically by the analytic module. In operation 5362, the collectors are triggered to poll signals from the social networks identified by the accounts. For example, some social signals may be collected from the social networks every 15 minutes. Other signals may be continuously streamed from the social networks to the collectors.

In operation 5364, some signals may be missing. For example, the servers operating the polling or streaming APIs may temporarily go down or be overloaded and lose connectivity with the collectors. In operation 5366, the collectors may automatically poll the social networks for the missing signals.

In operation 5368, the collectors may extract all necessary content, account, and metadata contained in the signals. For example, the collectors may extract the content of the messages that are posted or sent from the account, extract metadata that identifies the types of messages, and extract account information that identifies the static relationship of the account to other accounts. Operation 5370 may store the social signals in time buckets. For example, all of the social signals collected during a particular time period may be assigned to the same time bucket. The time buckets allow the analytic system to generate analytics for any definable time period, such as for a particular hour, day, month, year, etc.

Figure 22:
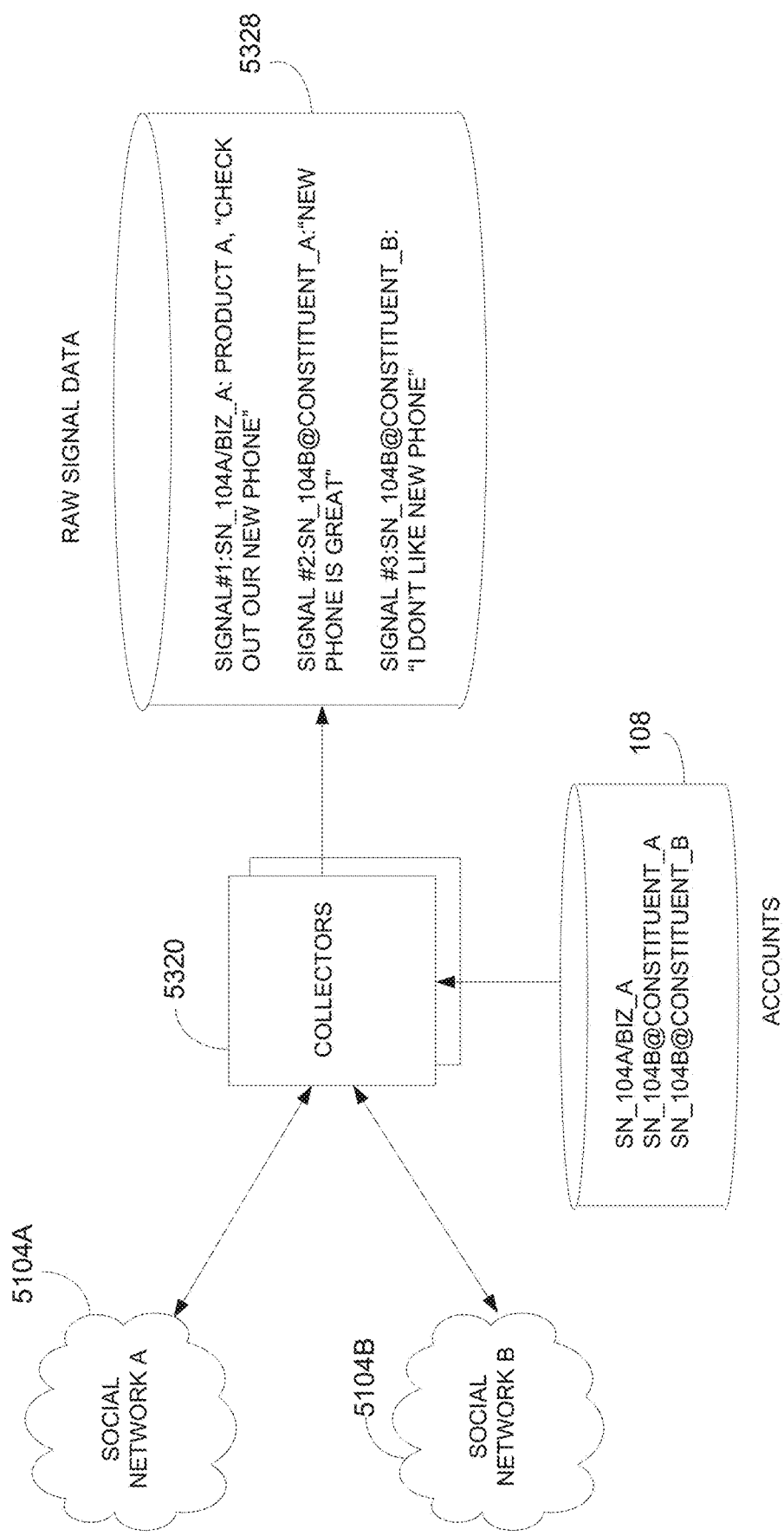
FIG. 22 depicts an example of how signals are collected from social networks.

FIG. 22 depicts another example of how collectors 5320 may extract data from the signals generated by different social networks. Accounts 108 may identify a first social network (SN_5104A) containing an account for a business A (SN_5104A@BIZ_A). Accounts 108 may identify a second social network (SN_5104B) containing an account for a constituent A (SN_5104B@CONSTITUENT_A) and an account for a constituent B (SN_5104B@CONSTITUENT_B).

Collectors 5320 collect the signals from the social networks 5104A and 5104B associated with accounts 108. In one example, collectors 5320 may collect a signal #1 that contains a message generated from the social network account of business A announcing the launch of a new phone. Collectors 5320 may collect a second signal #2 from the social network account of constituent A providing a favorable review of the new phone. Collectors 5320 also may collect a third signal #3 from the social network account of constituent B providing a negative review of the new phone. Collectors 5320 may store the contents of signals #1, #2, and #3 as raw signal data 5328.

Collectors 5320 may also extract metadata associated with the signals. For example, a Tweet message may contain a mention tag identifying the new phone. The collectors extract and store the mention tag with the Tweet message. The analytic system may use the mention tag to associate the signal with a contextual dimension. For example, the mention tag may identify the brand name of the new phone and an associated brand identifier may be assigned to the signal. Similarly, collectors 5320 may extract and store hash tags from the messages identifying different contextual dimensions for the signals.

FIG. 23 depicts a conceptual example of normalized signal data generated by the normalize module 5322 for the analytic pipeline shown in FIG. 19. This of course is just a small example of different content, metadata and other parameters that may be extracted from the social signals. Different content and metadata may be extracted from the raw signal data and loaded into associated columns of table 5380.

Each column of table 5380 may represent a different parameter associated with a signal and each row of table 5380 may contain the parameter values for a different signal. For example, column 5382A may identify the social network account that posted or sent the message and column 5382B may identify the social network account where the message was sent. Field 5382B may be null when a message is posted and not sent to a specific network account. Column 5382C may identify the social network producing the signal. Column 5382D may identify the date and time the signals are generated or collected and column 5382E may assign unique identifiers to each signal.

Column 5382F may identify the type of message associated with the signal. For example, signal #1 may contain a message posted on a Facebook® account, signal #2 may contain a Tweet message sent from the Twitter® account for constituent A, and signal #3 may contain a re-tweet message sent from the Twitter® account for constituent B. Column 5382G may contain the content of the message. For example, column 5382G may contain the text messages posted or sent from the different social network accounts.

The normalize module converts the signals from the different social networks into a generic format for easier analytic system processing. However, the normalization process still maintains the signal metadata that may identify static or dynamic relationships with other signals or accounts. For example, the retweet identifier in column 5382F may indicate signal #3 contains a previously sent message from signal #2 and therefore may identify signal #2 and signal #3 as being part of the same conversation related to the new phone.

FIG. 24 shows other examples of information that may be extracted from the social signals and loaded into table 5380. Again these are just examples of any number of parameters that may be extracted from the social signals.

SIGNAL_ID: A unique identifier for the signal.
TIME: The time the signal was generated.
TIME BUCKET: A monitored time period associated with the signal.
SIGNAL TYPE: POST, REPLY, ECHO.
CONTENT TYPE: Tweet, wall post, blog, forum, video, comment, photo, etc.
SERVICE ACCOUNT ID: Identifier of the account that originated the signal.
ECOSYSTEM ACCOUNT ID: Identifier of the account for an ecosystem containing this signal.
SERVICE: The social network used for generating the signal, such as Twitter®, Facebook®, YouTube®, etc.
URL: The URL for the social network account that generated the signal.
PARENT SIGNAL ID: The identifier of the original signal for a reply or echoed signal.
TAGS: Hash tags tagged to the signal.
LINKS: URL links embedded in the signal.
CONTENT: Content of signal.

Figure 25:
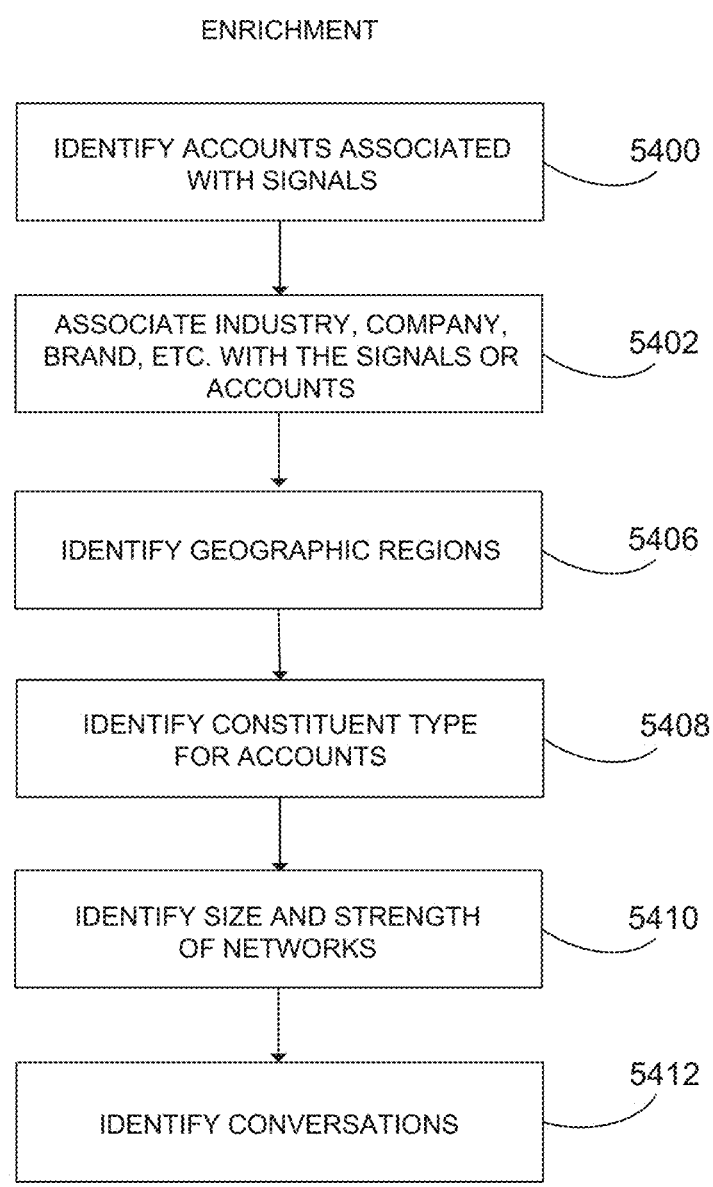
FIG. 25 depicts an example process for enriching signal data with additional metadata.

FIG. 25 depicts an example of a process for enriching normalized signal data. In operation 5400, account identifiers are assigned to the collected signals. For example, signals received from a particular social network account may be assigned an account identifier associated with the social network account. In operation 5402, contextual dimensions may be assigned to the signals. As discussed above, the analytic system may identify an industry, company, brand, etc. with the account or the signal. For example, the signal may be collected from a social network account associated with a particular car brand sold by a car company. The signal may be assigned an industry identifier associated with the automobile industry assigned a company identifier associated with the car company, and/or assigned a brand identifier associated with the car brand.

Operation 5406 may associate geographic regions with accounts or signals. For example, a social network may include social network accounts for different geographic regions, such as North America, Europe, Asia, etc. The analytic system may assign location identifiers to the accounts and signals identifying the associated geographic regions. The geographic region identifiers provide yet another contextual dimension for generating social analytics.

Operation 5408 may identify constituent types associated with the accounts. As discussed above, one account may be associated with a car company and a second account may be associated with an individual who frequently comments on the products produced by the car company. An identifier may be assigned to the individual account identifying the individual account as a particular type of constituent of the car company, such as an advocate, detractor, influencer, market, partner, etc.

Operation 5410 may identify a size and/or strength of the networks associated with the contextual dimensions, accounts, signals, etc. For example, the company account may have a number of members, subscribers, employees, followers, etc. The total number of these associations may be counted and identified as the network size for the company account. The number of signals that are sent, posted, received, and/or viewed by on the company account also may be tracked. The network strength for the company account may be derived from the number of signals associated with the account for a give time period, size of the company account, types of constituents associated with the company account, and/or any other parameters that may indicate a robustness of the social interactions for a particular account.

Operation 5412 may identify conversations associated with different signals and/or accounts. As explained above, different signals may be associated with a same contextual dimension or topic of conversation and assigned an associated conversation identifier.

Figure 26:
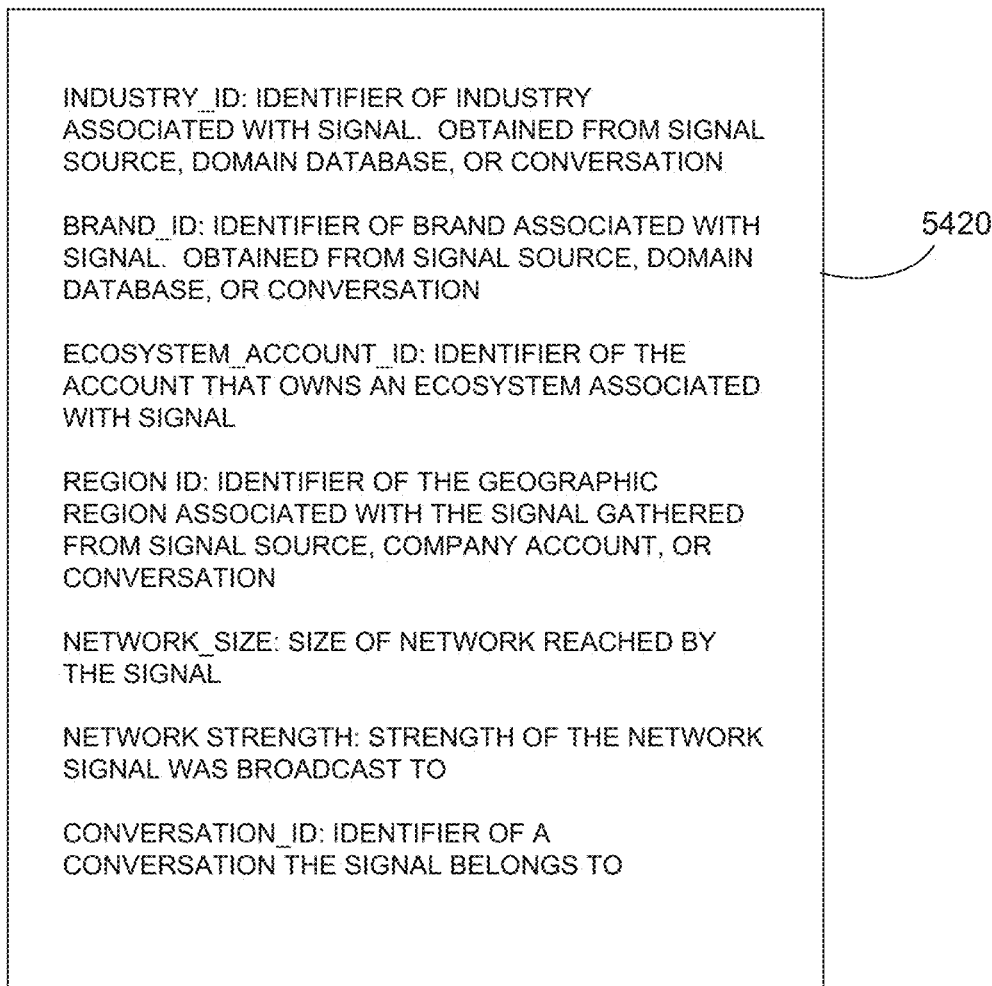
FIG. 26 depicts examples of enriched signal data.

FIG. 26 depicts one example of a table 5420 containing some of the metadata described in FIG. 25 that is added to the signals.

INDUSTRY_ID: Identifier of industry associated with signal. The identifier may be obtained from the signal content, a domain database, or from a conversation associated with the signal.
BRAND_ID: Identifier of brand associated with the signal. The identifier may be obtained from the signal source, domain database, or associated conversation.
ECOSYSTEM_ACCOUNT_ID: Identifier of an account that owns an ecosystem associated with a signal. The ecosystem can be any accounts, signals, or contextual dimension associated with the account.
REGION ID: Identifier of the geographic region associated with the signal. The identifier may be gathered from the signal source, company account, or conversation.
NETWORK_SIZE: Size of network reached by the signal
NETWORK STRENGTH: Strength of network associated with the signal. For example, a signal broadcast to a network with a large number of subscribers may a larger strength value than a network with fewer subscribers.
CONVERSATION_ID: Identifier of a conversation the signal belongs to.

Figure 27:
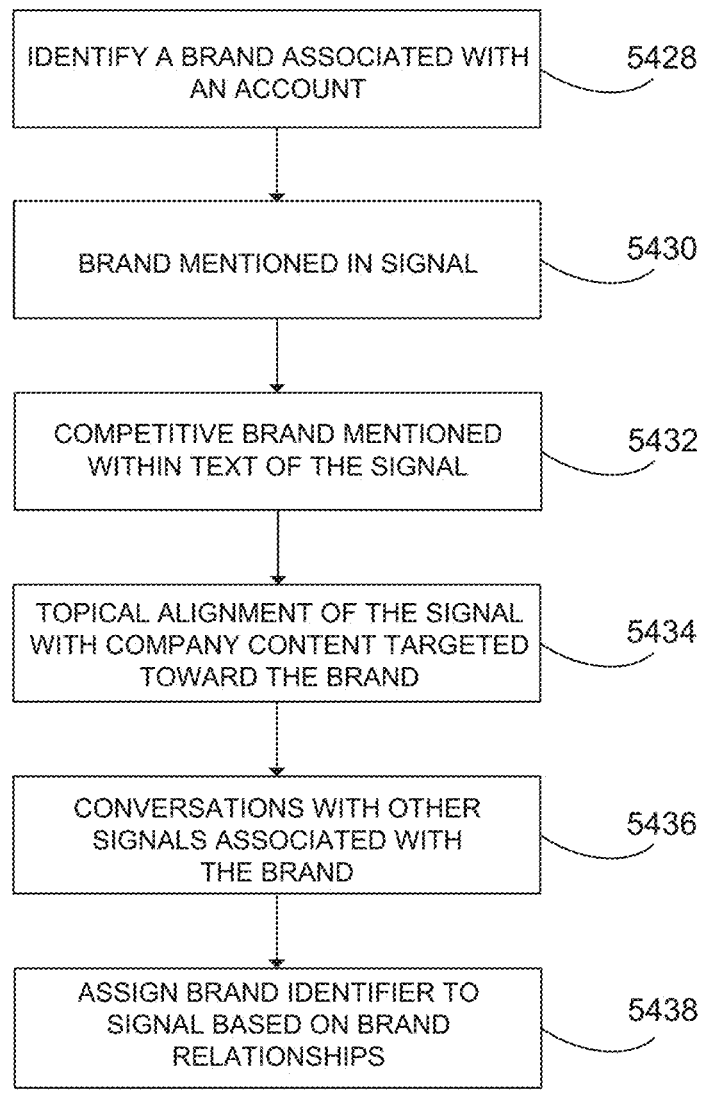
FIG. 27 depicts an example process for identifying a signal associated with a contextual dimension for a brand.

FIG. 27 shows one example of how signals may be associated with a particular brand. This is just one example of how signals can be associated with any contextual dimension. In operation 5428, the analytic system may identify a brand associated with a particular account. As discussed above, the brand may be identified and associated with a particular social account based on a priori data provided by a company or the brand may be dynamically derived, discovered, and/or associated with the account by the analytic system. An identifier associated with the brand may be assigned to the account.

In operation 5430, the brand may be mentioned in messages contained in the signals. In operation 5432, signals may mention competitive brands. For example, a message may compare the brand to other similar competitive brands in a same industry. In operation 5434, words in the signal messages may be aligned with company content targeted toward the brand. For example, a topic cluster of keywords may be derived from the social signals generated by the company account that markets the brand. A topic vector for the topic cluster may be compared with the words in other signals.

In operation 5436, signals may have previously been associated with the brand or associated with conversations discussing the brand. Other signals that take part in the conversations may be identified as related to the brand. In operation 5438, the analytic system may assign the brand identifier to signals having any combination of the brand relationships described above.

FIG. 28 depicts an example of metrics that may be generated by analysis module 5326 in FIG. 19. The following are only examples of any variety of metrics that may be generated by the analytic system and added to a metrics table for an account and/or signal.

- RATING: Identities an overall rating for a signal or an account. The rating may be based on a score generated from any combination of metrics.
- SIGNAL COUNT: Identifies a number of signals relating to the account for a particular time period. For example, the signal count may identify the number of messages generated for a particular brand within the time period.
- RATING_COUNT: Number of ratings received by the account. Some social networks allow users to rate signals, accounts, etc. For example, the users may rate an article or product with a like, dislike, star rating, etc.
- LIKES: Number of times the signal was assigned a like or other positive rating.
- DISLIKES: Number of times the signal was assigned a dislike or other negative rating.
- FAVORITES: The number of times the signal was given a favorite rating.
- IMPRESSIONS: The number of times the signal has been viewed.
- LISTINGS The number of times the signal has been added to a signal list.
- MENTIONS: The number of times another signal has mentioned by another account or signal.
- SENTIMENT: A sentiment score based on sentiment classifiers, such as a negative, neutral, or positive rating assigned to the signal.

Figure 29:
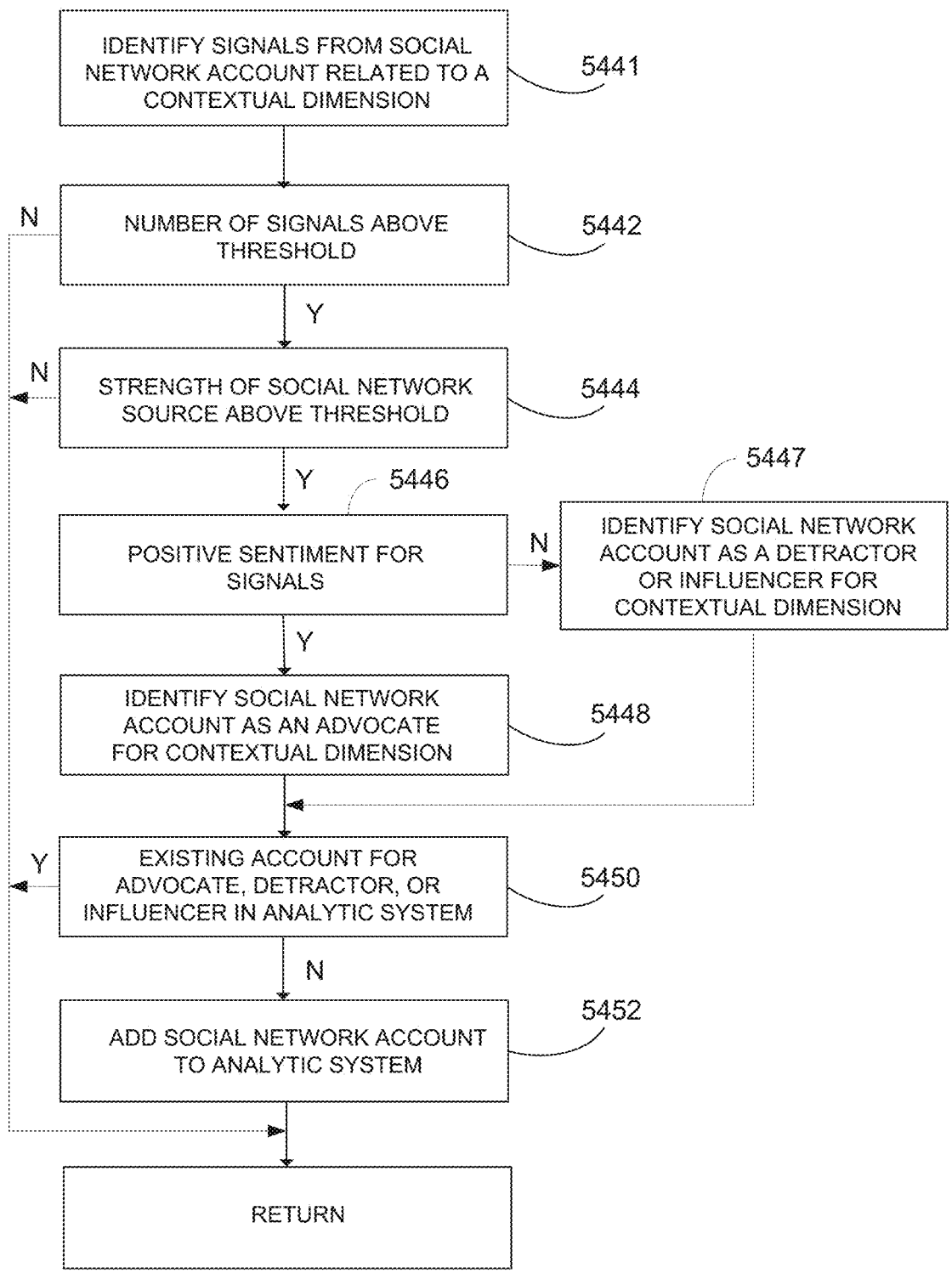
FIG. 29 depicts an example process for dynamically adding accounts to the analytics system.

FIG. 29 depicts one example of how new accounts may be dynamically identified and added to the analytic system. In operation 5441, the analysis module may identify signals from a social network account that are related to a particular contextual dimension. For example, the social network account may comprise a Twitter® account that is not currently identified in the analytic system. The analysis module may identify different signals associated with the same conversation. Some of the signals in the conversation may come from the Twitter® account. For example, some signals in the conversation may be replies to signals coming from the Twitter® account.

Operation 5442 may determine if the number of signals generated by the Twitter® account is above a first threshold. For example, the analysis module may identify the number of signals generated by the Twitter® account during the conversation or the number of signals that relate to a particular contextual dimension. The Twitter® account might not be added to the analytic system if the number of signals is below the first threshold.

Operation 5444 may determine if a strength of the Twitter® account is above a second threshold. For example, the strength may be based on the number of followers for the Twitter® account. The Twitter® account might not be added to the analytic system if the strength of Twitter® account is below the second threshold.

Operation 5446 may determine an overall sentiment for the signals from the Facebook® account related to a particular contextual dimension. For example, the analysis module may determine the overall sentiment for messages sent or posted from the Facebook® account that relate to company X. Operation 5448 may identify the Facebook® account as an advocate of company X when the messages from the Facebook® account have any overall positive sentiment. Operation 5447 may identify the Facebook® account as a detractor of company X when the messages from the Facebook® account have any overall negative sentiment. Operation 5448 may identify the Facebook® account as an influencer of company X when the messages from the Facebook® account have a mixed sentiment and the strength of the Facebook® account is above a particular level identified in operation 5444.

In operation 5450, the analytic system may determine if the Twitter® account currently exists in the analytic system. For example, the analytic system may determine if any of the accounts stored in the analytic pipeline contain the URL for the Twitter® account. If not, the Twitter® account may be added to the analytic system in operation 5452. The Twitter® API operated by the collector may be automatically configured to start periodically polling or streaming signals from the Twitter® account.

Thus, the analytic system identifies and adds new accounts that generate the most relevant signals for the contextual dimensions and associated accounts.

Figure 30:
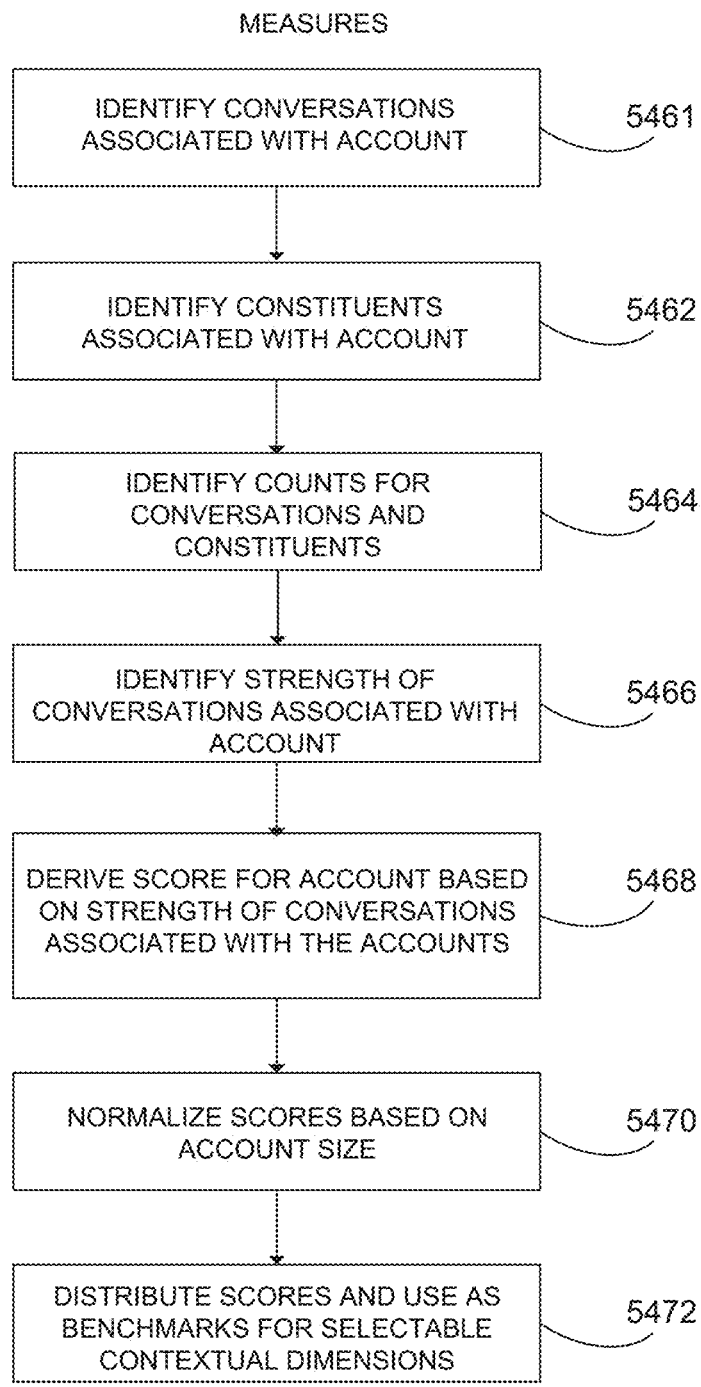
FIG. 30 depicts an example of a process for generating scores for analytic system accounts.

FIG. 30 depicts one example of how scores may be generated for accounts. Again, this is just one example of any number of different scores that may be generated by the analytic system for any account or defined contextual dimension. Operation 5461 may identify conversations associated with an account. As previously described, the account may be associated with a brand and the conversations may discuss the brand. Operation 5462 may identify constituents associated with the account. As also previously described, accounts participating in the conversations may be identified as advocates, detractors, partners, employees, influencers, or market.

In operation 5464, counts may be accumulated for the conversations and the constituents. For example, the counts may include the number of signals in the conversations, the number of conversations for the account, and the number of signals in the conversations associated with each of the different constituents.

In operation 5466, the strength of the conversations associated with the account may be determined. For example, the strength of conversations may be based on the number of constituents associated with the conversations, the number of signals generated by each of the constituents, the strength of the constituents, the length of the conversations, the sentiment of the conversations, etc. Some counts may be weighted differently based on other relationship with the account. For example, the count for an influencer constituent may be given a greater weight than the count for a market constituent since the influencer constituent has a relatively larger number of followers.

In operation 5468, a score may be derived for the account based on the strength of the conversations associated with the account. In operation 5470, the overall score for the account may be normalized with the scores for other accounts. For example, scores may vary based on the size of the accounts. Normalization allows different accounts to be ranked independently of account size.

In operation 5472, scores may be distributed, benchmarked, and/or applied to any selectable contextual dimension. For example, the score for an account associated with a particular product may be compared with an overall score for all products in the same industry. The product score also may be compared with scores for competing products or compared other products in similar geographic regions.

In another example, the account may be associated with a car brand and the analytic system may identify durations of different conversations associated with the car brand. The conversation durations for all other car brands may be averaged together to generate an overall average conversation duration for the car industry. The average length of social network conversations in the car industry can then be used as a benchmark and compared to the average conversation duration for the particular car brand associated with the account. The same rollup averaging and comparisons can be performed for competitor brands, geographic regions, or any other definable contextual dimension. Thus, the relationship identifiers and scores derived by the analytic system allow metrics to be distributed and compared over a large number of selectable axes.

Figure 31:
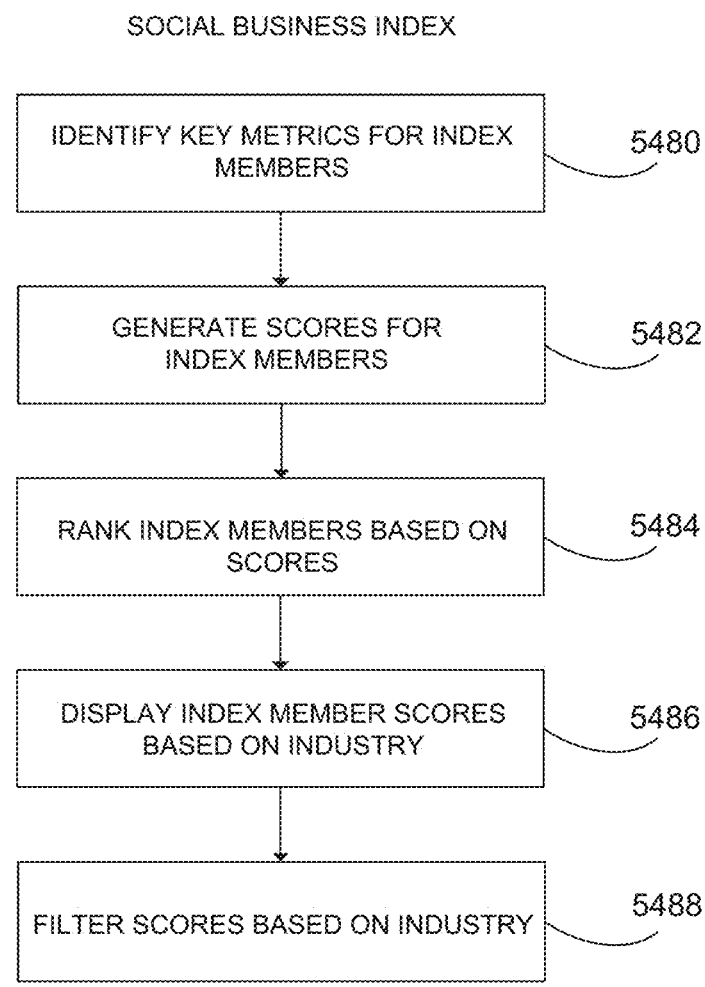
FIG. 31 depicts an example of a process for displaying analytics for different accounts.

FIG. 31 depicts an example process performed by the social business index 5304 in FIG. 18. In operation 5480, key metrics may be identified for index members. The key metrics are the metrics needed to generate scores for particular contextual dimensions. For example, scores for accounts related to products in a particular industry may use the number of mentions of the accounts, number followers of the accounts, etc. In operation 5482, scores may be generated from the metrics for the different index members. For example, scores may be generated for each brand of each company of each industry with accounts in the analytic system.

Operation 5484 may rank all index members based on their associated scores. In operation 5486, the scores and the rankings may be displayed on a user interface based on industry or any other user definable contextual dimension. In operation 5488, the scores may be filtered based on industry, brand, or any other contextual dimension. For example, scores may be ranked and displayed for computer companies or for smart phones.

Figure 32:
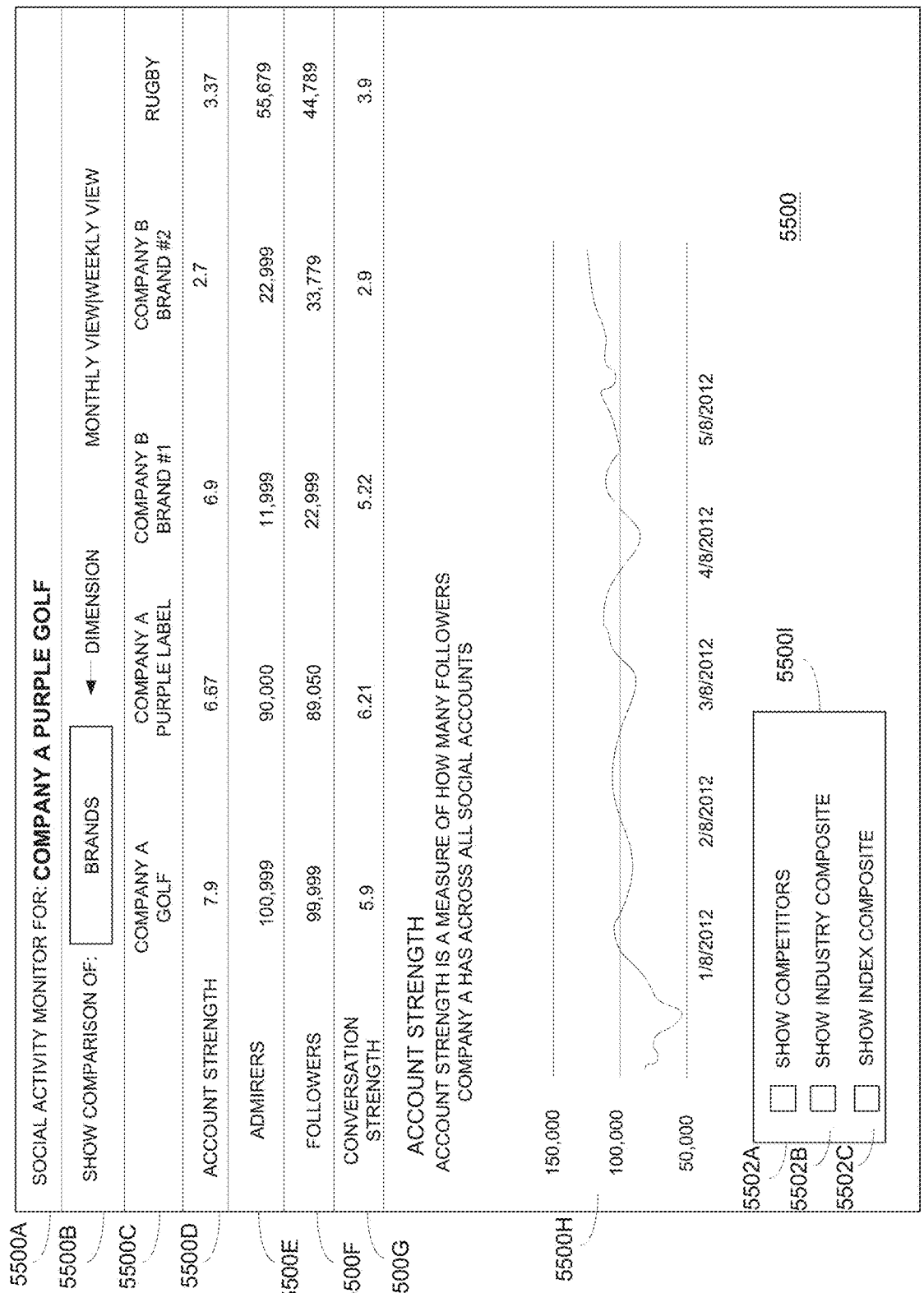
FIG. 32 depicts an example of an electronic page displaying social analytics for the different accounts.

FIG. 32 depicts one example of an electronic page 5500 generated by the social business index. A row 5500A within electronic page 5500 may identify a particular company selected by a user. A row 5500B may contain a field for selecting a contextual dimension for providing comparisons. For example, the user may direct the social business index to display metrics for different clothing brands. The comparisons can be displayed for different selectable time periods, such as for a last week or a last month.

Row 5500C may display names of the different brands that the social business index is comparing. In one example, a first column identifies metrics for a line of golf clothing sold by company A. A second column may identify a purple label brand sold by company A. A third column may identify a brand #1 sold by a different company B and a fourth column may identify a brand #2 sold by company B. A fifth column may identify a particular clothing product, such as rugby shirts.

Row 5500D may identify account strength for the different brands based on any of the previously described metrics. For example, the golf line for company A may have an account strength of 7.9 and brand #2 for company B may have an account strength of 2.7. The account strength provides a quantitative score for the quantity and quality of social signals related to the brands.

Row 5500E may identify a count of the number positive signals for the brands. For example, row 5500E may identify the number of signals that liked or provided positive ratings for the brand. Row 5500F may identify the number of followers for the brand accounts.

Row 5500G may identify the overall conversation strengths for the brands as described above. For example, the account for the purple label brand sold by company A may have a conversation strength of 6.21 and the account for brand #2 sold by company B may have a conversation strength of 2.9. As described above, conversation strength may take into account an average discussion length, customer/influencer discussion strength, total discussions, total signal count, influencer signal count, etc.

A graph 5500H may display a timeline for the account strength of company A. In one example, the account strength may include a count for the number of followers company A has across all of the social networks and all associated social accounts. This may include the number of followers for all accounts associated with company A including the accounts for any subsidiaries of company A. Graph 5500H may display the account strength along a multiple week, month, or year time line.

Section 5500I may provide different selectable fields 5502A-C for displaying other metrics. For example, one field 5502A may display metrics for competitor accounts, a field 5502B may display an industry composite metric, and a field 5502C may display an index composite for all other accounts.

Figure 33:
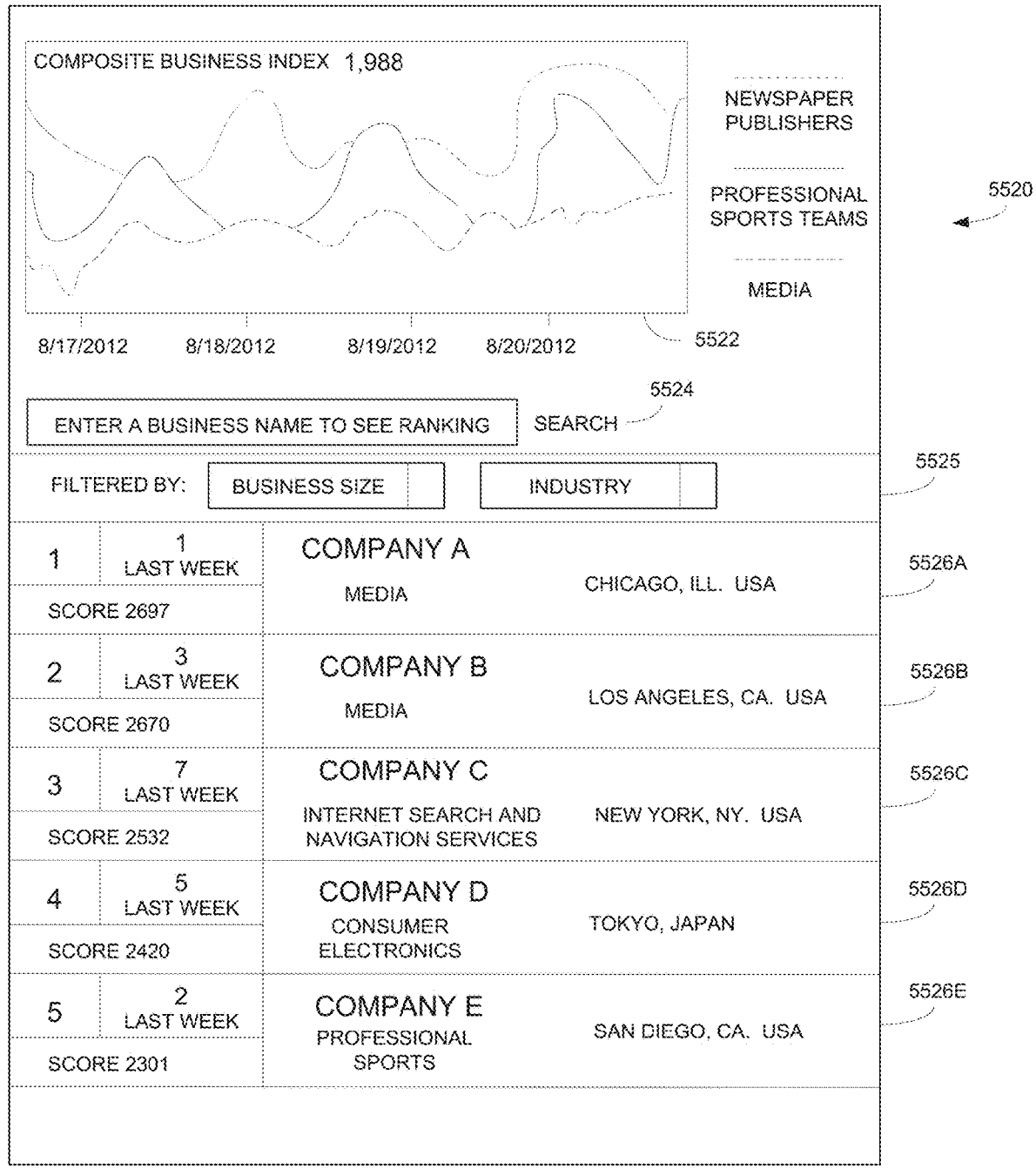
FIG. 33 depicts another example of an electronic page displaying social analytics for the different accounts.

FIG. 33 depicts another example of an electronic page 5520 generated by the social business index. A graph 5522 may display a timeline of composite business index scores for multiple different industries.

A field 5524 allows a user to display the ranking for any particular business. Section 5525 allows users to filter rankings based on business size and industry. Sections 5526A-5526E shows the five highest ranked companies, identifies the industries associated with the companies, and shows the previous week rankings for the companies.

Constituent Classification

Figure 34:
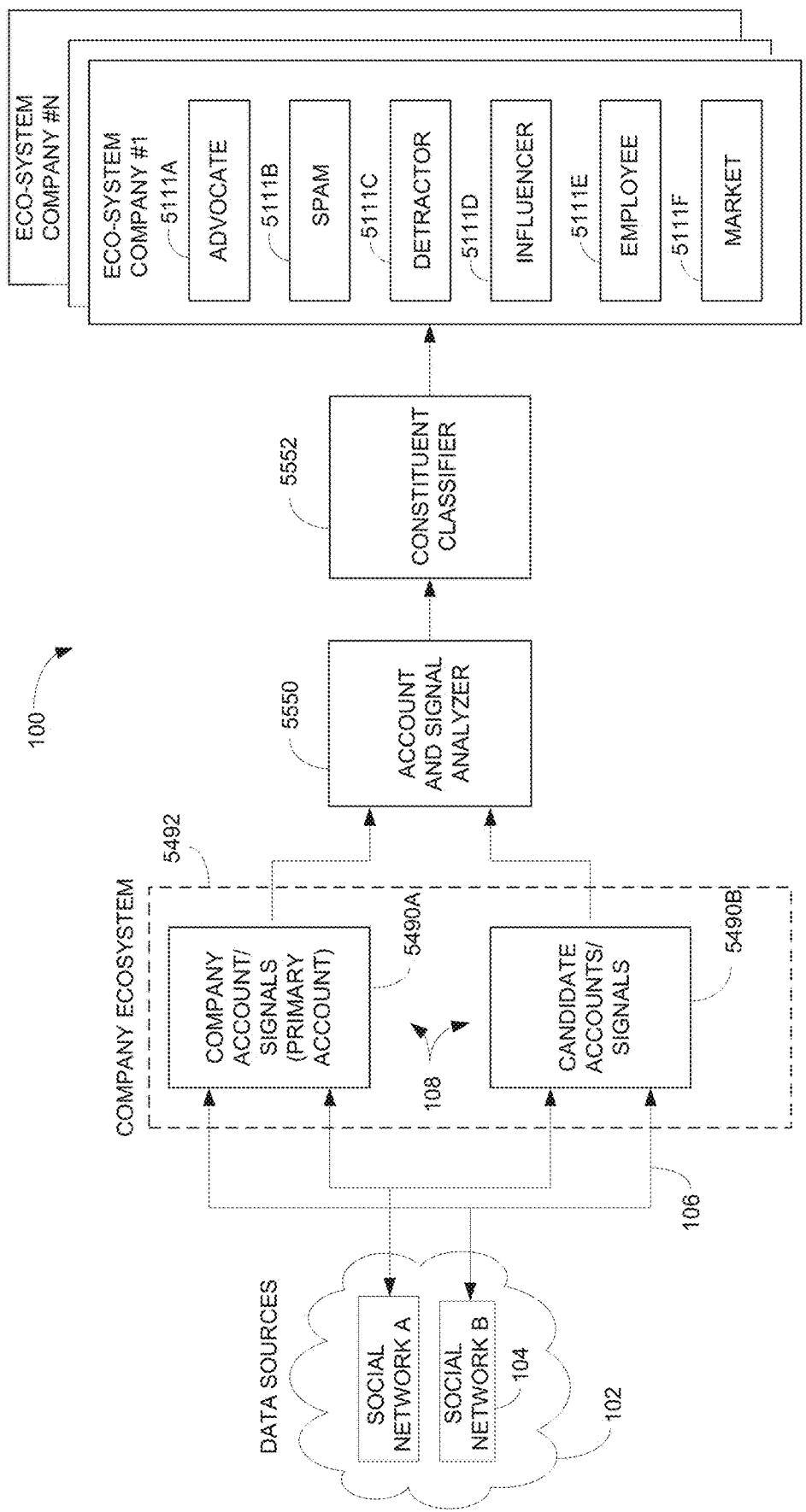
FIG. 34 depicts an example of how constituents are identified in an ecosystem.

FIG. 34 depicts one example of how social analytic system 100 may classify constituents 111. As mentioned above, signals 106 are collected from one or more social networks 104 and stored in accounts 108. For explanation purposes, some accounts 108 may be referred to as company or primary accounts 5490A and some accounts may be referred to as candidate accounts 5490B. Company accounts 5490A may be associated with primary operators of ecosystems 5492 and candidate accounts 5490B may be associated with any other participants within the ecosystem.

For example, company accounts 5490A and candidate accounts 5490B may be associated with any entity, organization, business, company, user individual, etc. Ecosystems 5492 may be associated with specific social network accounts. For example, one ecosystem 5492 may comprise a Twitter® account in the United States for a car company and a second ecosystem 5492 may comprise a Twitter® account in France for the same car company.

Collectors may associate signals 106 with different ecosystems 5492. For example, a company X may have a Twitter account @companyX. An individual may have an account in the company ecosystem @companyX_fan. The individual may explicitly re-tweet a signal from @companyX. Since the signal from @companyX_fan contains an explicit link to @companyX, the collector may associate the signal with the ecosystem @companyX. Some signals 106 may not have enough context to be initially assigned to an ecosystem 5492. In this case, the signals 106 may go through an enrichment process where content of the signal is analyzed and matched with a most relevant ecosystem 5492.

An account and signal analyzer 5550 may generate social metrics based on accounts 108, the content of signals 106 associated with accounts 108, and the relationships between signals 106. In the example where company account 5490A is operated by a car company, the car company may post messages about a new car. An individual may post original messages about the new car and/or may reply to messages posted by the car company from one of candidate accounts 5490B.

Analyzer 5550 may identify and aggregate all of the signals generated from the car company account 5490A and separately aggregate the signals generated by the individual candidate account 5490B. Analyzer 5550 then may derive social metrics from the aggregated signals. For example, analyzer 5550 may identify the number and types of messages sent from and sent to accounts 108 over the last month and the number of subscribers for accounts 108. Signal analyzer 5550 also may determine the sentiment of the signals generated by candidate accounts 5490B and how well signals generated from candidate accounts 5490B align with signals generated from company account 5490A.

A constituent classifier 5552 may use the social metrics to classify candidate accounts 5490B as different types of constituents 111. For example, constituent classifier 5552 may identify some of candidate accounts 5490B that generate a certain number of positive messages about the car company and/or the new car sold by the car company as advocates 5111A.

Constituent classifier 5552 also may identify spam accounts 5111B that may generate spam messages or otherwise generate signals that are annoying to the company operating the ecosystem. Candidate accounts 5490B generating a relatively high number of negative signals about the company may be classified as detractors 5111C. Candidate accounts 5490B having a certain level of social network influence, but not having a particularly strong sentiment regarding the company ecosystem, may be classified as influencers 5111D.

Candidate accounts 5490B for employees of the company may be classified as employees 5111E. Candidate accounts 5490B that are not associated with any other type of constituent 5111A-5111E may be classified as market 5111F.

As mentioned above, classifying candidate accounts 5490B as different types of constituents 5111A-511E allow companies to more efficiently operate and manage their social network ecosystems 5492. For example, a company can allocate personnel to interact with important advocate accounts 5111A and may decide to ignore or filter signals associated with spam accounts 5111B. Other corporate intelligence may be gleaned from detractor accounts 5111C that have an overall negative sentiment regarding the company ecosystem 5492.

As also mentioned above, differentiating between advocate accounts 5111A and influencer accounts 5111D also may help companies allocate resources. For example, an influencer 5111D may have a particularly high influence within a coffee industry social networks but may not have a strong impression or knowledge regarding a particular coffee company associated with ecosystem 5492. The coffee company may assign more personnel to the influencer account 5111D in an attempt to convert the influencer into an advocate 5111A.

Employee accounts 5111E may provide more relevant social network analysis for other constituent accounts 111. For example, marketing managers of companies may frequently qualify as advocates 5111A. Reclassifying the marketing managers as employees 5111E may provide more accurate social metrics regarding non-employee advocates 5111E. Distinguishing employee accounts 5111E also allow the ecosystem to determine if messages generated by employees are aligned with the messages generated by the company. Of course other metrics and information also may be derived from employee 5111E accounts and the other constituent accounts. Market accounts 5111F may provide any other general social networking information or metrics related to ecosystem 5492 operated by the company.

Figure 35:
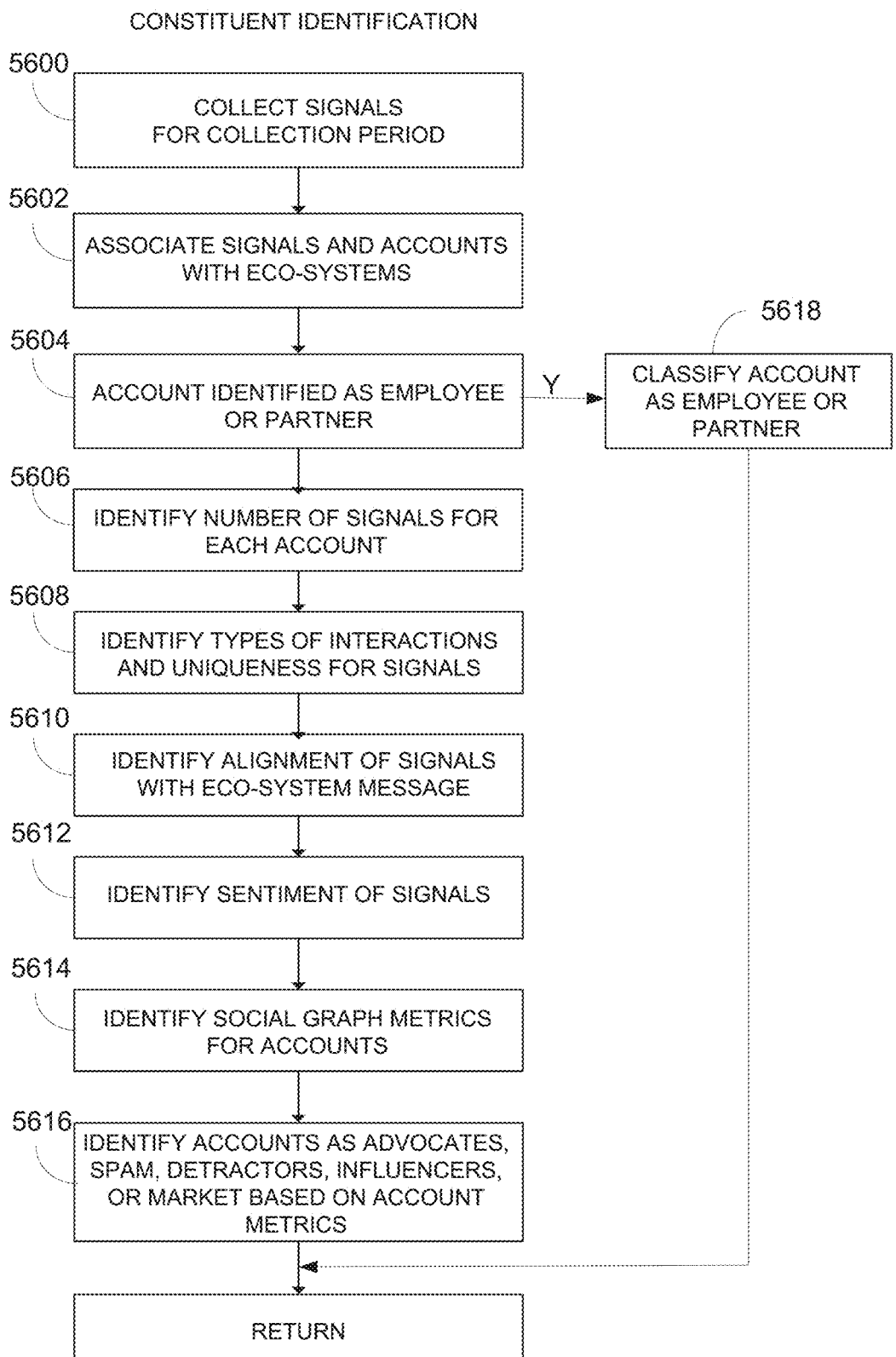
FIG. 35 depicts an example process for identifying constituents.

FIG. 35 depicts one example process for classifying constituents for an ecosystem. In operation 5600, signals may be collected from the social networks for a collection period. For example, signals may be collected from thousands of social network accounts associated with thousands of different companies and/or brands. Other signals relating to the company or brands sold by the companies may be collected from millions of individual accounts. The signals may be collected and aggregated over a collection period, such as 90 days. In operation 5602, the signals may be associated with different ecosystems. For example, all of the messages that are sent, posted, forwarded, blogged, etc. within a particular company social network account may be associated with a same company ecosystem.

Accounts identified in operation 5604 as employees or partners of the company ecosystem may be classified in operation 5618 as employee accounts or partner accounts. For example, the company operating the ecosystem may provide a list of employees to the social analytic system. The list of employees may be compared with candidate accounts associated with the ecosystem and the matching accounts may be classified as employee accounts.

The company also may provide a list of business partners, such as distributors, retailers, subsidiaries, affiliates, of the like, or any combination thereof. The list of business partners may be compared with the candidate accounts and the matching accounts may be classified as partner accounts in operation 5618.

Operation 5606 may identify the number of signals generated by each account. For example, a user associated with a particular candidate account may have sent, posted, replied, blogged, forwarded, tweeted, re-tweeted, etc. 300 messages over a last 90 days that were all associated with a particular company. For example, the messages may have been posted in the company account, sent to the company account, or contain content related to the brands or services provided by the company.

In operation 5608, types of interactions associated with the signals may be identified. For example, some signals may be original messages posted by individuals and other signals may be messages forwarding, re-tweeting, replying, etc. messages originating from other accounts. The social analytic system may identify a ratio between a number of original messages posted from an account and a total number of messages generated from the account.

Operation 5608 also may identify a uniqueness of the signals generated from the candidate accounts. For example, some messages may comprise only a few words, acronyms, symbols, etc. Some accounts may also repeated send out the same or similar messages. Other messages may comprise a large amount of unique text describing a particular product or event. The social analytic system may generate uniqueness values quantifying the uniqueness of the signals generated by the candidate accounts.

Operation 5610 may identify how closely signals from candidate accounts align with messages generated by a company or primary account (ecosystem messages). For example, a first term vector may be generated from all of the ecosystem messages. A second term vector may be generated from all of the messages generated from a particular candidate account. The alignment between the two term vectors may indicate how well the company communicates with constituents. For example, the company may use unique terms to promote a brand. A candidate account that adopts the same unique terms in subsequent messages may be considered to be more "in-tune", "aligned" or knowledgeable about the company messages or products.

In operation 5612, the social analytic system may determine the overall sentiment for the signals generated from a candidate account. For example, the signals may include like or dislike tags that identify a sentiment of the user for a particular company product, service, message, subject, etc. Sentiment of other signals may be determined from the particular negative or positive terms used in the messages.

Operation 5614 may identify social graph metrics for the candidate accounts. For example, the social analytic system may identify the number of subscribers, followers, friends etc. for each candidate account. Other social graph metrics may include the number of responses or replies to the messages generated by the candidate accounts. These social graph metrics may indicate an influence or "reach" the candidate account may have in a particular subject area.

In operation 5616, the above described social metrics may be used to classify the candidate accounts. As explained above, based on any combination of these social metrics, the candidate accounts may be classified as advocates, spam, detractors, influencers, employees, partners, or market.

Figure 36:
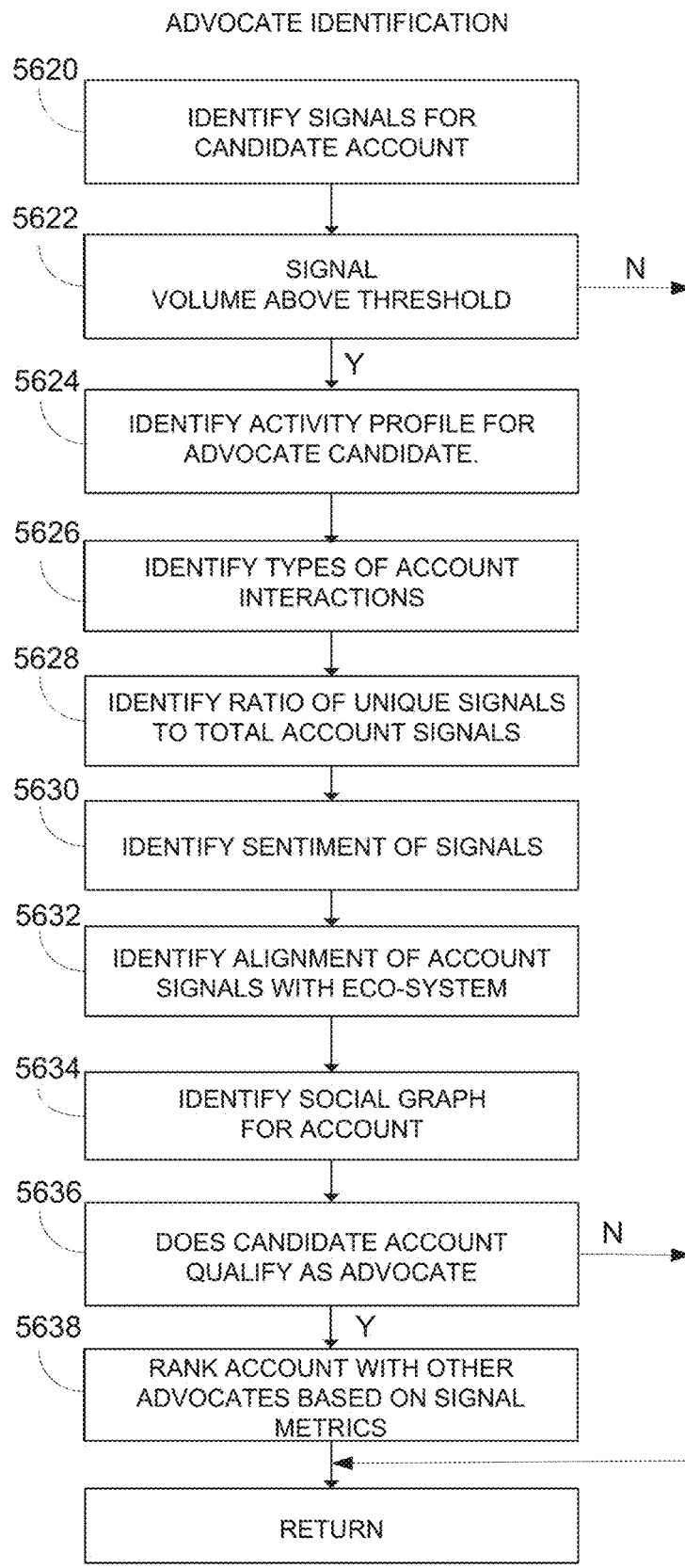
FIG. 36 depicts an example process for identifying advocates.

FIG. 36 depicts one example of social metrics that may be used for identifying advocates. Advocates may represent influential accounts in the ecosystem that generate generally positive messages regarding the company or brands associated with the ecosystem. In one example, advocate accounts may be based on sentiment of the signals, sustained signal activity, and the types of interactions associated with the signals. In operation 5620, the social analytic system identifies the signals for one of the candidate accounts associated with the ecosystem.

In operation 5622, the signal volume is compared to a threshold value. For example, the number of signals generated by the candidate account over the past 90 days may be compared to the threshold value. Signals unrelated to the company ecosystem might not be counted. The threshold value can be determined based on any a priori or real time data and may represent candidate accounts with sufficient signal activity to be considered for advocate status. For example, the threshold value may be based on a percentage of the total, or average, number of signals generated by the candidate accounts in the ecosystem over some time period. Other thresholds could also be used, such as thresholds based on the candidate accounts with the highest number of signals.

Operation 5624 starts generating an activity profile for the candidate account when signal volume is above the threshold value. The activity profile may comprise applying a series of filters to the candidate account signals that work as a series of penalties and boosts to an overall advocate score. For example, the number of signals generated by the candidate account over the last 90 days may be used as an advocate score base value. Amounts may be are added or subtracted from the base value based on different metrics. For example, the advocate score may be increased or decreased based on a nuisance factor of the messages, account activity, signal sentiment, and/or how well the candidate account messages align with company messages.

The activity profile may also be based on the level of sustained activity over a monitoring time period. For example, the candidate account may have generated a burst of signals two months ago and may recently have generated very few signals. The candidate account may have generated the burst of signals in response to a particular company promotion and then signal activity may have faded. The candidate account still may be relevant to the company ecosystem but may no longer be considered an advocate due to the lack of sustained signal activity.

Operation 5626 may determine the types of interactions for the candidate account. Advocates may have a greater mix of message interactions then detractors. For example, advocates may echo messages from other accounts, such as by forwarding posts and/or relaying or re-tweeting messages. On the other hand, detractors may tend to promote their own agendas by creating more original posted messages and echoing a fewer percentage of messages from other accounts.

For example, a coffee company may publish an article regarding the low environmental footprint of their coffee. An advocate may reply to the article with a comment indicating the containers used for the coffee are not recyclable. The advocate also may post general messages asking the coffee company to consider using recyclable containers. Thus, the advocate account may have a mix of signal interactions that engage in different meaningful ways with the company ecosystem. On the other hand, a detractor may primarily post original messages complaining about the price or quality of the company coffee. Operation 5626 may increase or decrease the advocate score based on the number of original messages and echoed messages.

Operation 5628 may identify the number or ratio of unique signals to total signals generated by the candidate account. In one example, an ecosystem may comprise a Twitter® account for an energy drink company. A user may send 40 messages each asking the energy drink company to follow the user on a Twitter® account. The repetitive messages may not be considered particularly meaningful to the company compared with messages from other accounts that engage in different meaningful ways with the company ecosystem. Accordingly, a high ratio of unique signals to total signals may increase the advocate score for the candidate account and a low ratio of unique signals to total signals may decrease the advocate score for the candidate account.

Operation 5630 may identify the sentiment of the messages. As explained above, the sentiment can be determined from metadata that indicates a candidate account likes or dislikes the company, company brand, or company message. Word terms also may be analyzed to determine the message sentiment.

Operation 5632 may identify an alignment of candidate account signals with company signals. For example, a car company may release a new line of fuel efficient cars during the summer and may initiate a promotional campaign from the car company account promoting the fuel efficiency of the new car line. A candidate account may generate a large number of messages during the summer regarding vehicle fuel efficiency. The candidate account messages do not necessarily have to be directed just to the new car line released by the car company but also may be directed to electric cars and other fuel efficient cars sold by other car companies.

The candidate account also may post negative fuel efficiency messages about a pickup truck sold by a second car company and may post some positive fuel efficiency messages about a hybrid vehicle sold the second car company. The two groups of messages may not discuss the new line of cars released by the first car company, but operation 5632 still may determine that the messages are aligned with the latest marketing campaign of the first car company that promotes fuel efficient vehicles.

Other factors may also determine how well candidate account messages align with the company ecosystem message. For example, the user of the candidate account may adopt unique or distinctive terms, trademarks, tag lines, etc. from the car company marketing campaign. Adoption of the unique company terms may increase the advocate score for the candidate account. In another example, the car company ecosystem may comprise a Twitter® account for the United States. The candidate account may post messages in Spanish to the United States Twitter® account. Using a non-native language to post messages may decrease the advocate score for the candidate account.

The advocate score also may be changed based on interactions with the company account. For example, a candidate account may post a message criticizing a feature in the new car line. However, the car company may respond by thanking the user and notifying the user that the problem is under investigation. The positive acknowledgment by the car company may indicate a high level of importance given to the candidate account from the car company compared with messages from other candidate accounts that may be ignored by the car company. Accordingly, the advocate score may be increased for positive company responses and may be decreased for negative company responses or no company responses.

Operation 5634 may identify the social graph metrics for the ecosystem accounts. As mentioned above, the social graph metrics may identify the number of people/accounts that follow the candidate accounts and the number of accounts that the candidate accounts follow. The social graph metrics may represent a reach of the candidate accounts indicating one level of social influence in the social networks. The advocate score may be increased when the social graph metrics indicate a relatively large influence and may be decreased when the social graph metrics indicate a relatively low influence.

Operation 5636 may determine if the candidate account qualifies as an advocate account in the company ecosystem based on any combination of social metrics described above. For example, if the advocate score is above a threshold value, the candidate account is classified as an advocate. The candidate accounts that qualify as advocates then may be ranked in operation 5638. With everything else equal, advocate ranking may take into account the recency of the signals and the consistency of the signals over a given time period. For example, an advocate account that has interacted with the company ecosystem in a meaningful way over a last day may be ranked higher than another advocate account that has not interacted with the company ecosystem for several weeks.

The social analytic system may continuously update the advocate scores. For example, an existing advocate score may continuously be increased or decreased based on the latest social metrics calculated for a current day. If the latest social metrics increase the overall advocate score, the account may be ranked higher amount the ecosystem advocates. If the latest social metrics reduce the advocate score below a given threshold, the account may be reclassified from advocate to some other type of constituent. For example, the threshold may be a percentage of the average for the top two advocate scores. Any accounts with overall advocate scores falling below the threshold may be reclassified as influencers or markets.

Thus, companies can more efficiently and effectively allocate resources by responding to advocate messages, and/or following or friending advocate accounts. Accounts that stop interacting with the company ecosystem may eventually be removed as advocates and company resources may be directed to other accounts.

Figure 37:
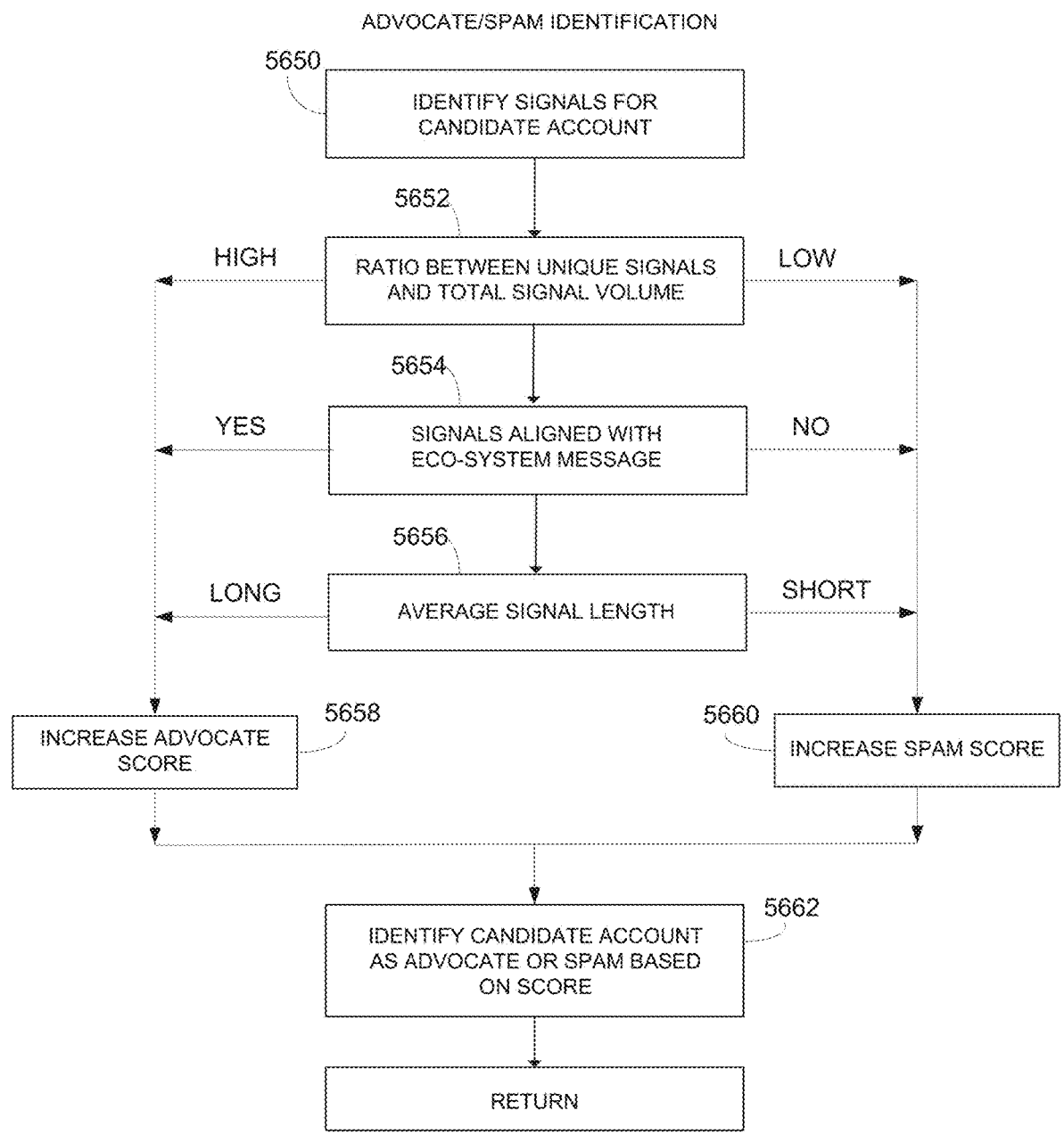
FIG. 37 depicts an example process for distinguishing between advocates and spammers.

FIG. 37 depicts one example of how spam accounts may be distinguished from advocates and other constituents. As mentioned above, a spam account may send messages considered to be an annoyance or nuisance to the company ecosystem. For example, spam accounts may generate a high volume of messages with few unique signals. The spam account may generate 200 signals in the company ecosystem with only 50 unique signals and 150 signals that are substantially the same or have little substance or original content.

In operation 5650, signals are identified for one of the candidate accounts. In operation 5652, a ratio is determined between the number of unique signals generated by the account and a total number of signals generated by the account over a time period. For example, the total number of signals may comprise the number of messages generated by the candidate account within the company ecosystem over a last week.

As mentioned above, the number of unique signals may be determined by comparing the words used in the messages. For example, the social analytic system may convert the text of the messages into term vectors. A similarity between the term vectors may be calculated using a vector space model that calculates the cosine of the angle between the vectors. Messages may be identified as unique when term vector angles compared with other term vectors are outside of some threshold.

A ratio is calculated between the number of unique signals and the total number of signals generated by the candidate account. The advocate score may be increased in operation 5658 for a high number of unique signals in relation to the total number of signals. A spam score may be increased in operation 5660 when the number of unique signals is relatively low in relation to the total number of signals.

In operation 5654 the advocate score and spam score may be adjusted based on the alignment of the candidate account signals with company messages. As explained above in FIG. 36, advocates may generate messages that are aligned with company messages. Conversely, a spam account may generate messages that have little relevance with company ecosystem messages.

As also explained above, the alignment of candidate messages with company messages may be determined by combining all of the messages generated by the company and generating a term vector from the combined messages. A second term vector may be generated for all of the candidate account messages. The two term vectors may be compared. The social analytic system may increase the advocate score in operation 5658 when angles for the two term vectors are closely aligned. The spam score may be increased in operation 5660 when the two term vectors are orthogonal or not closely aligned.

Operation 5656 may identify an average signal length for the candidate account messages. Spam accounts may generate messages with a small number of terms with irrelevant or insignificant content. For example, spam messages may only include a smiley face, a few non-descript words, or nonsensical phrases. These short messages may be computer generated "bot messages" or may be associated with individuals that did not put much thought or substance into the message.

The number and types of terms used in the candidate account messages may be identified in operation 5656. Particular terms with higher contextual substance may be given additional weight. For example, unique words used by the company ecosystem may be given a higher weight compared with conventional words. The social analytic system may increase the advocate score in operation 5658 when the account signals have a relatively long average signal length and may increase the spam score in operation 5660 when the account signals have a relatively short average signal length.

In operation 5662, the candidate account may be classified as an advocate account or a spam account based on the advocate score and/or the spam score. As mentioned above, thresholds may be determined based on the number of candidate accounts, highest and lowest advocate and spam scores, etc. Any candidate account with an advocate score above the advocate score threshold may be classified as an advocate account and any candidate account with a spam score above the spam score threshold may be classified as a spam account. Of course other factors may also be taken into account when classifying the advocate and spam accounts.

Figure 38:
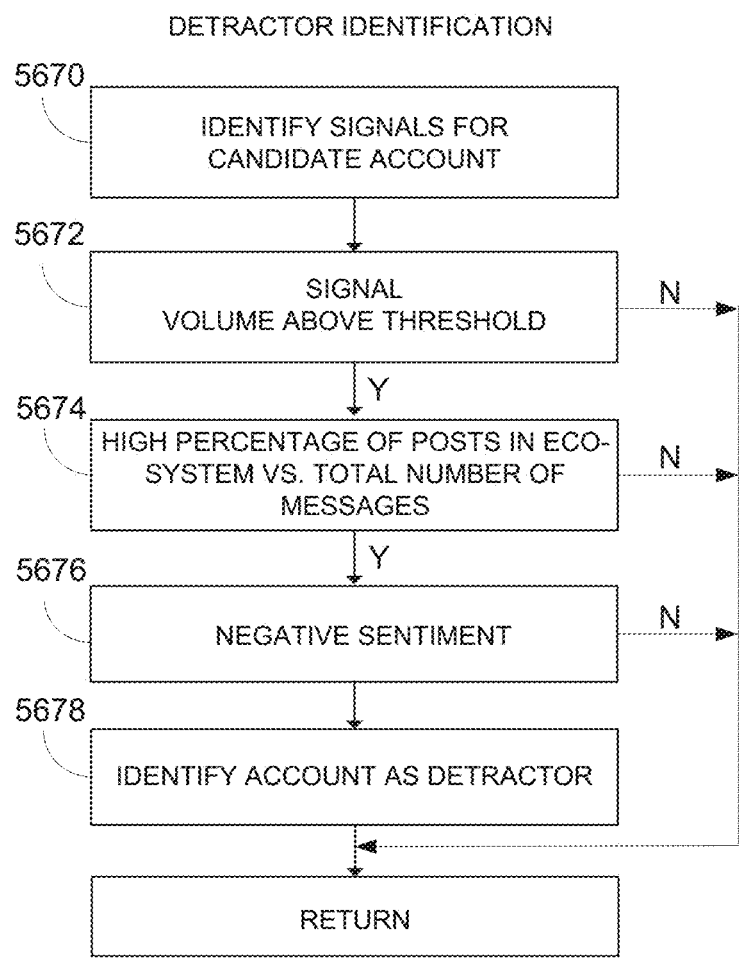
FIG. 38 depicts an example process for identifying detractors.

FIG. 38 depicts one example of social metrics that may be taken into account to identify detractors. Detractors like advocates may generate a lot of signal activity in the company ecosystem. However, the detractors may have an overall negative sentiment where advocates may have an overall positive sentiment. In operation 5670, the signals are identified for one of the candidate accounts. Similar to advocates, accounts with low signal volumes may be given less priority than accounts generating a large number of messages. Accordingly, operation 5672 may consider the candidate account for possible detractor classification when the signal volume is above a threshold value.

As mentioned above, detractors may be more interested in promoting their own agenda, as opposed to advocates that may be more interested in more substantive discussions related to company brands and issues. Detractors also may exhibit less social interaction within the company ecosystem. Accordingly, detractors may be less likely to echo messages from other accounts and more likely to post original messages promoting their own agenda. Operation 5674 determines the ratio of posted messages to total number of messages. For example, a Twitter message sent to @CompanyX may be considered a post into the CompanyX ecosystem. The message may alternatively be referred to as a mention of CompanyX, but still be classified as a post. A candidate account with a high ratio of posted messages may remain in the running for detractor status.

Operation 5676 may identify the overall sentiment of the messages. Operation 5678 may identify the candidate account as a detractor based on the social metrics identified in operations 5672-5676. On an aggregate, detractors also may maintain their negativity over a relatively long period of time. Thus, the amount of time the candidate account maintains any of the social metrics in operations 5672-5676 also may be taken into account when identifying detractor accounts.

Figure 39:
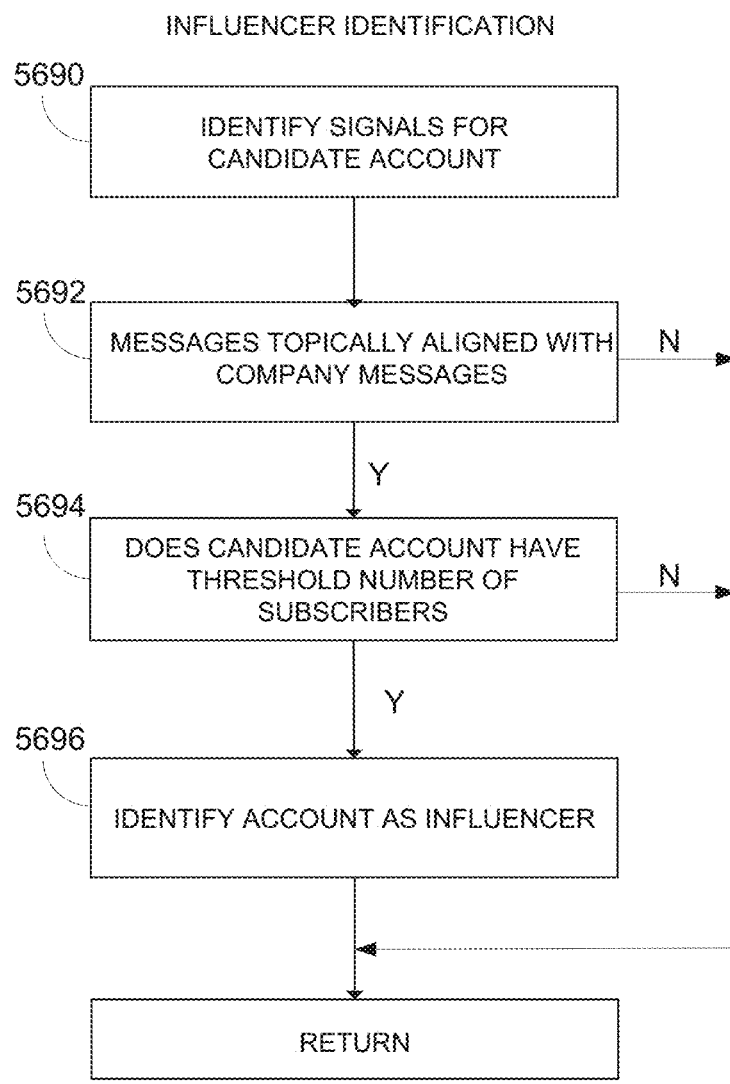
FIG. 39 depicts an example process for identifying influencers.

FIG. 39 depicts an example process for identifying influencers within the company ecosystem. An influencer may represent an account with a relatively large influence in social networks and also may have interests similar with the company ecosystem. For example, the company associated with the ecosystem may sell coffee. The influencer may have a general interest in coffee and may actively discuss coffee in social networks. The influencer may not interact enough with the coffee company ecosystem to qualify as an advocate or detractor. However, the influencer does have an interest in the same subject matter or issues promoted by the coffee company and may have a relatively large number of subscribers.

In operation 5690, the signals are identified for one of the candidate accounts in the company ecosystem. In operation 5692 the social analytic system may determine if messages from the candidate account are topically aligned with the company messages. For example, the social analytic system may compare a company topic vector with a candidate account topic vector. The candidate account messages may be determined to be topically aligned with the company messages when the two topic vectors are in relatively close alignment.

Operation 5694 may identify the number of subscribers for the candidate account. For example, the candidate account may have 1000 followers and/or friends. The number of subscribers may also take into account the number of times the candidate account messages are echoed, retweeted, or relayed, etc. by other accounts. A small number of subscribers may disqualify the candidate account as an influencer since a relatively few number of individuals are likely to read messages from the account. If the number of subscribers is above a threshold value, the candidate account may be identified as an influencer in operation 5696.

A list of company employees may be downloaded to the social analytic system subject in all cases to compliance with applicable laws and regulations. Alternatively, users may register as employees of the company. The social analytic system may identify the candidate accounts corresponding to the employee list as employee accounts. A variety of different signals may be collected from the employee accounts and some of the signals unrelated to the company brands or topics may be filtered out. Social metrics for the employee accounts may be separated from the social metrics derived for other candidate accounts. This may provide more accurate constituent classifications and rankings, since company employees may naturally generate large number of signals related to their company brands.

Employee accounts may be ranked based on any of the social metrics described above. For example, employee accounts may be ranked based on signal volume, signal recency, signal alignment with company message, message sentiment, and/or employee influence. Alignment of employee messages with company messages and positive employee sentiment may help determine if employees are properly representing the company message. For example, low employee ratings may indicate employees are discussing subjects that off topic from the brands or services that the company is currently promoting.

Partner lists also may be downloaded by the company to the social analytic system. For example, a list of accounts for company affiliates, subsidiaries, retailers, wholesalers, etc. may be downloaded. The candidate accounts associated with the partner list may be identified as partner accounts. Any other candidate accounts in the company ecosystem may be identified as market accounts. Any of the metrics described above also may be used for both ranking the partner accounts or market accounts and determining if the partner or market account messages are aligned with company messages.

The constituent classifications may be determined in any order. For example, the employee and partner accounts may be initially identified and separated from other candidate accounts. Advocate accounts then may be identified. Spam accounts may be identified while identifying advocates or may be identified during a separate identification process.

The constituent classifications help determine the effectiveness of company social networking. For example, the social analytic system may identify around 200,000 advocates, 20,000 thousand influencers, and around 80,000,000 market accounts for 20,000 company ecosystems. A company with a relatively few number of advocates and detractors may have a brand identity problem, since advocates and detractors may tend to seek out certain brands.

Figure 40:
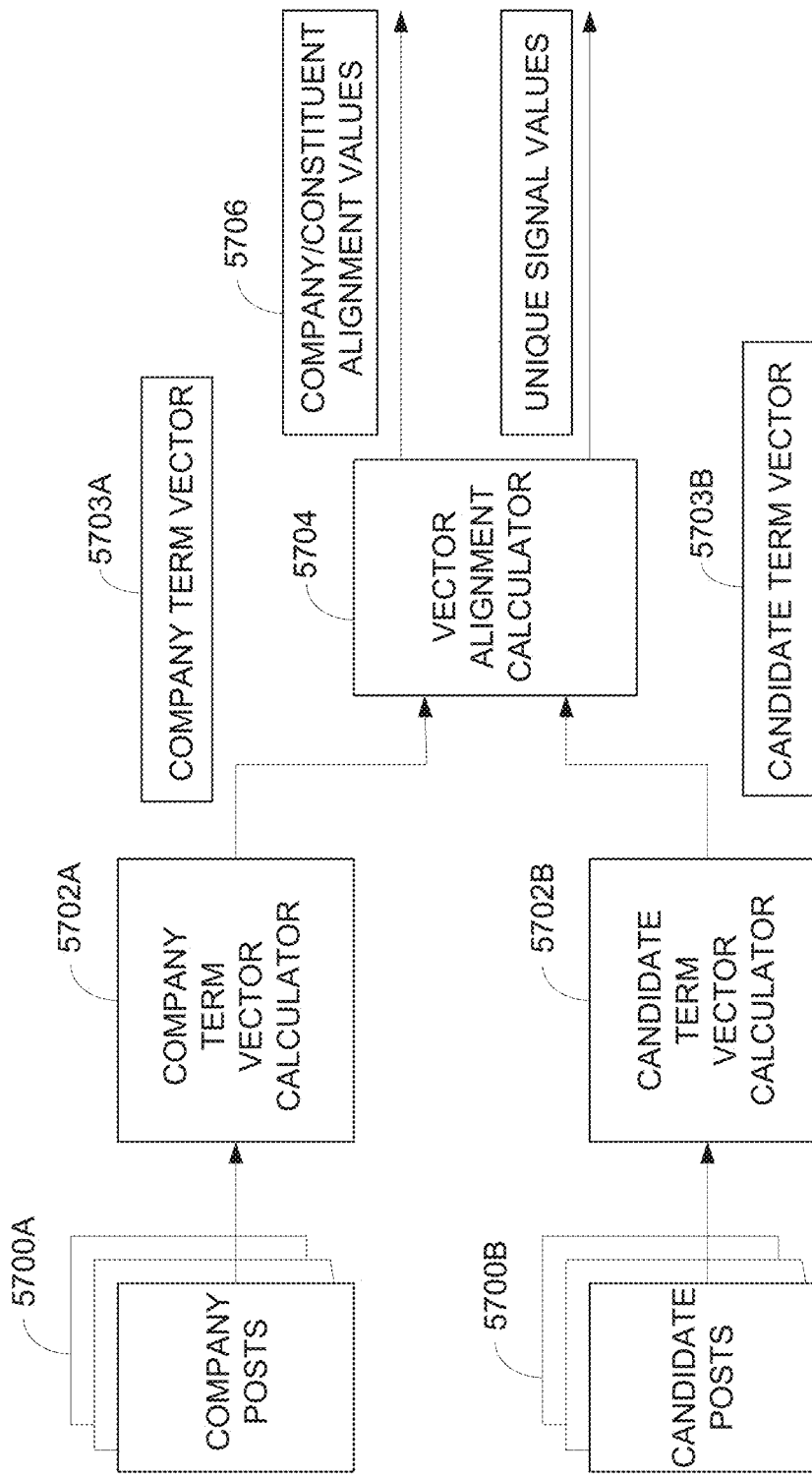
FIG. 40 depicts an example system for identifying similarity and uniqueness of social signals.

FIG. 40 depicts one example of how the social analytic system may determine signal alignments between candidate accounts and company/primary accounts and determine the number of unique signals associated with candidate accounts. This is just one example of how the context of natural language messages can be determined and compared with the context of other natural language messages.

Messages 5700A may be generated from a company account and may be accumulated into one of more files. Messages 5700A may be accumulated for some recent time period, such as for the last 30 days. For example, messages 5700A may contain posts generated from a coffee company account regarding a coffee machine sold by the company. Signals echoed from the company account might not be used since they may contain messages that do not originate from the coffee company account.

All of the messages 5700B for a candidate account may be accumulated in one of more files over the same 30 day monitoring period. For example, messages 5700B may include posts from an individual discussing coffee machines and coffee drinks.

A term vector calculator 5702A may generate a company term vector 5703A from company messages 5700A. A term vector calculator 5702B may generate a candidate term vector 5703B from all of the messages posted from the candidate account. Company term vectors 5703A and candidate term vectors 5703B may be generated for every social network account monitored by the social analytic system.

Term vectors 5703A-B may have different dimensions and weightings corresponding to different terms. For example, terms in messages 5700A-B may be weighted using a Term Frequency Time Inverse Document Frequency (TFIDF) weighting mechanism. The TFIDF weighting mechanism may identify and apply higher weights to unique terms in the company ecosystem.

For example, a coffee company may sell espresso machines that produce a thin layer of foam on top of a cup of espresso coffee. The thin layer of foam is sometimes referred to as crema and the company may post messages describing their coffee machines as producing the best crema. The term crema may frequently be used in the messages posted by the coffee company but might not be widely used outside of the coffee company ecosystem. Other coffee companies may use the term crema, but may not use the term as prominently as the coffee company associated with the ecosystem. An individual associated with the candidate account may post messages discussing certain espresso drinks with superior crema. Company term vector calculator 5702A may assign a high weight to the word crema, since the term is important to the coffee company ecosystem.

Alignment calculator 5704 may compare company term vector 5703A with candidate term vector 5703B and generate an alignment value 5706. For example, alignment calculator 5704 may calculate a cosine of the angle between term vectors 5703A and 5703B that corresponds with alignment value 5706.

Alignment value 5706 may be used to identify candidate accounts with similar interests as the coffee company ecosystem. For example, a high alignment value 5706 may indicate the individual associated with the candidate account is interested in crema but may not necessarily be familiar with the coffee company associated with the ecosystem that is promoting crema. Alignment value 5706 also may identify accounts that the coffee company should have known had similar interests but that somehow slipped through the cracks or accounts that were known but erroneously classified.

Term vector calculators 5702A-B and vector alignment calculator 5704 also may be used to identify the number of unique signals associated with an account. For example, two messages posted by the same account may contain substantially the same text or subject matter. Term vector calculator 5702B may generate term vectors 5703B for each of the two posted messages. Vector alignment calculator 5704 may generate high alignment values for two non-unique messages.

Term vectors and TFIDF weighting mechanisms are known and therefore not described in further detail. For example, vector space modeling is described in A VECTOR SPACE MODE FOR AUTOMATIC INDEXING, Communications of the ACM, Volume 18, Issue 11, November 1975; and Mahout, CREATING VECTORS FROM TEXT, https://cwiki.apache.org/confluence/display/MAHOUT/ Creating+Vectors+from+Text which are both herein incorporated by reference.

Figure 41:
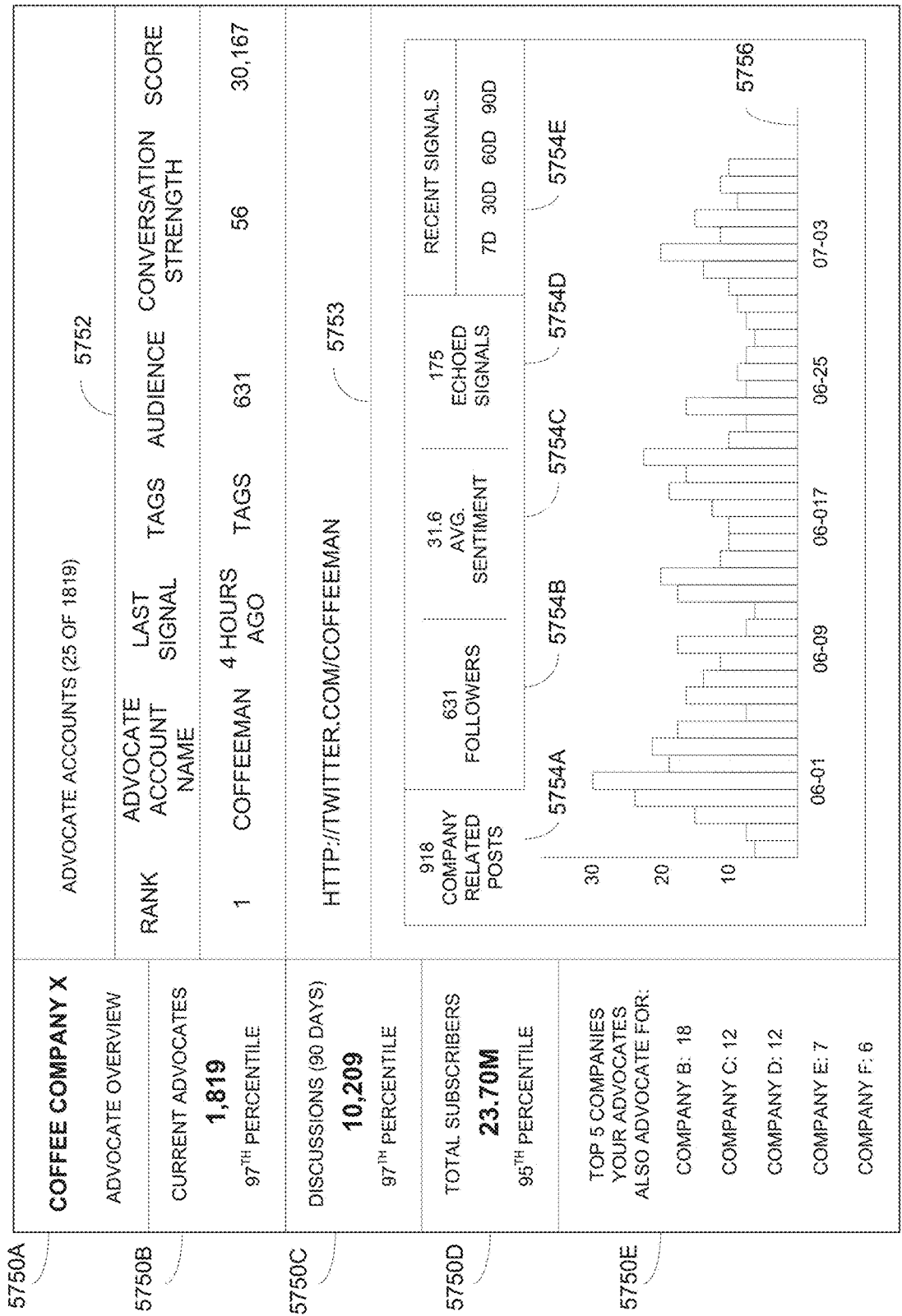
FIG. 41 depicts an example user interface for displaying constituent metrics.

FIG. 41 depicts one example of an electronic page 5740 displayed by the social analytic system showing social metrics for one of the advocate accounts for a company X. A field 5750A may identify the company X associated with the displayed metrics. A field 5750B may identify the number of advocates currently associated with company X as well as identify a ranking of the company based on the number of advocates. For example, based on the number and ranking of advocates, company X may be ranked in the $97^{th}$ percentile.

A field 5750C may identify the total number of advocate discussions detected in the company ecosystem over the monitored time period and a company ranking based on the number of discussions. Field 5750D may identify a total number of subscribers for the company advocates. For example, the number of subscribers may include all followers, friends, etc. for the company advocates. Field 5750E may identify other companies where the accounts are identified as advocates. For example, company X may have 18 advocates that are also advocates for company B.

A section 5752 may display social metrics for individual advocates. For example, an individual with the nickname CoffeeMan may be ranked as the number one advocate for company X. The account for CoffeeMan may be http://twitter.com/coffeeman. The last signal generated from the CoffeeMan account may have been 4 hours ago and the account may have an audience of 631. For example, the audience may comprise a number of followers. Friends may be a sub-set of the followers. The advocate account may have a conversation strength of 56 and an overall advocate score of 30,167. The conversation strength and the advocate score may be based on any of the social metrics described above.

Section 5753 may identify additional metrics for the advocate account. For example, a tab 5754A may identify the number of posts generated from the advocate account that are related to company X. A tab 5754B may identify a number of followers of the advocate account and a tab 5754C may identify the average sentiment for the messages relating to company X generated by the advocate account. A tab 5754D may identify a number of signals echoed by the advocate account or the number of advocate signals that have been echoed by other accounts.

A tab 5754E may select a time period for displaying advocate metrics, such as for a last week, a last month, a last two months, etc. Graph 5756 may show the number of messages posted from the advocate account for different days over the designated time period in tab 5754E.

Figure 42:
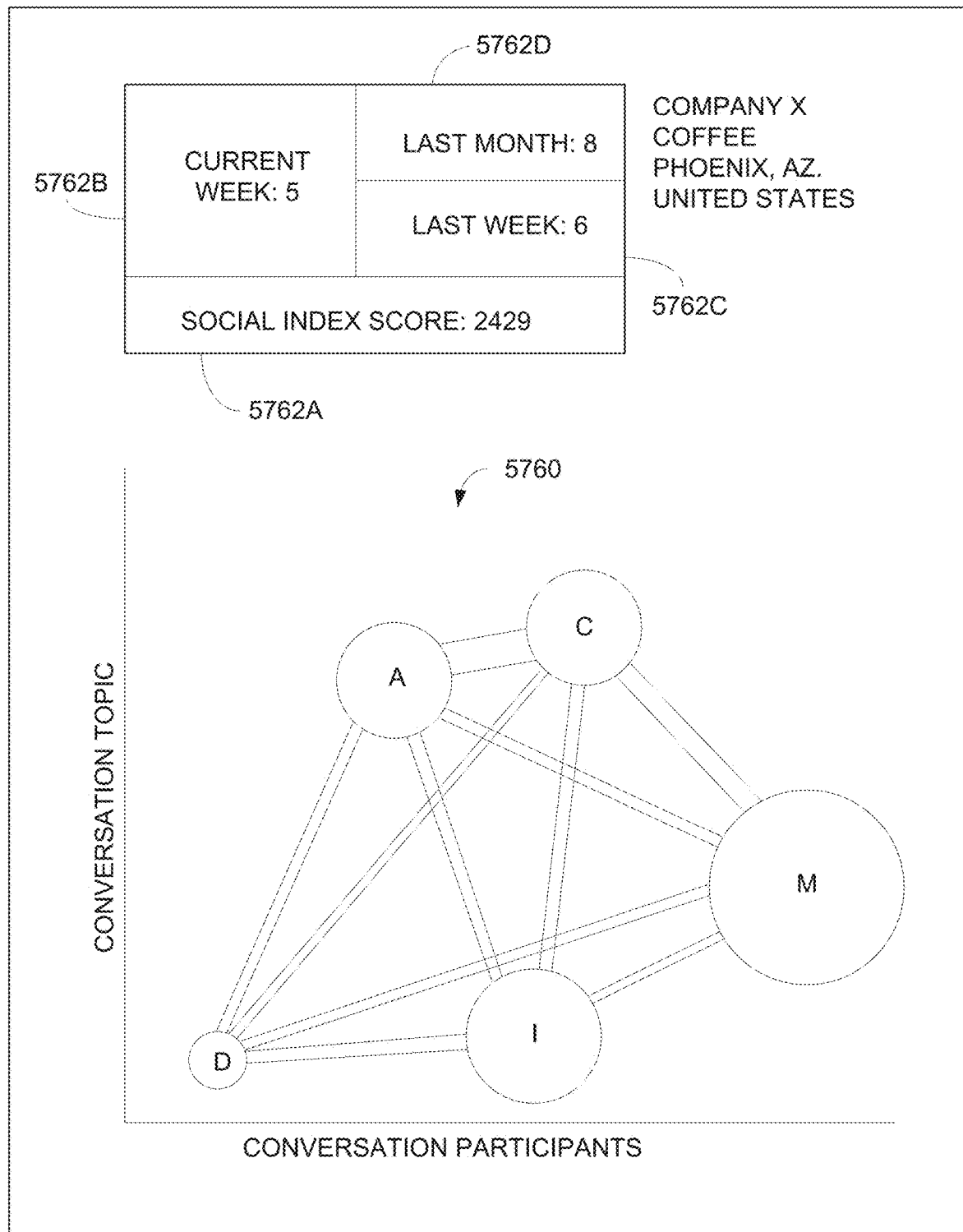
FIG. 42 depicts an example user interface for displaying a social business graph.

FIG. 42 depicts an example visualization of a Social Business Graph (SBG) 5760 identifying the strength of constituent accounts for a company ecosystem and the strength of the conversations among the constituents. The circles on the graph represent the constituent accounts, such as market accounts (M), company accounts (C), advocate accounts (A), influencer accounts (I), and detractor accounts (D). The size of each circle/globe may be based on a percentile rank of the constituent population for the company. For example, the size of the A advocate globe in the SBG will be large for a company that ranks in the top 97th percentile of number of advocates compared to another company whose advocate population ranks in the 17th percentile.

The social analytic system may generate an overall social index score 5762A for the company ecosystem based on any combination of the social metrics described above. Some of the social metrics may be associated with the number and types of constituents that have been identified for the company ecosystem. The company may be assigned a ranking 5762B based on the social index score 5762A. A previous week ranking 5762C and/or a previous month ranking 5762D may be displayed. The ranking can be based on all companies in the social analytic system or may be based on particular industries associated with the company ecosystem, such as apparel, food, automobiles, etc.

The x-axis of social business graph 5760 may identify conversation participants and may indicate the level of participation in conversations. For example, the x-axis may show how much constituents talk mostly to each other and how much constituents talk to others. X positions farther from the origin may indicate more cohesiveness in the community.

The y-axis may identify conversation topics that show the diversity or topic similarity of the constituency. For example, the y-axis may indicate how closely constituents work together or the diversity of constituent ideas. For example, circles further from the origin of the y-axis may indicate more closely aligned term vectors. The connections between the circles may have several aspects. For example, the thickness of the lines may represent sustained conversations, frequency of burst conversations, or the volume of the burst conversations.

In the following observations may be derived from SBI graph 5760. Company X appears to have strong advocates based on the large size of circle A. Advocates may communicate closely with the company X based on the similar position of circles A and C along the y-axis. For example, the high y-axis value of advocates A may indicate advocates A and company X have closely aligned term vectors.

Graph 5760 may also indicate a small number of detractors based on the small size of circle D. The detractors also do not appear to have close communications with company X based on the small y-axis value of circle D. For example, the low y-axis value may indicate the term vectors for detractors are not closely aligned with the term vector for company X.

Social Signal Correlation and Event Identification

Social analytic system 100 in FIG. 1 may perform different time series analytics on social signals 106. For example, social signal events, outliers, and/or predictions may be automatically identified based on the correlations between different time series data associated with the social signals. The identified events, outliers, and/or predictions may be used to better manage social media accounts.

Figure 43:
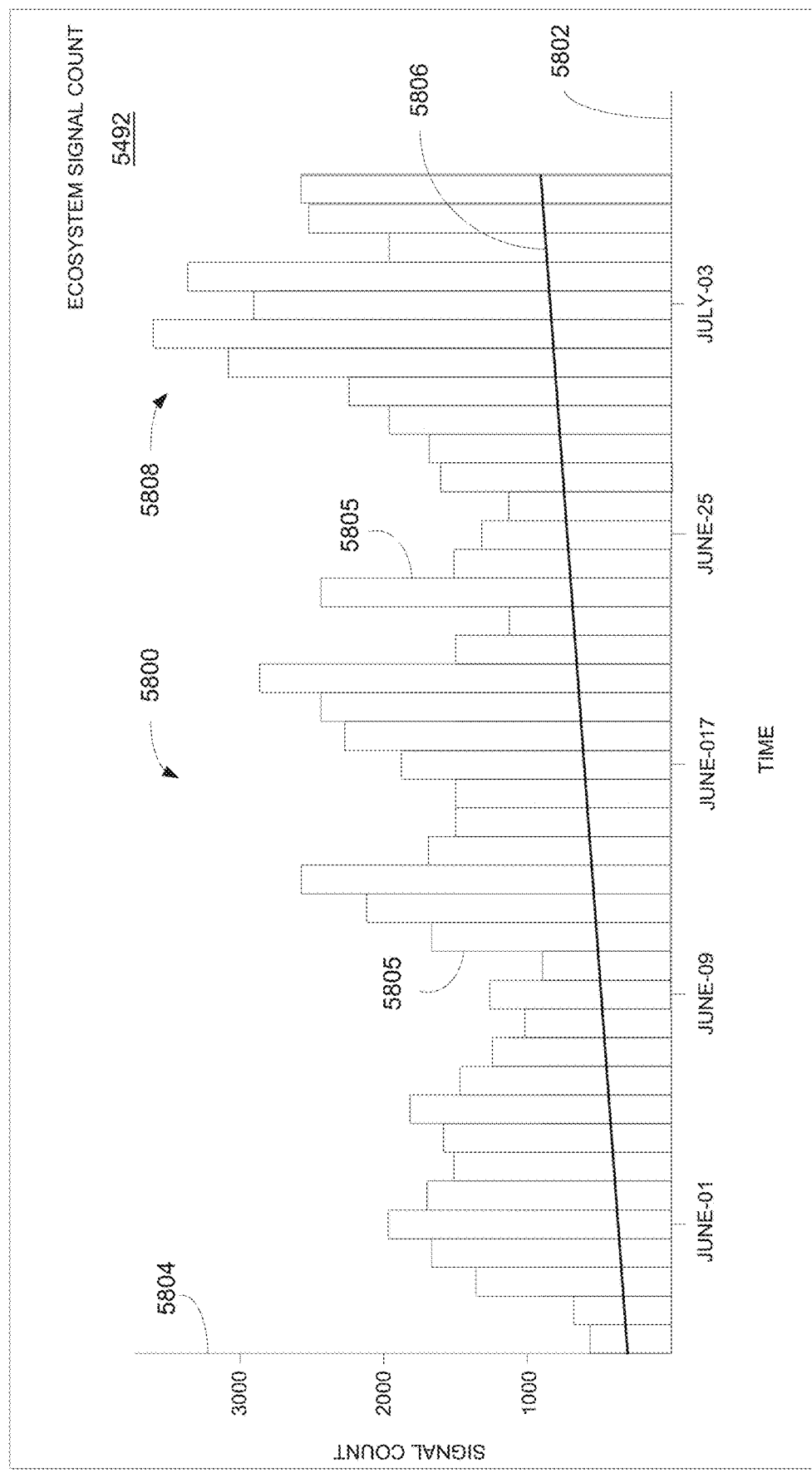
FIG. 43 depicts an example of a generic linear trend in time series social media data.

FIG. 43 depicts a graph 5800 showing one example of time series data 5805 associated with asocial signal metric for ecosystem 5492. For example, graph 5800 may identify the total number of social signals generated each day in ecosystem 5492. In this example, a horizontal X-axis 5802 may represent time and a vertical Y-axis 5804 may represent a total signal count for ecosystem 5492 for different time periods. The social analytic system may generate time series data for other social metrics. For example, time series data may be generated for an overall ecosystem sentiment or for individual constituents.

As described above, collectors may have collected social signals from one or more social networks associated with a particular company ecosystem. For example, every 30 minutes, the collectors may extract social signals, such as Tweets, re-Tweets, posts, messages, etc. The social signals may be aggregated together and counted for different time periods. For example, the analytic system may sum the total number of social signals generated within ecosystem 5492 for each 30 minute time period, hour time period, day time period, month time period, year time period, etc to derive time series data 5805.

The explanation below may describe signals associated with a particular ecosystem. However, it should be understood that any of the operations described may be performed for any aggregation of social signals associated with any combination of social networks.

Time series data 5805 identifies changes in the social signal activity for ecosystem 5492 over time. These variations may provide strategic information. For example, a decrease in the overall signal count may indicate a loss of consumer interest or an awareness in a brand associated with ecosystem 5492.

Some events associated with graph 5800 may not be readily apparent from viewing graph 5800 or may be misleading and not represent events specifically related to ecosystem 5492. For example, time series data 5805 may identify a generic or unrelated linear trend 5806 where the signal count for ecosystem 5492 progressively increases each day, month year etc. This could be interpreted as a positive increase in the number of users interacting in ecosystem 5492. However, the increased number of social signals may be attributed to generic or unrelated events not specifically related to activities within ecosystem 5492. For example, more social signals may be generated at certain times of the day, days of the week, and/or times of the year.

In another example, the increase in the number of social signals may be due to changes in the social websites supporting the ecosystem. For example, an overall increase in the number of Twitter users may result in a generic increase in the signal counts for many different ecosystems. Thus, generic trend 5806 may be unrelated to specific events associated with ecosystem 5492, such as a new social marketing campaign.

Generic trend 5806 may be misinterpreted as a unique ecosystem event or may hide other events that are specifically related to ecosystem 5492. For example, a large increase in overall ecosystem signal count may be detected during a time period 5808 around the first part of July. The company operating ecosystem 5492 may have released a new product and/or launched a social media campaign for the new product around the same time period 5808. It may not be clear from viewing time series data 5805 if the increased signal count at time period 5808 is due primarily to a generic periodic increase in social signals over the fourth of July weekend or primarily due to the social media campaign launched by the company operating ecosystem 5492.

The social analytic system may remove generic trend 5806 and other periodic seasonal trends that may exist in time series data 5805. For example, the social analytic system may perform a differencing process on time series data 5805 that removes generic trend 5806. In this example, generic trend 5806 is linear. However, other generic trends may also be removed that have other linear or periodic patterns.

Figure 44:
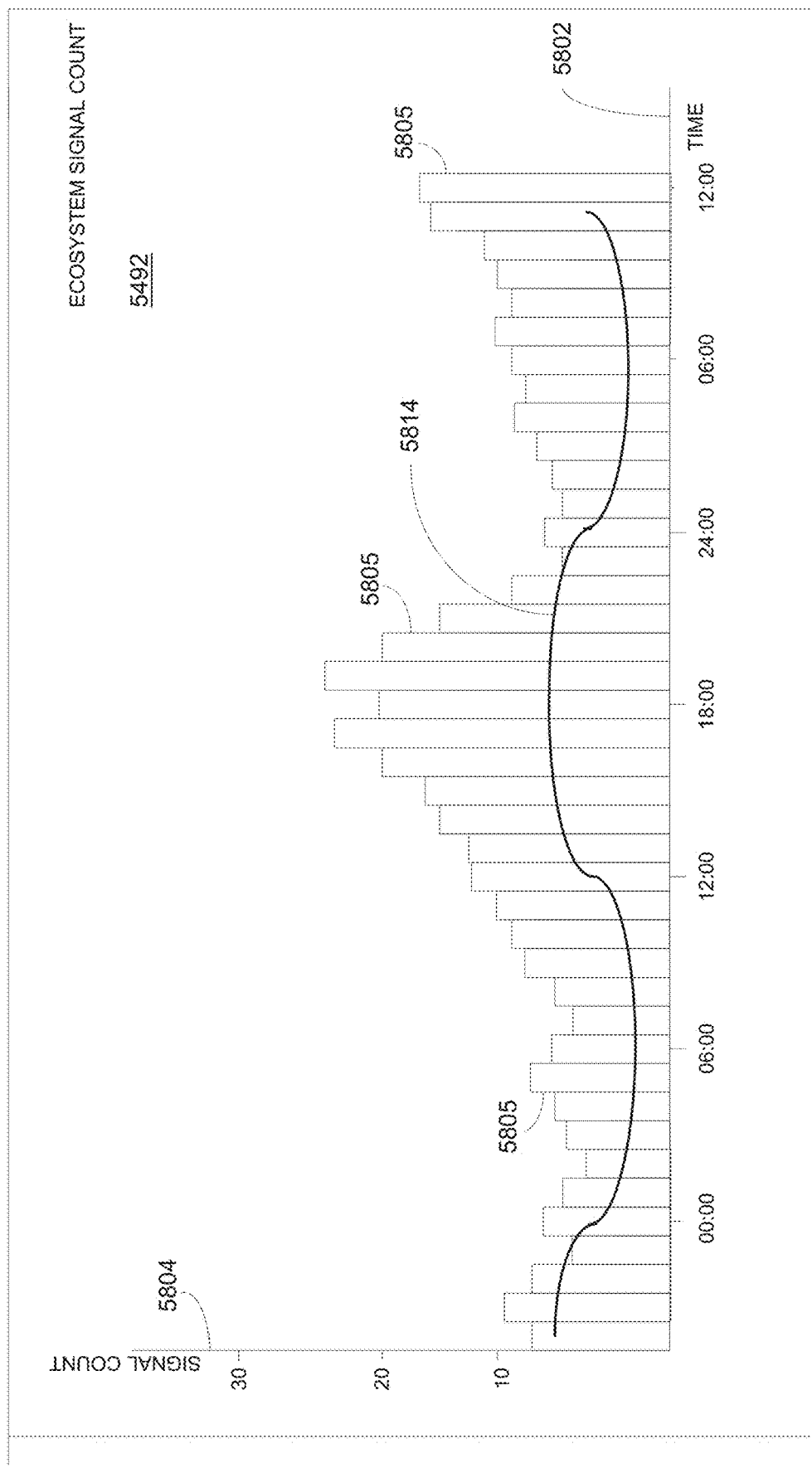
FIG. 44 depicts an example of a generic periodic trend in time series social media data.

For example, FIG. 44 depicts a generic or unrelated periodic or seasonal trend 5814 that also may exist within time series data 5805. In this example, vertical axis 5804 may again identify the total signal count for ecosystem 5492 and horizontal axis 5802 may identify one hour time periods during a day.

The total signal count in time series data 5805 may periodically start to increase each day around 6:00 am, peak sometime around 6:00-7:00 pm in the evening, and then continue to decrease until around 6:00 am the next morning. At least some portion of the signals counted in data 5805 may be generic and not directly attributable to events within ecosystem 5492. For example, at least some of the increase in signal count during the day may be attributed to the sleep, work, and recreational habits of social website users. Other ecosystems may experience similar generic periodic changes in overall signal count. These generic periodic/seasonal trends 5814 also may be removed from time series data 5805 to help isolate signal metrics directly related to ecosystem 5492. For example, a periodic differencing filter also may be applied to time series data 5805.

Figure 45:
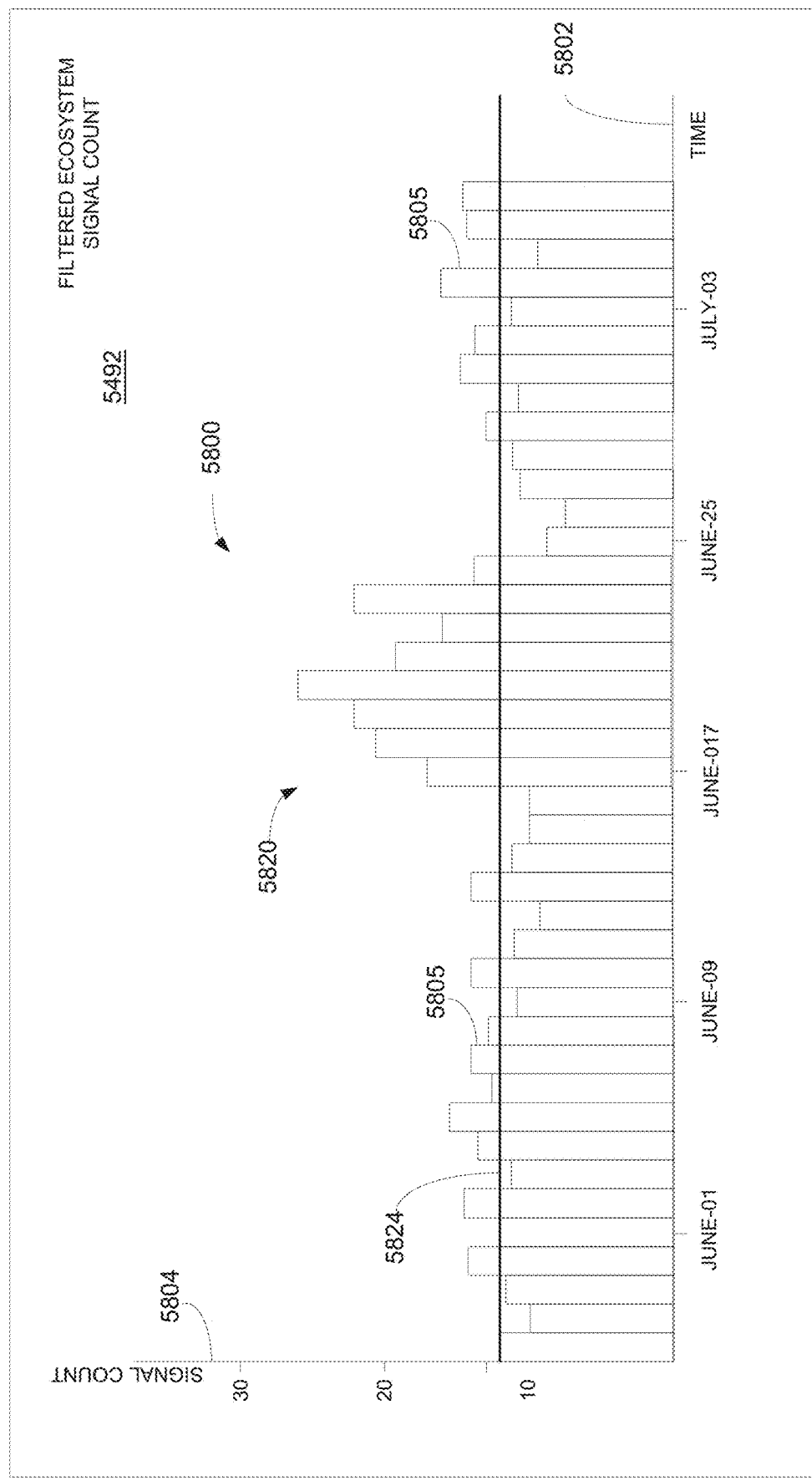
FIG. 45 depicts an example of filtered time series social media data.

FIG. 45 depicts an example of time series data 5805 that has been filtered to remove generic linear trend 5806 shown in FIG. 43 and generic periodic trend 5814 shown in FIG. 44. Filtered time series data 5805 still may contain noise but may represent a normalized ecosystem response. A line 5824 may alternatively be referred to as an ecosystem trend and may represent an average normalized time series response for filtered time series data 5805. For example, assuming no unique events occur in ecosystem 5492 that cause signal variations, an average overall signal response for ecosystem 5492 may be a straight line.

Underlying events, trends, patterns, and/or anomalies within filtered time series data 5805 are more likely to be associated specifically with ecosystem 5492 instead of associated with generic social network events. For example, filtered time series data 5805 may have a substantially greater signal count around time period 5820. Filtered time series data 5805 has been filtered to remove changes in the signal count attributable to generic social events, such as a general increase in the number of Twitter users or seasonal changes in social media usage. Thus, the increased signal count around time period 5820 may be more likely to be related to a specific ecosystem event, such as a new product release, product recall, marketing campaign, etc. associated with the company operating ecosystem 5492.

A substantial change in time series data 5805 may be identified as an event, anomaly and/or outlier. For example, the analytic system may compare the values of data 5805 with values for mean or normalized ecosystem trend 5824 at associated time periods. Differences between the two values outside of a threshold range and/or that extend outside of a threshold range for more than a predetermined time period may be identified as an anomaly.

Figure 46:
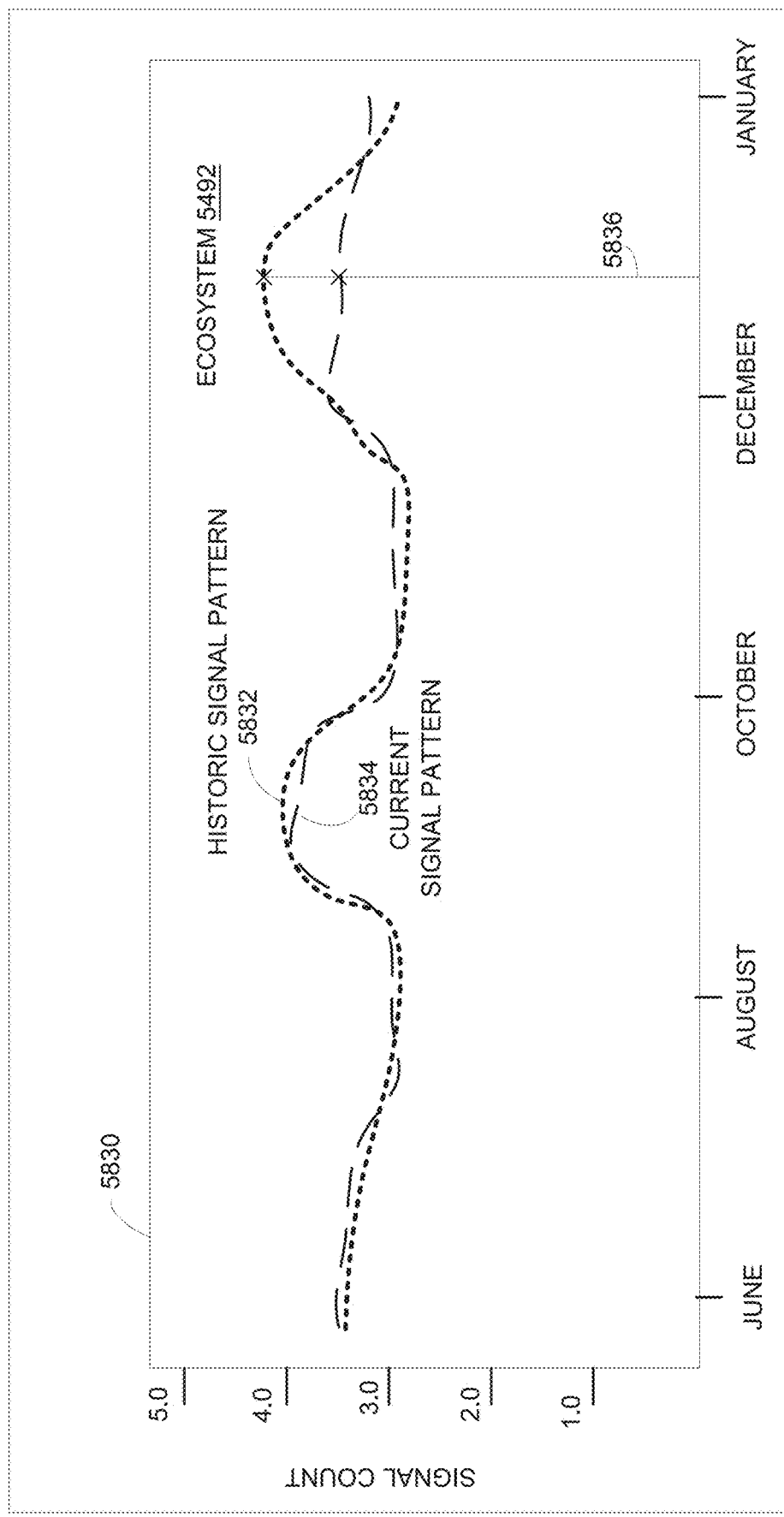
FIG. 46 depicts an example of an anomaly detected in time series social media data.

FIG. 46 depicts a graph 5830 showing two different time series data sets related to ecosystem 5492. A first line represents a first time series data set 5832 and identifies a historic signal count for ecosystem 5492 over a 6 month time period. For example, data set 5832 may identify the average overall signal count generated in ecosystem 5492 over a six month time period for a past five years. Historic data set 5832 may have been filtered to remove the generic linear and periodic trends discussed above. A second line represents a second time series data set 5834 for the overall signal count over a current or most recent six month time period.

Graph 5830 may be used to forecast social signal activity and identify social media anomalies. For example, over a previous five years ecosystem 5492 may have repeatedly generated more signals during the end of summer and around Christmas. This may be associated with annual social media promotions or a specific increase in brand awareness for the company operating ecosystem 5492 during those time periods. For example, ecosystem 5492 may create more Tweet messages around the end of summer and around Christmas by initiating back to school and Christmas sales campaigns. If similar campaigns are initiated for a current year, similar signal count increases may be forecast in data set 5834.

The current number of messages generated in ecosystem 5492 during a most recent hour, day, week, month, etc. may be identified in current data set 5834 and compared with values in historic data set 5832 for corresponding time periods. The social analytic system may identify any significant variation between the values in historic data set 5832 and current data set 5834 as an event, such as an anomaly.

For example, at a time period 5836 between December and January the count values for data set 5834 may be 20% below the expected signal count value identified in historic data set 5832. The social analytics system may automatically detect the substantial deviation between data sets 5832 and 5834 as an anomaly event and send an associated message to an administrator of ecosystem 5492, such as a brand manager. The message may contain graph 5830 and/or identify the 20% decrease from the expected total signal count for ecosystem 5492.

Comparison of data sets 5832 and 5834 may identify other problems or events that may or may not be associated with ecosystem 5492. For example, a decrease in the expected signal count may be attributed to the company discontinuing the traditional back to school and holiday sales campaigns. Alternatively, the decrease in the expected signal count may be due to problems with the social website serving as a platform for ecosystem 5492, social signal collection problems, and/or analysis problem. For example, the website associated with ecosystem 5492 may have temporarily shut down or the collectors extracting the social signals may have been temporarily disconnected from the website.

Figure 47:
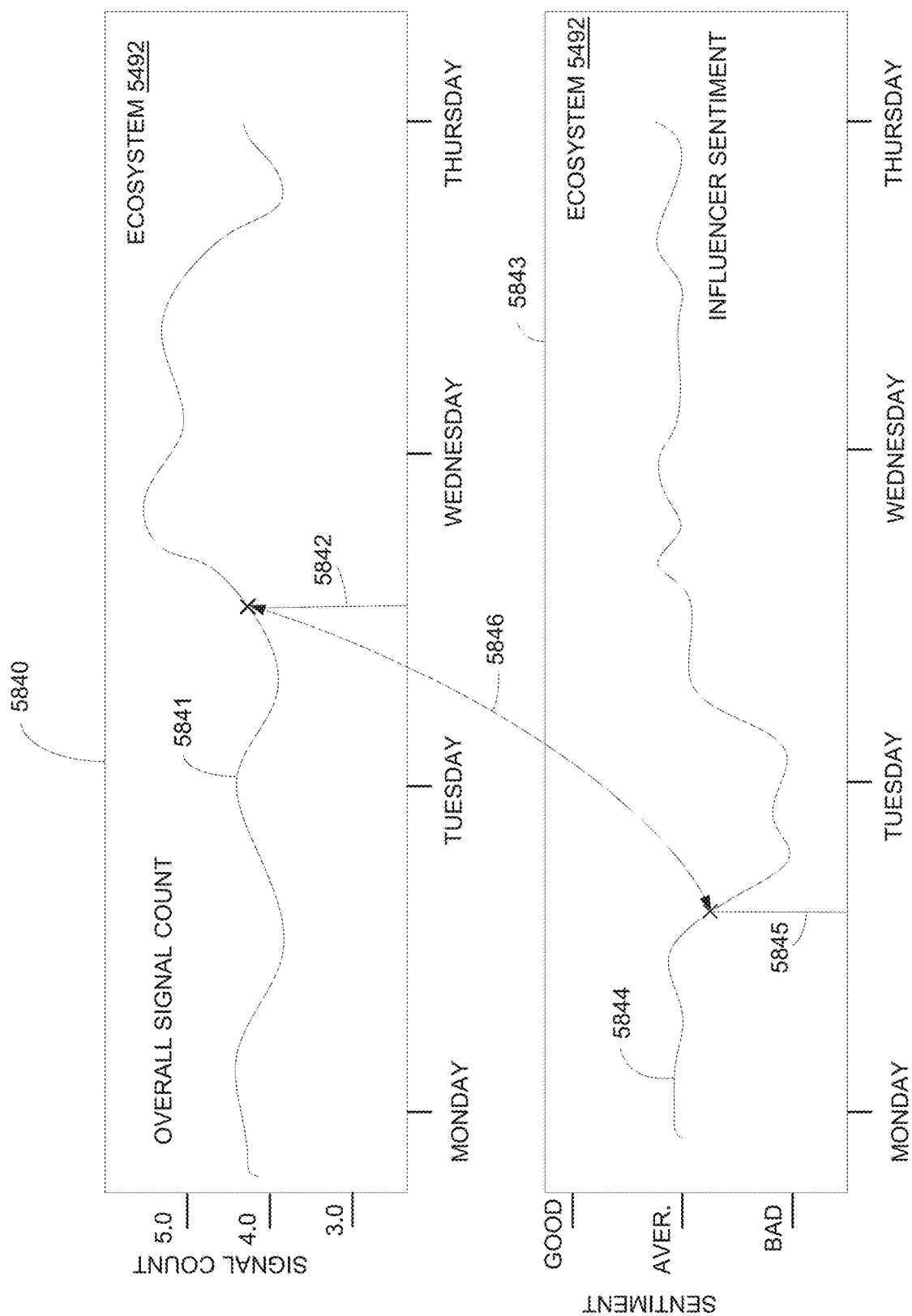
FIG. 47 depicts an example of how related events may be identified in correlated social media data sets.

FIG. 47 depicts example time series data sets associated with different social metrics. In this example, graph 5840 shows an overall signal count for ecosystem 5492 and graph 5843 shows an overall sentiment for influencers associated with ecosystem 5492. Graph 5840 shows for a filtered time series data set 5841 that identifies the signal count values. As also explained above, different types of constituents may be identified for ecosystem 5492 and the sentiment may be determined for the different constituents. A second filtered time series data set 5844 may identify the influencer sentiment values for ecosystem 5492. A higher sentiment value may be associated with a more positive sentiment, a lower sentiment value may be associated with a more negative sentiment, and a median sentiment value may be associated with an average sentiment.

Data sets 5841 and 5844 may visually and/or mathematically identify relationships between different social metrics. For example, the influencer sentiment values, or a rate of change of the influencer sentiment values, may substantially decrease around a time period 5845. The overall signal count may substantially increase a day later around time period 5842.

Correlating data set 5841 with data set 5844 may identify a relationship 5846 between the reduced influencer sentiment at time period 5845 and the increased signal count at time period 5842. For example, the social analytic system may determine that data sets 5841 and 5844 are highly correlated and that drops in influencer sentiment may cause the increases in the overall signal count for ecosystem 5492.

Relationship 5846 may be used to predict future social media events. For example, relationship 5846 may indicate that negative messages sent by influencers have the most significant impact on the overall signal count of ecosystem 5492. Based on relationship 5846, the social analytic system may monitor data set 5844 and send messages to the company operating ecosystem 5492 whenever the influencer sentiment drops below a threshold amount. The message may identify the sharp decrease in influencer sentiment at time 5845 and may also include a prediction indicating when and how much the overall signal count is predicted to increase at time 5842.

The account manager for the company operating ecosystem 5492 may review messages sent from influencers around time 5845 to determine why the sentiment value decreased. A social media campaign can then be launched to address the issues associated with the sentiment drop. For example, the company operating ecosystem 5492 may send messages from their social website account addressing a product defect being discussed in the influencer messages.

Data sets associated with any variety of different social metrics and/or constituents may be may be compared and correlated by the social analytic system. For example, data sets associated with different advocates, spammers, detractors, influencers, employees, and market accounts may be compared and/or correlated. For example, the sentiment values of advocate accounts may be correlated with the sentiment values for market accounts. As shown above, data sets associated with different constituents also may be compared with data sets associated with other ecosystem metrics, such as overall signal count, conversation strength, overall sentiment, ecosystem strength/ranking, signal alignments, number of followers, etc. Further, data sets associated with one ecosystem may be compared and/or correlated with data sets associated with other ecosystems or data sets associated with multiple ecosystems.

Figure 48:
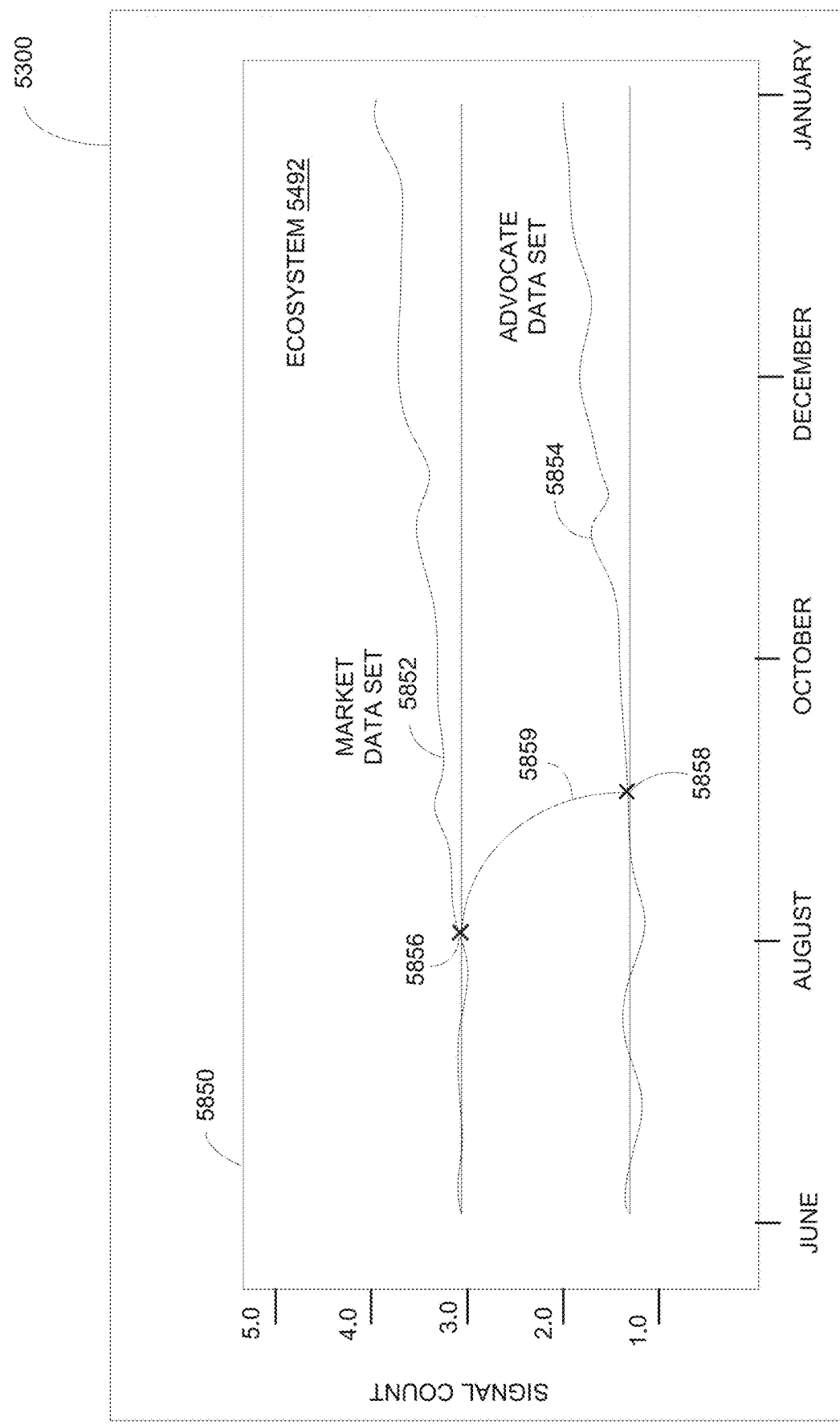
FIG. 48 depicts an example of how events may be predicted in correlated social media data sets.

FIG. 48 depicts examples of two data sets associated with two different constituents. A graph 5850 shows a first line representing a time series data set 5852 tracking a signal count for market constituents of ecosystem 5492 and a second line representing a second time series data set tracking a signal count for advocates of ecosystem 5492. First data set 5852 identifies the number of messages generated by market constituents over several months and data set 5854 identifies the number of messages generated by advocate constituents over the same several months.

Data sets 5852 and 5854 may have been filtered to remove the generic linear and periodic trends described above in FIGS. 43 and 44 and then correlated. A high correlation value might indicate a relationship between some events in the two data sets. For example, data set 5852 shows the total number of signals generated by market constituents staying relatively constant until around August and then gradually increasing starting around time 5856. Data set 5854 shows the total number of signals generated by advocate constituents staying relatively constant until around September and then gradually starts increasing starting around time 5858.

A high correlation value may mean one or more relationships 5859 exist between data sets 5852 and 5854. For example, relationship 5859 may indicate that advocates become more involved in brands, services, products, etc. associated with ecosystem 5492 in response to increased general market activity for ecosystem 5492. In other words, relationship 5859 may indicate that the activity of market constituents trigger or drive the activity of advocate constituents. Accordingly, the company operating ecosystem 5492 may decide to direct more marketing resources toward general customer marketing and direct fewer marketing resources toward advocates.

Figure 49:
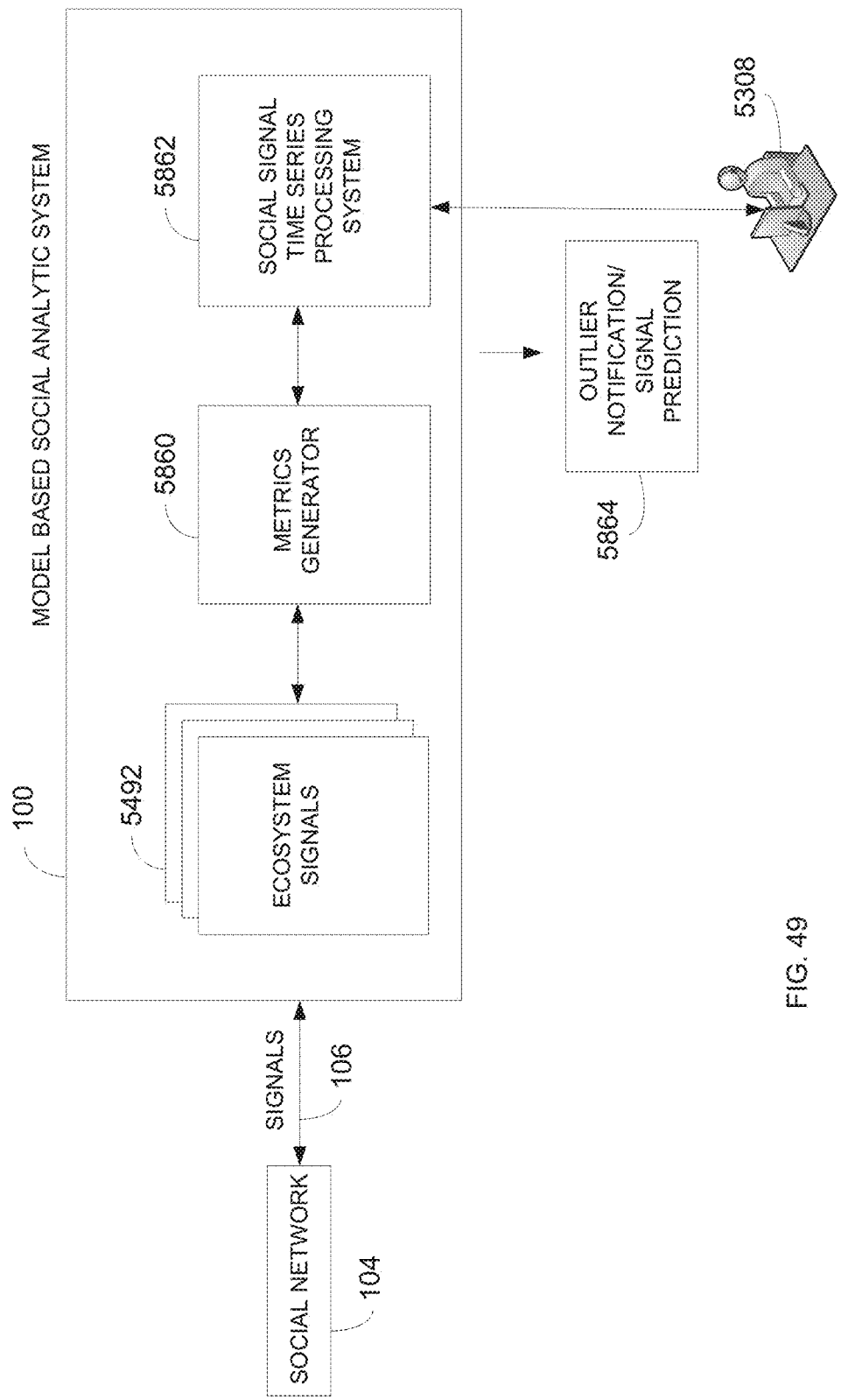
FIG. 49 depicts an example of a social analytic system configured to temporally correlate social signals.

FIG. 49 depicts an example of the analytic system automatically identifying social signal events. Social signal events and/or ecosystem events may comprise any relationship, trend, outlier, prediction, value, comparison, characteristic, or the like, or any combination thereof that may exist in one or more time series data sets. The events may not be readily observable by simply viewing graphs of the time series data. Social analytic system 100 may use filtering and correlation schemes described above to identify the events.

Collectors may collect social signals 106 from one or more social networks 104 as described above. As also described above, social signals 106 associated with the same ecosystems 5492 may be aggregated together. As also described above, different metrics may be generated for different ecosystem and ecosystem constituents. For example, constituent classifier 5552 in FIG. 34 may identify different constituents associated with different ecosystems 5492.

Metrics generator 5860 may then calculate different metrics for the ecosystems 5492 and the identified constituents. For example, metrics generator 5860 may derive time series data sets associated with signal counts, rankings, followers, signal alignments, sentiments, social graph metrics, etc. for individual constituents or for any combination of constituents. Metrics generator 5860 also may generate time series data sets associated with overall ecosystems metrics, such as conversation strength, brand strength/ranking, number of followers, overall sentiment, overall signal count, etc.

A social signal time series processing system 5862 may filter the time series data sets generated by metrics generator 5862 as described above. For example, processing system 5862 may remove the generic linear and periodic trends in the data sets associated with ecosystem 5492 and that may also exist in the data sets for other ecosystems. Processing system 5862 then may automatically identify events in the filtered data sets, such as outliers, correlation values, relationships, and/or predictions of future events.

Processing system 5862 also may automatically send messages 5864 to computing device 5308, or display graphs on computing device 5308, that identify the events, relationships, outliers, and/or predictions for ecosystem 5492. For example, message 5864 may identify a signal count for a particular type of constituent that is outside of a particular threshold. In another example, message 5864 may predict an increase in the overall signal count for ecosystem 5492 at a particular time based on an identified increase or drop in constituent sentiment at a particular time. Any other time series data may be correlated and any associated events identified. In one example, metrics generator 5860 and social processing system 5862 may be operated within measures 5302 and/or social business index 5304 in FIG. 18. Metrics generator 5860 and processing system 5862 may be implemented in any combination of software and/or hardware.

Figure 50:
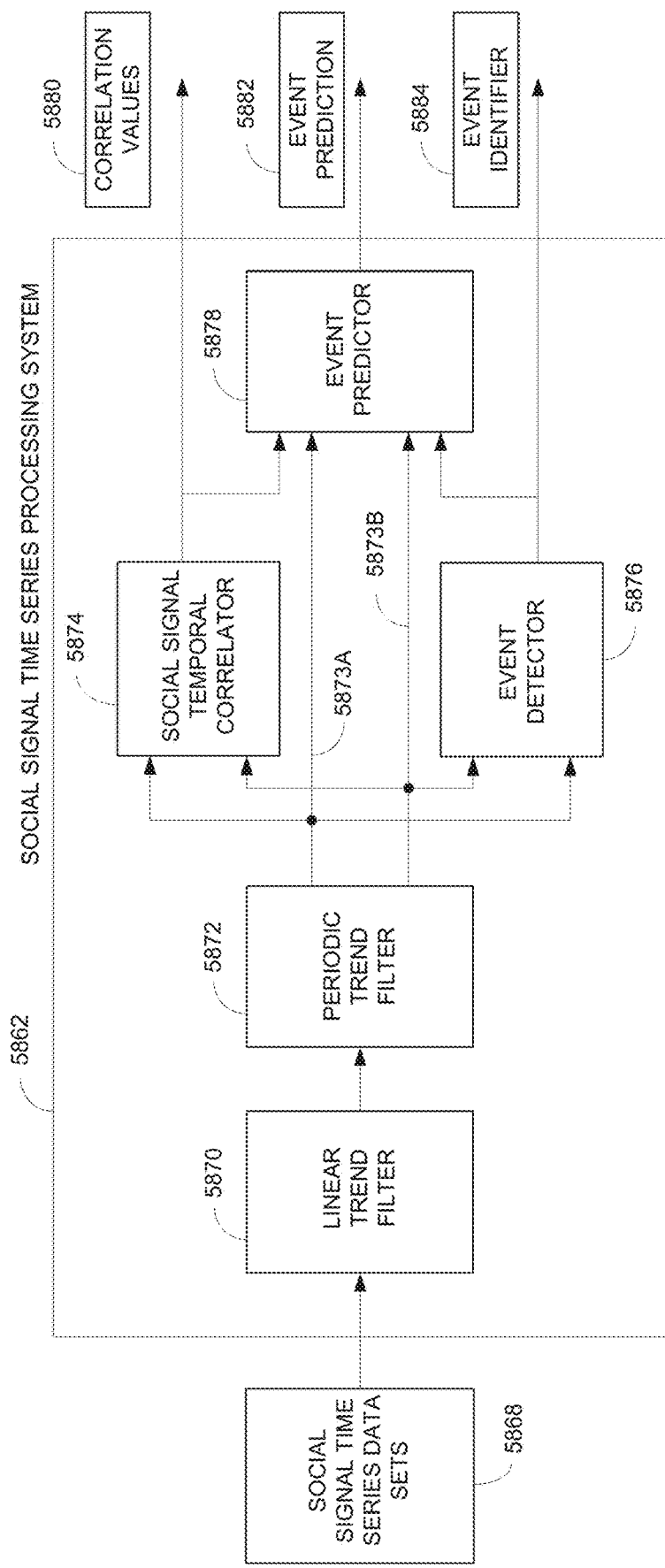
FIG. 50 depicts an example of a social signal time series processing system.

FIG. 50 depicts in more detail time series processing system 5862. Metrics may be derived for the ecosystem for different time periods producing different time series data sets 5868. For example, as explained above, one data set 5868 may be identify overall signal count values for a particular ecosystem for each hour, each day, each month, etc.

A linear trend filter 5870 may remove generic linear trends from data sets 5868. As explained above, generic linear trends may represent changes in the data set values that may not be directly related to events associated with the ecosystem or that may also exist in other ecosystems. For example, a particular data set 5868 may indicate an increase in the number of ecosystem followers. The increased number of followers may be due to an increased membership for the associated social network, such as Twitter, and other ecosystems may experience a similar increase in the number of followers.

A periodic trend filter 5872 also may be applied to data sets 5868 to remove generic periodic signal behaviors that again may not be directly associated the ecosystem. Periodic trend filter 5872 may remove seasonal variations in the signal counts attributed to specific times of day, times of the month, or times of the year. For example, many different ecosystems may experience a similar increase in signal count over the holidays. Periodic trend filter 5872 may remove the generic periodic holiday signal increase from data sets 5868.

Filtered data sets 5873A-B output from filters 5870 and 5872 may represent fundamental behaviors of the ecosystems plus noise. With large amounts of social signals at 8.4 least some of the noise may cancel out. Thus, the filtered time series data sets 5873A-B may better identify events directly related to specific ecosystems. For example, an increase in the sentiment in a first filtered data set 5873A or an increase in the signal count of a second filtered data set 5873B may be more likely due to messages or events specifically related to the ecosystem. For example, the increased signal count in data set 5873B may more likely be related to a marketing campaign launched by the company operating the ecosystem as opposed to more people generally sending more Twitter messages over a weekend.

Several known filtering techniques may be used in filters 5870 and 5872. For example, a differencing algorithm may determine an amount of change in the data set values between adjacent time periods. Linear trend filter 5870 may determine a signal count for a first day and a signal count for a second day and subtract out the difference from the signal count for the second day. The time periods may be seconds, minutes, hours, days, months, etc.

In another example, a linear regression scheme may calculate a linear characteristic of a data set 5868 is calculated over time. The linear characteristic may then be subtracted from data set values at corresponding times. Other linear and/or non-linear data transformations may be performed before or after the differencing algorithm or linear regression algorithm.

Some generic trends may be nonlinear. For example, a first portion of a generic trend may increase at a first rate, a second portion of the generic trend may decrease at a second rate, and a third portion of the generic trend may increase exponentially. Filters 5870 and/or 5872 may filter data sets 5868 piece wise over different time periods. For example, a first generic linear trend having a first slope may be identified and removed from the first portion of the data set, a second generic linear trend having a second slope may be identified and removed from the second portion of the data set, and a third filter may remove the exponentially increasing trend from the third portion of the data set.

Periodic trend filter 5872 may use algorithms similar to the differencing algorithms used in linear trend filter 5870 except instead of calculating the difference for each time step, fixed time steps of seven days, one month, or one year, etc. may be used. Different periodic trend filters may be applied on top of each other to remove weekly, monthly, and/or yearly periodic patterns. For example, a first periodic filter may remove generic periodic day to day variations in data sets 5868. A second periodic filter may remove generic periodic weekly variations in data sets 5868 and a third periodic filter may remove generic periodic monthly variations in the data sets 5868.

Processing system 5862 may make assumptions regarding filtering periods based on known social media characteristics. For example, processing system 5862 may assume more social signals are generated in the evening after work. Processing system 5862 also may assume that more social signals are generated during weekends than during weekdays. Specific filters 5870 and 5872 may be used to remove these known generic traits in data sets 5868.

Selected portions of data sets 5868 also may be input into processing system 5862 based on known events. For example, a user interface may be changed on a Twitter website. A portion of data sets 5868 that starts after the Twitter user interface changed may be input into processing system 5862. The portions of the data sets associated with the new Twitter interface may be compared with historical data sets. For example, the data set associated with the new user interface may be compared with a historical data set for a same metric from a previous month or may be compared with a historical data set for a same month from a previously one or more years.

A social signal temporal correlator 5874 may generate correlation values 5880 for different social signal data sets 5873A-B. For example, temporal correlator 5874 may use a primary component analysis algorithm or a correlation matrix algorithm to identify highly correlated data sets 5873A-B. Linear analysis may be used to identify linear relationships between the data sets 5873A-B and non-linear analysis, such as a polynomial fit linear regression, may be used to identify non-linear relationships between data sets 5873A-B.

Correlation value 5880 may indicate a correlation level between a first data set 5873A associated with an overall signal count for the ecosystem and a second data set 5873B associated with an advocate strength level for the ecosystem. In one example, a larger correlation value 5880 may indicate a higher correlation between the two data sets and a lower correlation value 5880 may indicate a lower correlation between the two data sets. Correlation value 5880 may be numeric value or may be converted into textual correlation levels, such as high, medium, or low correlation.

Any combination of data sets 5873A-B and associated social metrics may be compared by temporal correlator 5874. In another example, first data set 5873A may be associated with an overall ranking for the ecosystem compared with other ecosystems. The overall ranking may be based on any variety of social metrics, such as overall sentiment, signal count, followers, conversation strength, or the like, or any combination thereof.

Processing system 5862 may correlate data set 5873A with other data sets 5873B associated with other ecosystem metrics. For example, data set 5873A may be correlated with a second data set 5873B associated with a detractor sentiment level. Temporal correlator 5874 may generate a first correlation value 5880 between the ecosystem ranking and detractor sentiment level.

In other examples, temporal correlator 5874 also may correlate data set 5873A with other data sets associated with other metrics, such as an ecosystem signal count, conversation signal strength, and other constituent metrics. Correlator 5874 may then rank each data set metric based on the associated correlation values 5880. For example, temporal correlator 5874 may generate correlation values 5880 between data set 5873A associated with the ecosystem ranking and different data sets 5873B associated with different constituent signal counts. Processing system 5862 then may rank the constituents based on their correlation values 5880 with data set 5873A.

Detractors may have a highest correlation value with the overall ecosystem ranking and may be assigned a highest constituent ranking. The company operating the ecosystem then may choose to allocate more resources to higher ranked detractor constituents to hopefully increase the overall ecosystem ranking. Other constituents with lower correlation values 5880 may be allocated fewer resources.

An event detector 5876 may detect any events that may be of interest to the company operating the ecosystem. For example, event detector 5876 may be configured to send a message containing event identifier 5884 to an account manager whenever the overall sentiment of the ecosystem drops below a preconfigured level or changes faster than a preconfigured rate.

Event detector 5876 may be configured to automatically report any event, anomaly, threshold, response, signal range, trigger value, or the like, or any combination in any selectable data set 5873A-B. As mentioned above, event detector 5876 also may compare a current data set with a historic data set. For example, the social analytic system may generate a data set 5873A that tracks the ecosystem signal count over a previous year. Event detector 5876 may compare data set 5873A with a data set 5873B identifying the ecosystem signal count for a current week. Event detector 5876 may compare the signal count for the current week with the signal count for the same week from the previous year. Event detector 5876 may send event identifier 5884 to the ecosystem account manager if the signal count difference between the current week and the same week from the previous year is greater than a threshold amount.

In another example, event detector 5876 may determine parameters, such as a periodicity, trend, and/or noise values for particular data sets 5873A-B. The parameters may be derived using algorithms similar to those used in filters 5870 and 5872. The parameters may be stored in a measures table and updated daily, weekly, monthly, etc. Event detector 5876 also may determine an ecosystem trend and calculate differences between values in data sets 5873A-B values and the trend at corresponding time locations. For example, event detector 5876 may compare data sets values to ecosystem trend 5824 in FIG. 45. As mentioned above, an ecosystem trend may be a trend in a filtered data set that represents a specific characteristic of the ecosystem.

Social signal values with statistically significant variations from the derived ecosystem trend may be identified as anomalies by event detector 5876. For example, brand campaigns may usually create linear increases in the ecosystem signal count. A latest brand campaign may not generate a similar increase in the signal count and the signal count may remain relatively flat. This substantial change from the typical linear signal count increase may be identified as an anomaly.

An event predictor 5878 may forecast ecosystem events based on correlation values 5880 and/or identified events 5884. A high correlation value 5880 between two data sets may not necessarily mean a causal relationship but may indicate that certain changes in one social signal data set 5873A may accompany changes in another data set 5873B. If there are time lags between the changes in the two data sets 5873A and 5873B, the first highly correlated data set 5873A-B might serve as a predictor for the second data set 5873A-B.

For example, temporal correlator 5874 may have identified a high correlation value 5880 between first data set 5873A and second data set 5873B. Data set 5873A may be associated with the overall ecosystem signal count and data set 5873B may be associated with an advocate sentiment level. Over past days, months, years, etc. event predictor 5878 may have detected increases in the advocate sentiment level in data set 5873B followed by a spike in the overall ecosystem signal count in data set 5873A. The high correlation value 5880 between data set 5873A and 5873B may indicate the spike in the overall signal count may be related to the increase in advocate sentiment.

Accordingly, event predictor 5878 may generate an event prediction 5882 in response to detection of the increased advocate sentiment level in data set 5873B that predicts an increase in the overall ecosystem signal count in data set 5873A. Event prediction 5882 may identify a size or amount of the predicted signal count and/or an expected time of the predicted increased signal count. For example, historic time series data set for the ecosystem may indicate that a 10% or more increase in the advocate sentiment level historically results in a 20% increase in the overall ecosystem signal count approximately a week later. Accordingly, based on a high correlation value 5880 generated by temporal correlator 5874 and the detected spike in the advocate sentiment level, event predictor 5878 may generate an event prediction 5882 that predicts the overall signal count in data set 5873A will increase by 20% in one week. In response to event prediction 5882, the company operating the ecosystem may immediately send out a press release to mitigate whatever event prompted the reduced advocate sentiment.

Thus, the social analytic system may generate time series data sets from social signals that are associated with different ecosystem social metrics. Generic trends unrelated to ecosystems may be filtered. Correlation values can be calculated between different data sets and used for identifying and predicting social media events for the ecosystems.

Conversation Correlation

A conversation correlation system is configured to group social signal conversations into topic clusters. The topic clusters for different days are linked together to form conversation streams. The conversation streams can identify conversation topics within ecosystems and identify changes in conversation topics over time. Topic labels may be generated that better describe the conversation topics.

Figure 51:
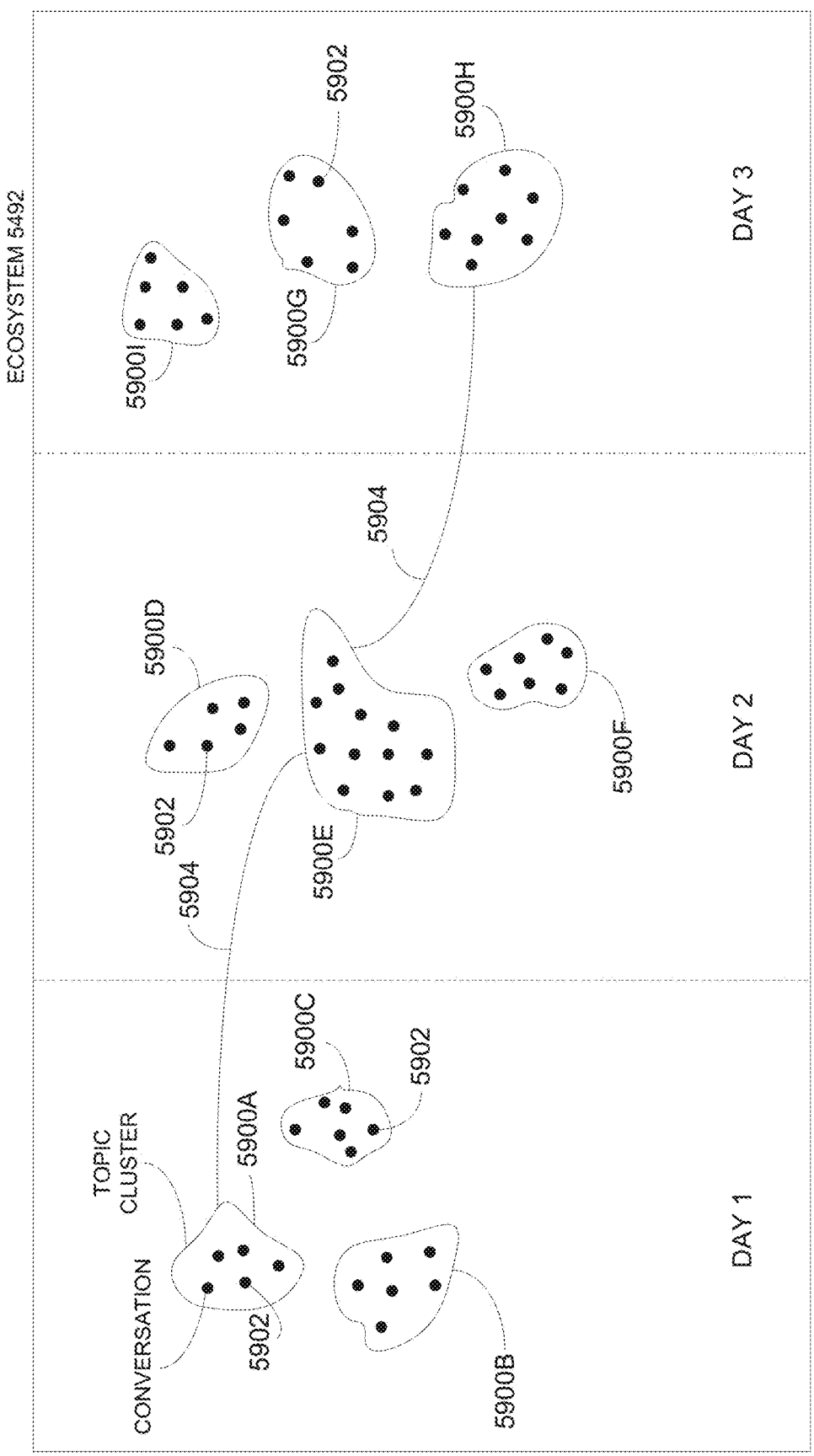
FIG. 51 depicts an example of topic clusters formed from social signal conversations.

FIG. 51 shows a diagram that represents different conversations 5902 with dots. The discussion below refers to conversations 5902 as being within associated ecosystem 5492. However, as explained above, it should be understood that the social signals in conversations 5902 may be associated with any combination of one or more social networks.

Each conversation 5902 may comprise groups of social signals that have some type of relationship. For example, a first constituent within ecosystem 5492 may send or post a message regarding a particular topic. A second constituent may send or post a reply to the message. For example, the second constituent may reTweet an original Tweet message sent by the first constituent. Other constituents in ecosystem 5492 may post or reply to the messages sent or posted by the first and/or second constituent.

The social signals may contain metadata identifies the different messages as part of a same conversation 5902. For example, the metadata may identify the original message as a root message and reference the root message in all of the subsequent reply messages.

Multiple different conversations 5902 may be identified for one ecosystem 5492. A term frequency algorithm may be used for generating term vectors for conversations 5902. The term vectors for different conversations 5902 may be compared. The conversations with closely related term vectors may be grouped together into a topic cluster 5900. Topic clusters 5900 may identify conversations 5902 discussing similar topics. A term frequency algorithm and a term library may be used to identify the probabilities of occurrence of the terms for topic clusters 5900. For example, a topic cluster 5900A may include the following three terms and associated probabilities.

|  |  |
|---|---|
| Energy Drink | 0.5 |
| Skiing | 0.2 |
| Extreme | 0.2 |

Topic clusters 5900 may include many other terms and other associated probabilities. For example, each topic cluster 5900 may be represented by 100 terms from the associated conversations 5902 with the highest probabilities. Some terms may not even exist in the conversations for particular topic clusters 5900 but may exist in the libraries used for forming topic clusters 5900A-5900C.

Topic clusters 5900 may be generated each day. For example, three topics clusters 5900A-5900C are generated for ecosystem 5492 on day 1. A second set of topic clusters 5900D-5900F may be generated for a second day 2, and a third set of topic clusters 5900G-59001 may be generated for a third day 3. The individual topic clusters 5900A-5900E all may have different sets of terms and different probabilities. However, the terms and probabilities of topic clusters 5900 for different days may be similar.

Topic clusters 5900 for sequential days may be linked together based on the similarity of associated terms and probabilities. For example, a 100 dimensional term vector for topic cluster 5900A for day 1 may be compared with each of the 100 dimensional term vectors for each of topic clusters 5900D, 5900E and 5900F for day 2. Topic clusters 5900 with similar term vectors may be linked together. Terms also may comprise, but are not limited to, hash tags, links, @mentions, words, n-grams, and the like, and any combination thereof.

For explanation purposes topic clusters 5900 are described as being identified for different days and linked together into conversation streams for the different days. However, it should be understood that topic clusters 5900 may be identified and linked together over other time periods, such as for hours of the day, weeks of the month, months of the year, etc.

For example, topic cluster 5900A and topic cluster 5900E may each include the term Energy Drink. A first value may be derived by multiplying the probability value for the term Energy Drink in topic cluster 5900A with the probability value for the term Energy Drink in topic cluster 5900E. A second value may be derived by multiplying the probability value of a second term in topic cluster 5900A with the probability value of a second matching term in topic cluster 5900E. A similarity score is derived by adding up the products of the probability values for matching term values. The similarity score indicates a topic similarity between topic cluster 5900A and topic cluster 5900E.

A same term vector comparison is performed between each topic cluster 5900A-5900C for day 1 and each topic cluster 5900D-5900F for day 2. Pairs of day 1-day 2 topic clusters that have a high similarity score above a threshold value are linked together into a same conversation stream 5904. Topic cluster comparisons are performed between each adjacent day. For example, similarity scores are also derived between each topic cluster 5900D-5900F for day 2 and each topic cluster 5900G-59001 for day 3.

Based on the similarity scores, topic clusters 5900A, 5900E, and 5900H may be linked together as part of conversation stream 5904 and assigned a same root identifier. Other combinations of topic clusters also may be linked together as conversation streams 5904 based on their associated similarity scores. In one example, the two topic clusters in day 1 and day 2 with a highest similarity score above the given threshold may be linked together in a first conversation stream 5904. A second pair of topic clusters in day 1 and day 2 with a second highest similarity score above the given threshold may be linked together as a second conversation stream 5904, etc.

Thus, the analytic system groups together conversations with similar topics into the same conversation streams 5904. Conversations 5902 in conversation streams 5904 may or may not be explicitly linked together based on metadata or a common root message. For example, conversation streams 5904 may contain social signals for different conversations that originate from different original root messages but are still linked together based on similar conversation topics.

Figure 52:
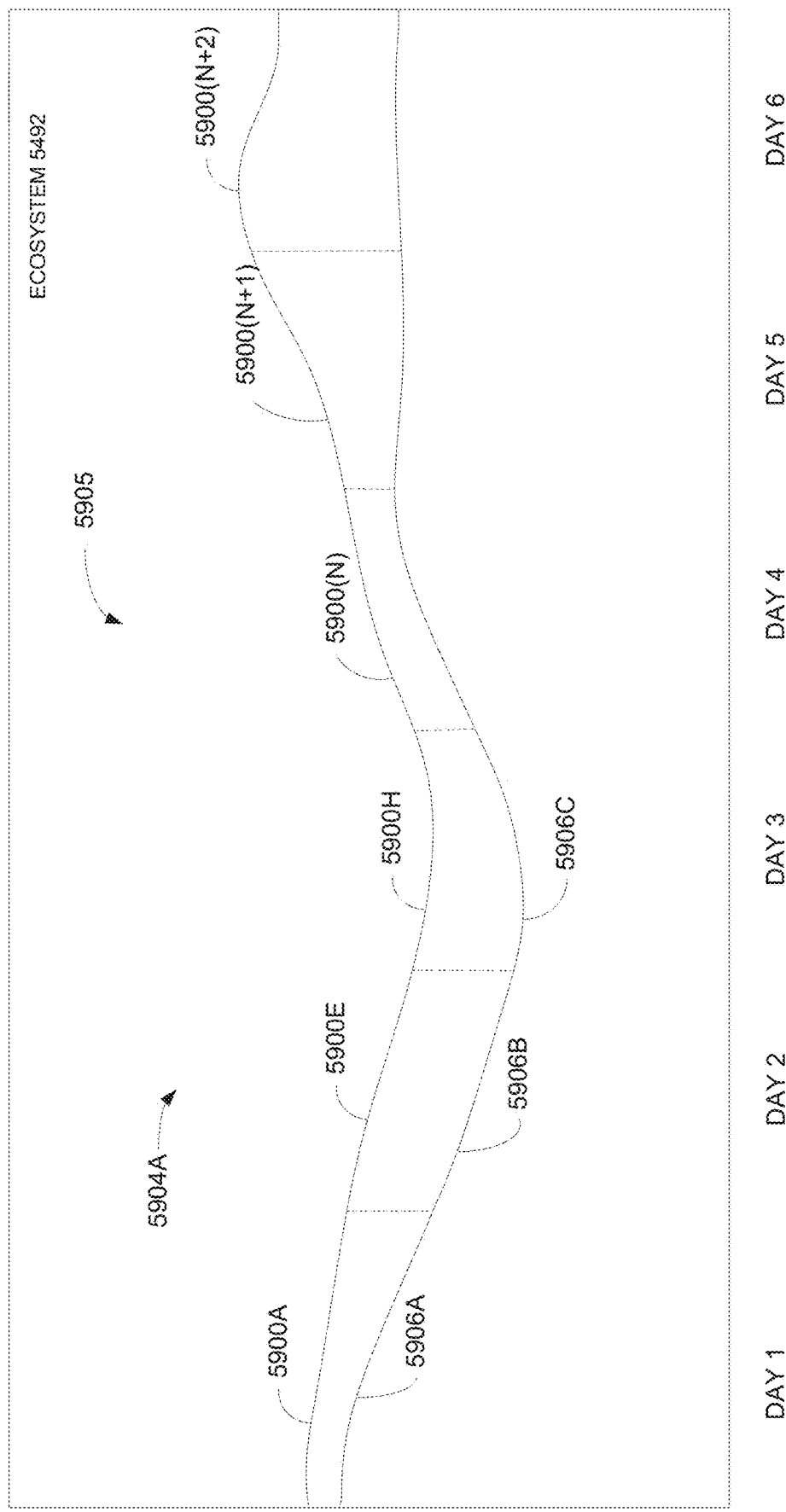
FIG. 52 depicts an example graph showing a conversation stream.

FIG. 52 depicts an example graph 5905 showing how conversation stream 5904A may be plotted and displayed on a computer device. In this example, a first portion 5906A of conversation stream 5904A may represent topic cluster 5900A for day 1 in FIG. 51. A second portion 5906B of conversation stream 5904A may represent topic cluster 5900E for day 2, and a third portion 5906C of conversation stream 5904A may represent topic cluster 5900H for day 3 in FIG. 51.

Each section 5906A-C of conversation stream 5904A may be displayed with a width proportional to a signal volume and/or number of conversations for the associated topic cluster 5900. For example, a first number of social signals may have been used in the conversations 5902 associated with topic cluster 5900A Section 5906A may be displayed with a width associated with the first number of social signals. A second larger number of social signals may have been used in the conversations 5902 associated with topic cluster 5900E. Section 5906B of conversation stream 5904A may be displayed with a larger width than section 5906A to represent the larger signal count or some other disparate results within a conversation stream.

Figure 53:
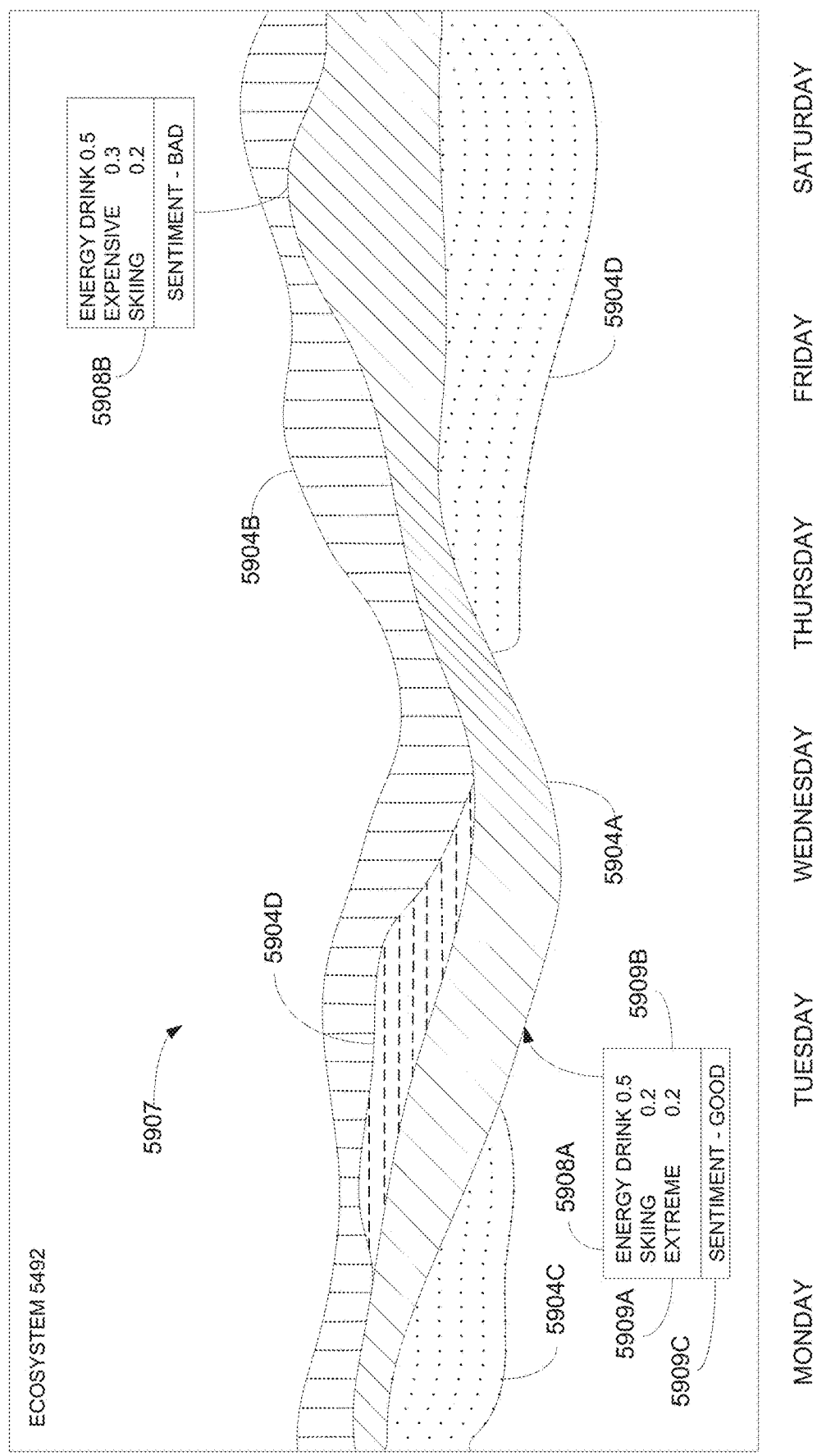
FIG. 53 depicts an example graph showing different conversation streams for an ecosystem.

FIG. 53 depicts an example graph 5907 displaying different conversation streams 5904 derived for ecosystem 5492. Conversation streams 5904A-5904D represent four different sets of topic clusters linked together over a week. For example, on Monday, 800 different conversations may have been identified in the social network accounts of the company operating ecosystem 5492. The topic clusters derived on Monday may be compared with the topic clusters derived for Tuesday and linked together based on similarity scores as previously shown in FIG. 52.

While only four conversation streams 5904A-5904D are shown in FIG. 53, any number of conversation streams 5904 may be generated and displayed in graph 5907. The number of topic clusters and associated conversation streams 5904 may be based on the number of identified conversations or based on the number of identified conversation topics. A fewer number of identified conversations may result in a fewer number of topic clusters and a fewer number of associated conversation streams 5904.

As explained above, widths of conversation streams 5904 may be proportional to the number of associated social signals or the number of associated conversations in the associated topic clusters. For example, on Monday conversation stream 5904C may be wider than conversation streams 5904A or 5904B indicating an association with a larger number of the 800 Monday social signals. The number of social signals associated with conversation stream 5904A increases on Tuesday and Wednesday, reduces on Thursday, and increases on Friday and Saturday. Accordingly, conversation stream 5904 may be wider on Tuesday and Wednesday and may be narrower on Thursday, Friday and Saturday. The number of social signals associated with conversation stream 5904B may relatively constant over the entire week and therefore may be displayed with a relatively consistent width.

Conversation stream 5904C may be associated with a relatively large number of social on Monday but may end on Tuesday. Conversation stream 5904C then may reappear on Thursday and then continue through the rest of the week. This may indicate that no or relatively few conversations were detected on Tuesday and Wednesday relating to the topic associated with conversation stream 5904C and that the topic then reappeared in conversations on Thursday, Friday and Saturday. Conversation stream 5904D starts on Monday and terminates on Wednesday. This may indicate that no conversations or social signals were identified on Thursday-Saturday that relate to the topic associated with conversation stream 5904D or the number of conversations or social signals associated with conversation stream 5904D is below a threshold needed for displaying in graph 5907.

A user may "clink" on any conversation stream 5904 on any day and view associated terms and metrics. For example, a popup window 5908A may be displayed in response to a user selecting conversation stream 5904A at the location associated with Tuesday. Popup window 5908A may display the terms 5909A, probabilities 5909B, and/or metrics 5909C for the topic cluster associated with the Tuesday portion of conversation stream 5904A.

For example, the social analytic system may display terms 5909A with the highest probabilities 5909B in popup window 5908A. Other metrics 5909C and terms displayed in popup window 5908A-B may include, but is not limited to, hash tags, links, mentions, types of constituents, etc. Metrics 5909C, such as an overall sentiment, may be derived for all of the Tuesday social signals associated with conversation stream 5904A and displayed in popup window 5908A. Any other metrics, such as types of constituents, discussion strength, conversation length, signal count, etc. may be derived and displayed in response to selection of the associated signal streams 5904.

Graph 5907 allows users to quickly view changes in conversation streams 5904 over time. For example, a user may select the section of conversation stream 5904A associated with Saturday. The analytic system may display another popup window 5908B that shows the terms and associated probabilities for the Saturday topic cluster linked with conversation stream 5904A. The Saturday terms may be the same or similar to the Tuesday terms. However, some terms may be different and the probabilities of some terms may change. For example, on Saturday a term Expensive may have moved up in the list of top terms for conversation stream 5904A increasing in probably to 0.3. The sentiment of conversation stream 5904 also may have changed from good on Tuesday to bad on Saturday.

Conversation streams 5904 may visually correlate social signal conversations with different ecosystem events. For example, a company employee can view conversation streams 5904 to discover what people are discussing regarding a new product launch. The continuous time flow of conversation streams 5904 also allow the company employee to determine what topics the constituents are discussing on the day of the product launch and how those discussions changes over time. In another example, the company operating ecosystem 5492 may announce a collaboration with another company. Conversation streams 5904 allow both companies to quickly determine public sentiment regarding the collaboration.

Conversation streams 5904 also may be used in conjunction with the temporal correlation system described above in FIGS. 43-50. For example, times series data metrics may be generated from the social signals associated with conversation streams 5904. The time series data may be correlated with sentiment, signal count, or any other time series social signal metrics. The correlations may be used for identifying and predicting social media events and identifying outlier social media events. For example, a start of a particular conversation stream 5904 or a change in the number of social signals or sentiment of a particular conversation stream 5904 may be predicted to cause a subsequent increase in the overall signal count for ecosystem 5492.

Conversation streams 5904 may be displayed in different colors or markings to identify changes in sentiment or changes in other metrics. For example, conversation stream 5904A may be displayed in green on Monday, Tuesday, and Wednesday to indicate the positive sentiment and may be displayed in red on Thursday. Friday, and Saturday to indicate the change to a negative sentiment.

Thus, conversation streams 5904 may identify and visually display social network conversations, identify the topics of the conversations, and identify social metrics associated with the conversations, such as signal strength, number of social signals, sentiment, etc. Displaying the conversations over time provide more instinctive indications of changes in the conversation topics and social metrics.

Figure 54:
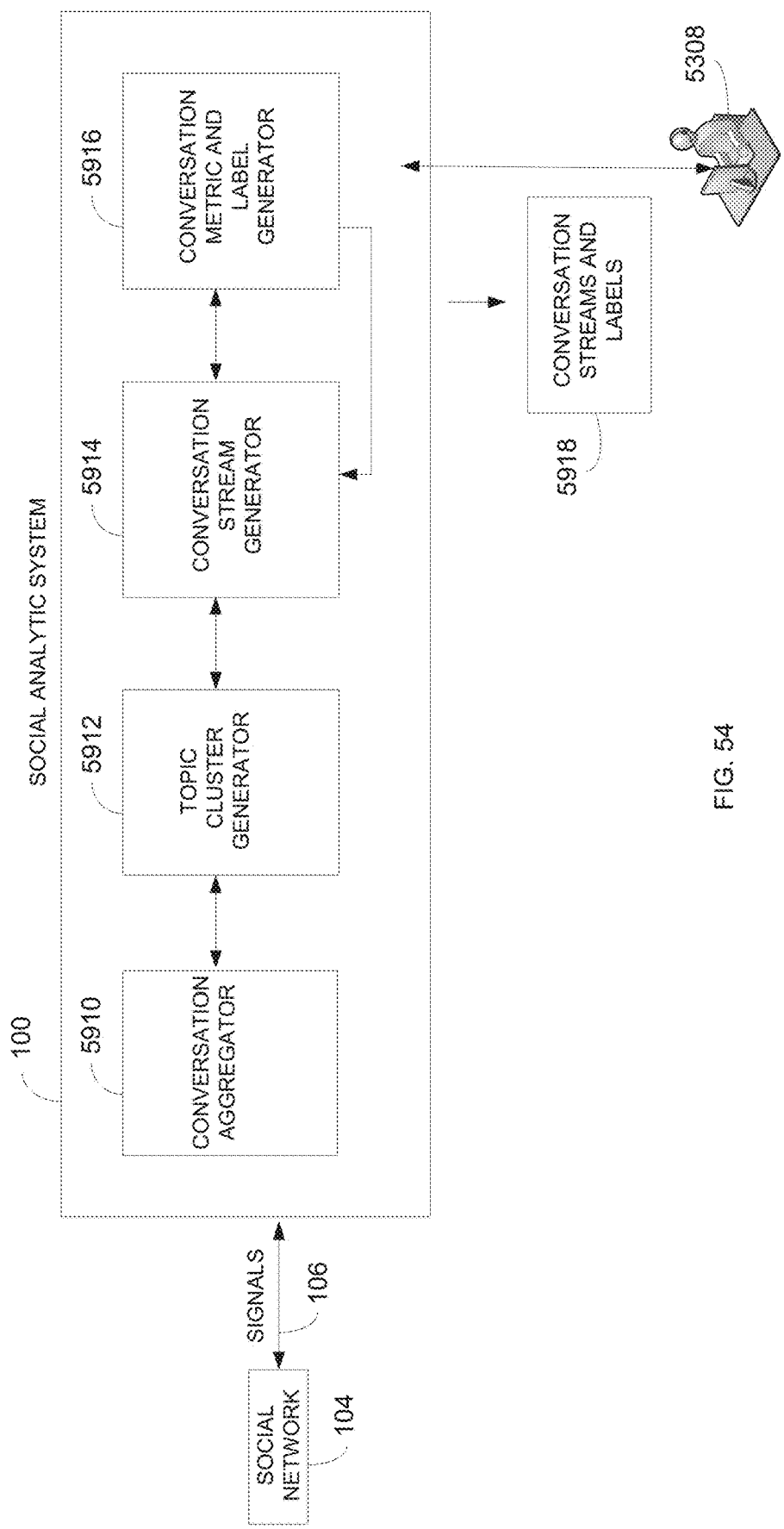
FIG. 54 depicts an example social analytic system configured to identify conversation streams.

FIG. 54 depicts an example of how social analytic system 100 automatically generates conversation streams. As described above, collectors may collect social signals 106 from one or more social networks 104. As also described above, social signals 106 associated with the same ecosystem 5492 may be aggregated together and different metrics generated from the social signals. For example, different constituents, sentiments, and signal counts may be identified for the different ecosystems.

A conversation aggregator 5910 may aggregate together social signals 106 associated with the same conversations. Metadata may associate the social signals 106 with the same conversation root messages. Other social signals may be related to the same conversations based on term vector similarity.

A topic cluster generator 5912 may group the social signals for the different conversations into topic clusters. Topic clusters may be generated each day or may be generated for other time periods, such as each hour or each week. A term frequency model may group the conversations with similar term vectors into topic clusters and generate a list terms and associated probabilities for the topic clusters.

For example, a Latent Dirichlet Allocation (LDA) topic model may be used for generating the terms and the associated probabilities for topic clusters 5900 shown in FIG. 51. LDA may assume every social signal is related to every topic where some social signals may be highly associated with one particular topic but only slightly associated with other topics. Other examples of topic models that may be used for generating topic cluster term vectors may include, but is not limited to, probabilistic latent semantic analysis (pLSA) and term frequency-inverse document frequency (Tf-idf) analysis. Generating topics clusters from sets of text is generally known and therefore not described in further detail.

A conversation stream generator 5914 may link the topic clusters together to form conversation streams. As explained above, the probabilities for matching terms in the topic clusters for adjacent days may be multiplied together. The products of the multiplied probabilities may be summed together to generate a similarity value. Topic clusters for adjacent days are then linked together in the same conversation streams based on their associated similarity values.

A conversation metric and label generator 5916 may generate metrics for the conversation streams. For example, generator 5916 may derive sentiments for the conversations streams for each day or may derive an overall average sentiment for the conversation streams over an entire week, month, year, etc.

Conversation metric and label generator 5916 also may generate topic labels for the conversation streams. In one example, the terms derived for the topic clusters may be used as topic labels for the conversation streams. For example, the terms in the topic clusters with the top probabilities may be displayed in popup windows as shown in FIG. 53. In another example, a mutual information model may be used for generating more informative topic labels for the conversation streams and also may be used to effectively link different topic clusters together.

Social analytic system 100 may send the derived conversation streams and associated metrics and labels 5918 to computing device 5308 for displaying to a user on a computer screen. As mentioned above, computing device 5308 may be a personal computer, network server, smart phone, notebook, terminal, personal digital assistant, or any other wired or wireless device coupled to social analytic system 100. Conversation aggregator 5910, topic cluster generator 5912, conversation stream generator 5914, and conversation metric and label generator 5916 may be implemented in any combination of software and/or hardware.

Figure 55:
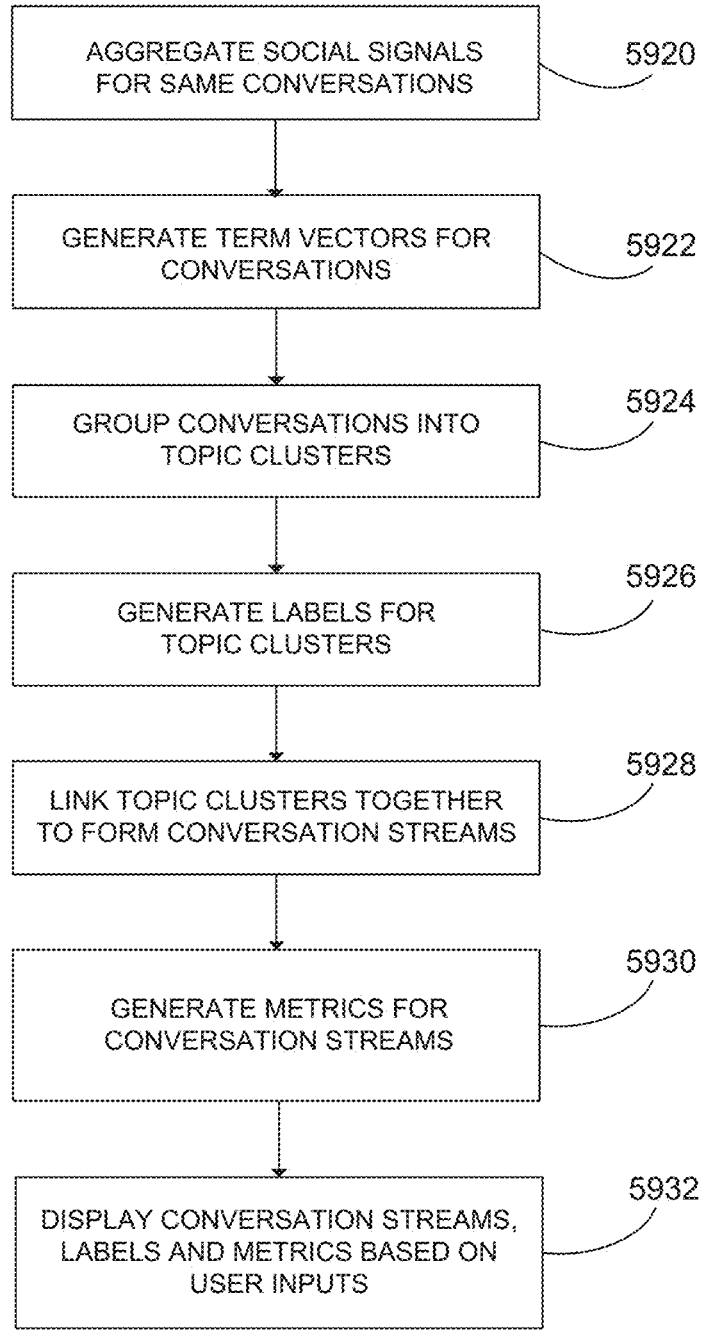
FIG. 55 depicts an example process for generating conversation streams.

FIG. 55 depicts an example process for deriving conversation streams. In operation 5920, social signals for the same conversations may be aggregated together. In operation 5922, term vectors may be generated from the social signals associated with the conversations. For example, a term frequency algorithm may count the number of words and other terms used in the social signals and divide the count by the total number of terms used in the social signals. Operation 5924 may group the social signals for related conversations together into topic clusters. For example, closely aligned conversation term vectors may be assigned to the same topic cluster. As mentioned above, a LDA model may be used for grouping the social signals together into topic clusters.

Operation 5926 may generate labels for the topic clusters. As explained above, one type of label may comprise the top terms associated with the topic clusters. For example, the terms with the highest probabilities may be identified as topic labels. In another example, a mutual information topic distribution model may be used for generating the topic labels as described in more detail below.

Operation 5928 may link the topic clusters together to form conversation streams. As also mentioned above, one technique for linking topic clusters may comprise multiplying probabilities for matching topic cluster terms and summing together the products for the multiplied probabilities. In another example, topic clusters with similar topic labels may be linked to the same conversation streams.

Operation 5930 may generate metrics for the conversation streams. As mentioned above, constituents, conversation strengths, sentiments, signal counts, etc. may be derived for the different conversation streams and the different topic clusters linked to the conversation streams. Operation 5932 may display the conversation streams and the associated topic labels and associated metrics on a computer screen in response to user inputs.

Topic Labeling

Comparing topic vectors over time provides one scheme for linking social signal conversations. However, noise may exist in the social signals collected from the social network accounts. For example, social signals may be collected from different social network accounts, such as Twitter accounts and Facebook accounts.

The social signals collected from the different social network accounts may have different lengths, use different links, and contain different types of metadata. For example, a first message collected from a Twitter account may contain a link to Twitterphotos.com and a second message collected from a Facebook account may contain a link to Facebook-photos.com.

The two messages may be part of a same conversation. However, the differences in the messages related to the different social network accounts may prevent the two social signals from being linked to a same conversation or may prevent two conversations on different social networks from being associated with the same topic cluster or conversation stream.

Figure 56:
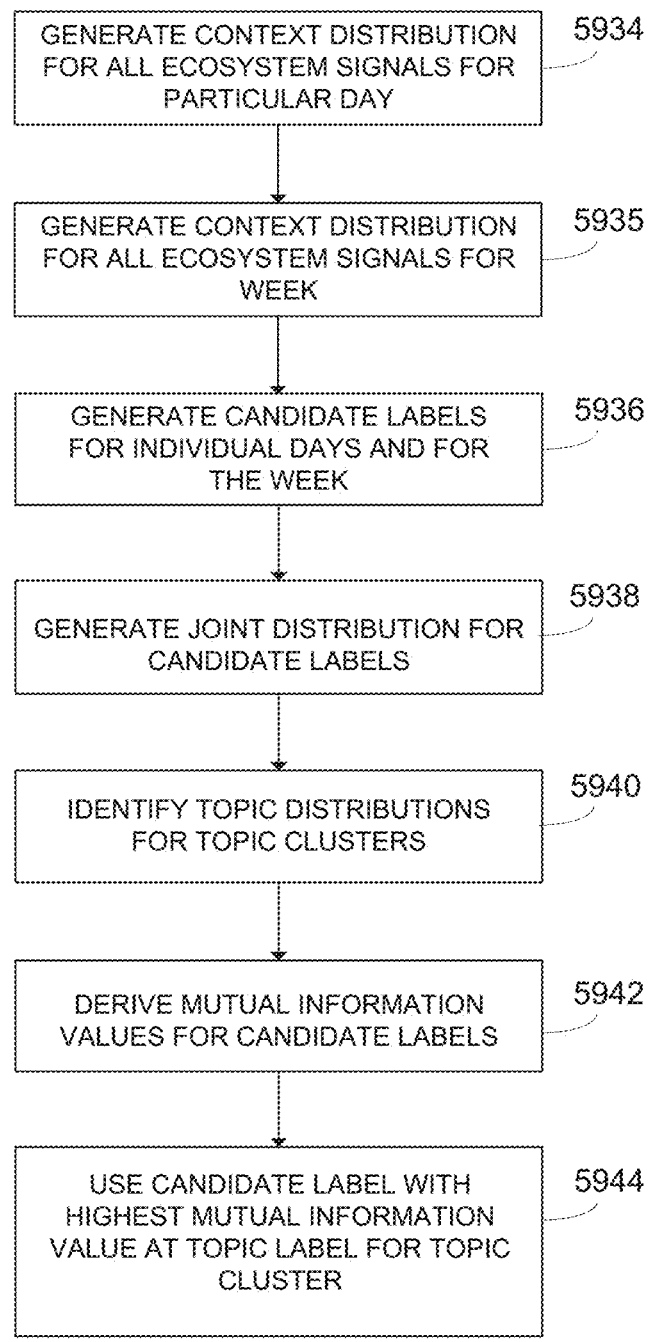
FIG. 56 depicts an example process for generating topic labels.

FIG. 56 depicts a process for generating topic labels. The topic labels may more effectively identify, describe, and/or link social signals, conversations, topic clusters, and conversation streams. In one example, topic labels may be generated using a mutual information topic distribution model and may comprise short natural language phrases that better summarize and explain social signal topics.

Operation 5934 may generate a context distribution for all of the signals associated with an ecosystem for a particular day. For example, probabilities of occurrence are assigned to the terms used in all of the signals for that day. The terms may include bigrams of two consecutive words and trigrams of three consecutive words. Operation 5935 may generate a second context distribution from an entire week of ecosystem social signals. For example, a context distribution may be generated for Monday social signals and a separate context distribution will be generated from Monday social signals and the social signals for the preceding six days.

A term frequency algorithm may be used for generating the term probabilities. For example, a count value may identify the number of times each term occurs in each of the Monday social signals. The count value then may be divided by the total number of occurrences of all terms in all of the Monday social signals and generate a probability value between 0 and 1.

Operation 5936 may generate candidate topic labels for individual days and for the week. For example, a predetermined number of word level bigrams and trigrams with the highest probabilities may be identified from the Monday context distribution. For example, the top 100 bigrams and trigrams may be identified as the Monday candidate labels. In one example, hash tags or other terms also may be selected as the candidate labels. A second set the top 100 bigrams and trigrams for the week context distribution may be selected as the candidate labels for the week.

Operation 5938 may generate joint distributions for the candidate labels. For example, one of the candidate labels for Monday may be the term Black Friday. All of the social signals for Monday that include the term Black Friday may be identified.

A joint distribution is then generated from the social signals that contain the bigram Black Friday. The joint distribution may identify the probabilities for each term in the identified set of Black Friday social signals. In one example, the term Black Friday may be excluded from the list of terms and probabilities contained in the joint distribution. The same term frequency algorithm used for generating the context distribution may be used for generating the joint distributions.

Joint distributions may be generated for each candidate label. For example, a joint distribution may be generated from the Monday social signals for each Monday candidate label. Joint distributions also may be generated from the week of social signals for each week candidate label.

In operation 5940, topic distributions are identified for particular days. The topic distributions each may comprise the terms and probabilities for one of the identified topic clusters for a particular day. For example as explained above an LDA topic model may be used to identify the terms and probabilities for each of the Monday topic clusters. In operation 5942, mutual information values may be generated for the candidate labels. One technique for generating mutual information values is described in Automatic Labeling of Multinomial Topic Models, by Qiaozhu Mei, Xuehua Shen, Chengxiang Zhai; Association for Computing Machinery, Aug. 12, 2007, which is herein incorporated by reference in its entirety. Section 3.3 of Qiaozhu below describes a mutual information topic distribution model that generates mutual information scores given topic, candidate label pairs. For example, one of the topic distributions associated with one of the Monday topic clusters and one of the joint distributions associated with one of the candidate labels may be applied to the mutual information topic model described above to generate a mutual information value.

Operation 5942 generates sets of mutual information values for each topic cluster and candidate label. For example, a first set of mutual information values may be generated for a first Monday topic cluster. The first set of mutual information values may include a first mutual information value for a first Monday candidate label and a first Monday topic cluster, a second mutual information value for a second Monday candidate label and the first Monday topic cluster, etc. The first set of mutual information values also may include a third mutual information value for a first week candidate label and the first Monday topic cluster, and a fourth mutual information value for a second week candidate label and the first Monday topic cluster, etc.

A second set of mutual information values may be generated for a second Monday topic cluster. The second set of mutual information values may include a mutual information value for the first Monday candidate label and the second Monday topic cluster, a mutual information value for the second Monday candidate label and the second identified Monday topic cluster, etc. The second set of mutual information values also may include a mutual information value for a first week candidate label and the second Monday topic cluster, and a mutual information value for a second week candidate label and the second Monday topic cluster, etc. Sets of mutual information values may be generated for each topic cluster for a particular day and each candidate label identified for that particular day and each candidate label identified for that particular week.

Operation 5944 may select the candidate label with the highest associated mutual information values as the topic label for the associated topic cluster. For example, the candidate label with the highest score in the first set of mutual information values may be selected as the topic label for the first Monday topic cluster and highest score in the first set of mutual information values may be selected as the topic label for the second Monday topic cluster. The identified topic labels then may be displayed in response to a user selecting the associated conversation streams. For example, the topic label selected for the first topic cluster may be displayed in response to the user selecting a portion of the associated conversation stream associated with Monday.

The mutual information topic model may generate mutually exclusive topic labels. This is explained in detail in section 3.4 of Qiaozhu. For example, candidate labels that provide a best match for multiple different topic clusters might not generate high mutual information value scores, since that candidate labels may not uniquely identify any one conversation topic. Thus, the mutual information topic model may optimize topic labels by identifying a best representation for one topic cluster that does not provide a good representation for other topic clusters. A same candidate label may be identified as the best match for two different topic clusters. This may indicate too many topic clusters were generated for that particular day. One of the two identified topic clusters may be discarded or the two topic clusters may be combined into a single topic cluster.

The week candidate labels provide a sort of normalization for the daily candidate labels. For example, topics or labels derived for single days of social signals may not be fully developed or described, may frequently change, or may contain anomalies that may not accurately represent the rest of the conversation stream. However, over a week, the topic labels may become more coherent.

For example, the best candidate label for Monday may comprise the term Look Job where the best candidate label for the week may comprise a more descriptive term Marketing Job Twitter. The candidate label for the week may better represent and describe the topic cluster conversations and generate a higher mutual information score. Accordingly, candidate labels may be generated from the ecosystem from the social signals for individual days and from the social signals for the entire week. The candidate label with the highest mutual information value score is then used at the topic label for the associated topic cluster.

The topic labels also may be used for linking topic clusters to the same conversation streams. As explained above, the mutual information topic model may identify topic labels that include terms that are more mutually exclusive to particular topic clusters. Topic clusters for different days that include the same topic label terms therefore may more likely be associated with similar conversation topic. Thus, topic label terms may be given higher weightings when linking topic clusters to conversation streams.

Figure 57:
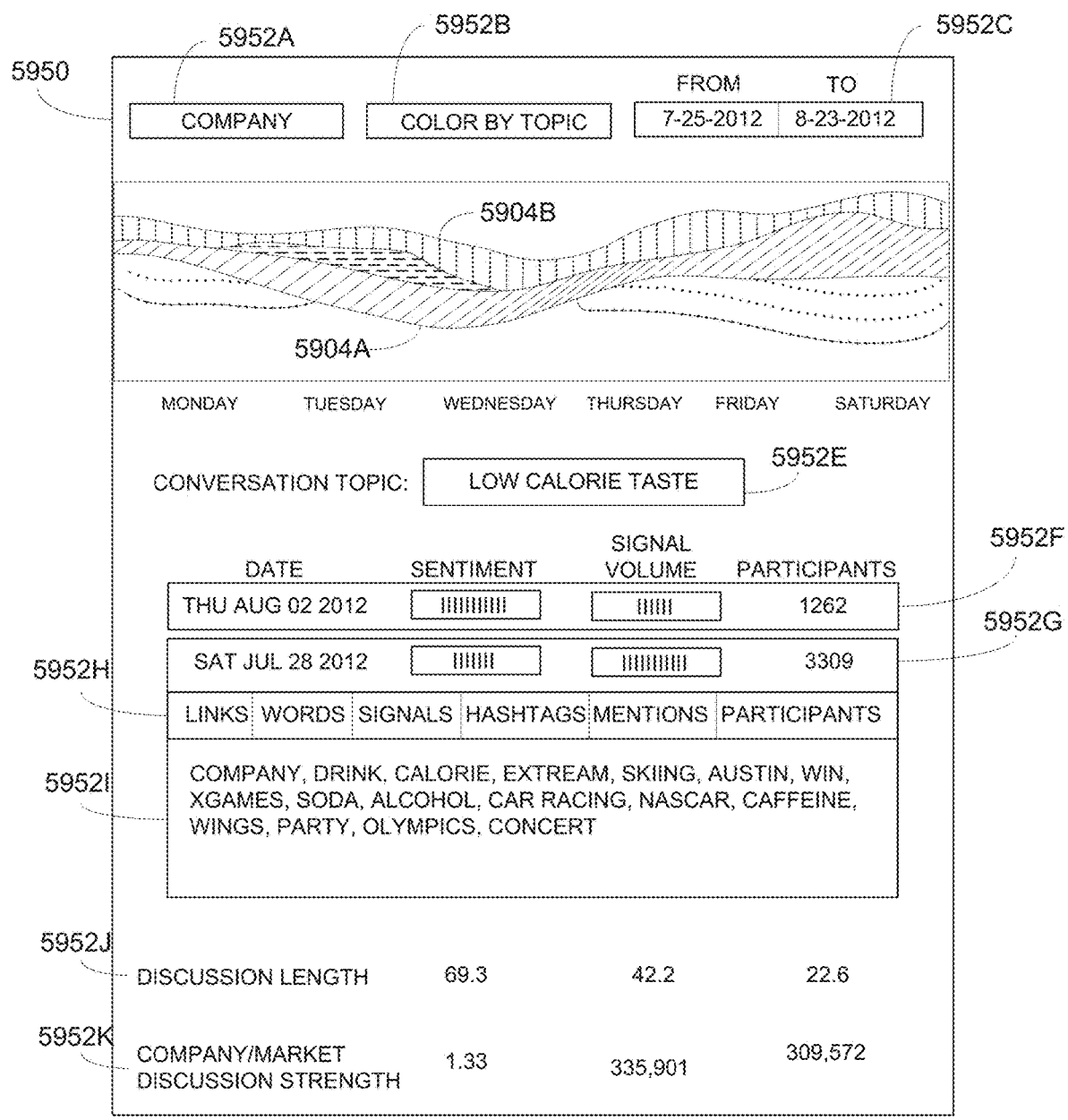
FIG. 57 depicts an example electronic page displaying conversation streams.

FIG. 57 shows one example of an electronic web page 5950 displaying different conversations streams 5904 for an ecosystem. A field 5952A in web page 5950 may be used to select a particular ecosystem for displaying associated conversation streams 5904. A field 5952B may be used for selecting different colors for conversation streams 5904. Fields 5952C may be used for selecting a time period for displaying conversation streams 5904. For example, the user may enter a time period into field 5952C to display ecosystem conversations streams 5904 from Jul. 25, 2012 through Aug. 23, 2012.

A field 5952E may identify a topic or topic label associated with one of conversation streams 5904. For example, the analytic system may display a conversation topic in field 5952E in response to the user selecting one of conversation streams 5904. In one example, field 5952E may display topic labels described above in FIG. 56 for the topic clusters linked to the selected conversation streams 5904.

Electronic page 5950 also may include sections 5952F-5952K that display other metrics for selected conversation streams 5904 or display other general information for the ecosystem selected in field 5952A. For example, section 5952F may display a sentiment value, signal volume, and a number of participants for a first selected day of selected conversation stream 5904. Section 5952G may display a sentiment value, signal volume and number of participants for a second day of the selected conversation stream.

The sentiment value may be displayed as a number or may be displayed as a meter that increases or decreases based on an overall sentiment of the conversation stream for a particular day. The signal volume also may be displayed as a number or is displayed as a meter that represents the number of social signals identified for the conversation stream for a particular day. A participant value in section 5952F indicates the number of different users that participated in the conversation stream on a particular day.

In additional tab bar 5952H may be used for selecting different social metrics for displaying with the selected conversation stream 5904 for the selected day in section 5952G. For example, selecting a words tab in tab bar 5952H may display a list of words and other terms in section 5952I used in the selected conversation stream 5904 on Saturday, Jul. 28, 2012. The terms displayed in section 5952I may include bigrams and trigrams used in the selected conversation stream and may be listed in order based on associated probability values.

Other tabs in tab bar 5952H may be selected for displaying other metrics. For example, a links tab may be selected for displaying HTTP links that are contained in the social signals for the selected conversation stream on July $28^{th}$. A signals tab may be selected for displaying the different social signals associated with the selected conversation stream and a hashtag tab may be selected for displaying the hashtags contained in the social signals for the selected conversation stream. A mention tab may be selected to display the Twitter mentions in the social signals associated with the conversation stream selected on July $28^{th}$ and a participants tab may be selected to display a list of constituent accounts that generated the social signals.

A section 5952J may identify a discussion length for the selected conversation stream and/or an average discussion length for all of the conversations in the ecosystem. The discussions lengths may be compared with discussion lengths for other ecosystems. For example, the average discussion length for conversation streams in the ecosystem identified in field 5952A may be compared with all other ecosystems tracked by the analytic system and/or may be compared with the discussion lengths for other ecosystems in a same related industry. Discussion lengths also may be compared for associated topics.

Section 5952K may identify a company or market discussion strength value for the selected conversation streams and/or may identify an overall discussion strength for the ecosystem. The discussion strength value may be based on the number conversations and social signals identified for the conversation topic, the types of constituents and followers participating in the conversations, and/or the sentiment associated with the social signals. Section 5952K also may identify the number of social signals counted for the selected conversation streams and/or for the overall ecosystem for different days and compare the signal counts with other ecosystems for the same days, weeks, etc.

The computing device 1000 (FIG. 11) may be used for operating the social analytic system and performing any combination of the social analytics discussed above.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A method, comprising:
   storing social signal data based on social signals published using social media accounts, the social signal data including first information that includes content of the social signals and second information that is different than the first information, wherein the second information includes metadata explicitly linking reply social signals of the social signals to root social signals of the social signals; and
   generating additional social signal data using the social signal data, including:
   identifying conversations in the social signals using said second information, wherein the conversations are based on the metadata; and
   grouping the conversations into clusters using the first information and based on similarity of terms of the conversations;

wherein, responsive to the grouping using the first information, a first one of the conversations is grouped with a second one of the conversations into a same one of the clusters, the first one of the conversations based on a first root social signal of the root social signals that is not explicitly linked, by the metadata, with a second different root social signal of the root social signals and on which the second one of the conversations is based, and wherein the additional social signal data includes information about the clusters;

linking the clusters together into a plurality of conversation streams based on the additional social signal data;

accumulating counts for the plurality of conversation streams, wherein the counts are based on quantities of individual social signals in the conversation streams, respectively, or based on other characteristics of the individual social signals, respectively; and providing a user interface arranged to display metrics about the plurality of conversation streams, including the accumulated counts.

2. The method of claim 1, wherein linking the clusters together into the plurality of conversation streams comprises:

generating probabilities for terms associated with the clusters;

generating similarity values between the clusters based on the probabilities for the terms that match in different ones of the clusters; and linking the clusters together into the plurality of conversation streams based on the similarity values.

3. The method of claim 1, further comprising;

wherein the user interface is further arranged to display an interactive visualization showing one or more continuous time series image flows representing the plurality of conversation streams; and wherein the user interface is part of a web browser or mobile device application.

4. The method of claim 3, further comprising generating an electronic page containing the user interface.

5. The method of claim 1, further comprising:

calculating strengths of the different conversation streams based on the quantities and further based on quantities and types of followers associated with the conversation streams, respectively;

wherein at least some of the metrics are based on the calculated strengths.

6. The method of claim 5, further comprising:

deriving a score for one of the social media accounts based on the strengths of the conversation streams, wherein the metrics comprise the derived score.

7. The method of claim 1, further comprising:

generating an interactive visualization showing one or more continuous time series image flows representing the plurality of conversation streams; and identifying overall sentiments for topics associated with the conversation streams;

wherein the user interface is further arranged to display indicators in conjunction with the interactive visualization to indicate changes in the overall sentiments over time for the topics associated with the conversation streams.

8. The method of claim 7, further comprising:

causing different widths of the one or more continuous time series image flows to be displayed in the interactive visualization based on the quantities.

9. The method of claim 1, further comprising:
generating a context distribution from the social signals;
generating candidate labels from the context distribution;
generating joint distributions for the candidate labels;
generating topic distributions for the clusters;
deriving mutual information values for the candidate labels based on the joint distributions for the candidate labels and the topic distributions for the clusters; and
selecting the candidate labels as labels for the clusters based on the mutual information values.

10. The method of claim 1, further comprising:
identifying topic distributions for the clusters by identifying probabilities for terms in the clusters;
generating a context distribution from the social signals;
identifying candidate labels from the context distribution;
generating joint distributions for the candidate labels by identifying different groups of the social signals that include terms from the candidate labels and identifying probabilities for terms in the identified groups of social signals;
deriving mutual information values for the candidate labels by applying the joint distributions for the candidate labels to the topic distributions for the clusters; and
selecting topic labels for the clusters from the candidate labels with the largest mutual information values.

11. The method of claim 10, further comprising linking the clusters together in the plurality of conversation streams based on the topic labels.

12. The method of claim 1, wherein the metadata explicitly linking the reply social signals to the root social signals comprises tags embedded into the reply social signals.

13. An apparatus, comprising:
a memory configured to store social signal data based on social signals published using social media accounts, the social signal data including first information that includes a content of the social signals and second information that is different than the first information, wherein the second information includes metadata explicitly linking reply social signals of the social signals to root social signals of the social signals; and
a processor to generate additional social signal data using the social signal data, the processor configured to:
identify conversations in the social signals using said second information, wherein the conversations are based on the metadata; and
group the conversations into clusters using the first information and based on similarity of terms of the conversations;
wherein, responsive to the grouping using the first information, a first one of the conversations is grouped with a second one of the conversations into a same one of the clusters, the first one of the conversations based on a first root social signal of the root social signals that is not explicitly linked, by the metadata, with a second different root social signal of the root social signals and on which the second one of the conversations is based, and wherein the additional social signal data includes information about the clusters; and
the processor is further configured to:
link the clusters together into a plurality of conversation streams based on the additional social signal data;
accumulate counts for the plurality of conversation streams, wherein the counts are based on a quantities of individual social signals in the corresponding conversation streams, respectively, or based on other characteristics of the individual social signals, respectively; and display a user interface arranged to display metrics about the plurality of conversations streams, including the accumulated counts.

14. The apparatus of claim 13, wherein the metadata explicitly linking the reply social signals to the root social signals comprises tags embedded into the reply social signals.

15. The apparatus of claim 13, wherein link the clusters together into the plurality of conversation streams comprises:

generate probabilities for terms associated with the clusters;

generate similarity values between the clusters based on the probabilities for the terms that match in different ones of the clusters; and link the clusters together into the plurality of conversation streams based on the similarity values.

16. The apparatus of claim 13, wherein the processor is further configured to:

calculate strengths of the different conversation streams based on the quantities and further based on quantities and types of followers associated with the conversation streams, respectively;

wherein at least some of the metrics are based on the calculated strengths.

17. The apparatus of claim 16, wherein the processor is further configured to:

derive a score for one of the social media accounts based on the strengths of the conversation streams;

wherein the metrics include the derived score.

18. The apparatus of claim 13, wherein the processor is further configured to:

generate an interactive visualization showing one or more continuous time series image flows representing the plurality of conversation streams; and identify overall sentiments for topics associated with the conversation streams;

wherein the user interface is further arranged to display indicators in conjunction with the interactive visualization to indicate changes in the overall sentiments over time for the topics associated with the conversation streams.

19. The apparatus of claim 13, wherein the processor is further configured to:

generate a context distribution from the social signals;

generate candidate labels from the context distribution;

generate joint distributions for the candidate labels;

generate topic distributions for the clusters;

derive mutual information values for the candidate labels based on the joint distributions for the candidate labels and the topic distributions for the clusters; and select the candidate labels as labels for the clusters based on the mutual information values.

20. The apparatus of claim 13, wherein the processor is further configured to:

identify topic distributions for the clusters by identifying probabilities for terms in the clusters;

generate a context distribution from the social signals;

identify candidate labels from the context distribution;

generate joint distributions for the candidate labels by identifying different groups of the social signals that include terms from the candidate labels and identifying probabilities for terms in the identified groups of social signals;

derive mutual information values for the candidate labels by applying the joint distributions for the candidate labels to the topic distributions for the clusters;

select topic labels for the clusters from the candidate labels with the largest mutual information values; and link the clusters together in the plurality of conversation streams based on the topic labels.

* * * * *